(12) United States Patent  
Tsuda et al.

(10) Patent No.: US 11,699,875 B2
(45) Date of Patent: Jul. 11, 2023

(54) CONNECTOR

(71) Applicants: SUMITOMO ELECTRIC INDUSTRIES, LTD., Osaka (JP); SUMIDEN TRANSMISSION AND DISTRIBUTION SYSTEM PRODUCTS, LTD., Hyogo (JP)

(72) Inventors: Shigehiro Tsuda, Hyogo (JP); Shico Kodama, Hyogo (JP); Hiroaki Nii, Hyogo (JP)

(73) Assignees: SUMITOMO ELECTRIC INDUSTRIES, LTD., Osaka (JP); SUMIDEN TRANSMISSION AND DISTRIBUTION SYSTEM PRODUCTS, LTD., Hyogo (JP)

( * ) Notice: Subject to any disclaimer, the term of this patent is extended or adjusted under 35 U.S.C. 154(b) by 30 days.

(21) Appl. No.: 17/648,961

(22) Filed: Jan. 26, 2022

(65) Prior Publication Data
US 2023/0170648 A1 Jun. 1, 2023

(30) Foreign Application Priority Data
Nov. 30, 2021 (JP) .................. 2021-193960

(51) Int. Cl.
*H01R 13/627* (2006.01)
*H01R 13/66* (2006.01)
*B60L 53/16* (2019.01)

(52) U.S. Cl.
CPC ..... *H01R 13/6271* (2013.01); *H01R 13/6608* (2013.01); *B60L 53/16* (2019.02); *B60L 2270/36* (2013.01); *H01R 2201/26* (2013.01)

(58) Field of Classification Search
CPC ............ H01R 13/6271; H01R 13/6608; H01R 2201/26; H01R 13/514; B60L 53/16; B60L 2270/36
See application file for complete search history.

(56) References Cited

U.S. PATENT DOCUMENTS 5,584,712 A    12/1996   Fukushima

FOREIGN PATENT DOCUMENTS

| JP | H07-192802 | 7/1995 | |
|----|------------|--------|---|
| JP | 2012-234701 | 11/2012 | |
| JP | 2012-234702 | 11/2012 | |
| JP | 2012-243687 | 12/2012 | |
| JP | 2012243687 A * | 12/2012 | |
| JP | 2013-020732 | 1/2013 | |
| JP | 2013020732 A * | 1/2013 | .......... B60L 11/1818 |

(Continued)

*Primary Examiner* — Tho D Ta
(74) *Attorney, Agent, or Firm* — IPUSA, PLLC

(57) ABSTRACT

A connector is configured to be connected to an inlet of an electric apparatus having a storage battery. The connector includes a main body portion, an insertion portion, a first arm, a first preloading member, a release member, a solenoid, and a slide member. The slide member includes a support piece configured to come into contact with a back surface of a first front portion and a connection piece connecting a plunger and the support piece. The connection piece includes a first connection piece provided on a side of the plunger and a second connection piece provided on a side of the support piece. The support piece and the first connection piece are provided with a shift in position in a left-and-right direction.

6 Claims, 39 Drawing Sheets

(56) References Cited

FOREIGN PATENT DOCUMENTS

| | | | |
|---|---|---|---|
| JP | 2013-157332 | | 8/2013 |
| JP | 2013157332 A | * | 8/2013 |
| JP | 2016-184553 | | 10/2016 |
| JP | 2016-184554 | | 10/2016 |
| JP | 2016184554 A | * | 10/2016 |
| JP | 2016-201326 | | 12/2016 |
| JP | 2019-204650 | | 11/2019 |
| JP | 2019-205263 | | 11/2019 |

* cited by examiner

CONNECTOR

CROSS-REFERENCE TO RELATED APPLICATIONS

This application is based on and claims priority to Japanese Patent Application No. 2021-193960, filed on Nov. 30, 2021, the entire content of which is incorporated herein by reference.

BACKGROUND OF THE INVENTION

1. Field of the Invention

The present disclosure relates to a connector.

The present application incorporates all the content described in the following reference documents 1 to 10 by reference.

Reference document 1 is Japanese Patent Application No. 2011-102304 filed on Apr. 28, 2011.

Reference document 2 is Japanese Patent Application No. 2011-102305 filed on Apr. 28, 2011.

Reference document 3 is Japanese Patent Application No. 2011-115184 filed on May 23, 2011.

Reference document 4 is Japanese Patent Application No. 2011-151229 filed on Jul. 7, 2011. Reference document 5 is Japanese Patent Application No. 2013-084156 filed on Apr. 12, 2013.

Reference document 6 is Japanese Patent Application No. 2015-065354 filed on Mar. 26, 2015.

Reference document 7 is Japanese Patent Application No. 2015-065355 filed on Mar. 26, 2015.

Reference document 8 is Japanese Patent Application No. 2015-082401 filed on Apr. 14, 2015.

Reference document 9 is Japanese Patent Application No. 2018-098276 filed on May 22, 2018.

Reference document 10 is Japanese Patent Application No. 2018-098277 filed on May 22, 2018.

2. Description of the Related Art

Patent Document 1 discloses, at paragraphs 0023-0026, a method for using a connector. After a tip portion of the connector is inserted into an inlet, a lever of the connector is grasped to complete fitting of the connector to the inlet. When the tip portion is inserted into the inlet, a hook protrudes from an outer peripheral surface of the tip portion. The hook is provided so as to protrude by a leaf spring. The protruding hook is caught on a concave portion of the inlet. Next, the solenoid is energized and driven, so that a release lever is locked. When the release lever is locked, the release lever is prevented from being accidentally operated during feeding. When the connector is detached from the inlet, the energizing of the solenoid is stopped due to the end of the feeding, so that the lock of the release lever is released. Next, when the release lever is operated, the hook caught on the concave portion is retracted. With the hook being retracted, the connector is unplugged from the inlet, so that the detachment of the connector from the inlet is completed.

The connector of Patent Document 1 may be accidentally unplugged from the inlet in a case where a problem such as retraction of the hook occurs regardless of the operation of the release lever due to impact, vibration, damage to components for causing the hook to protrude, and the like, during feeding. Therefore, the connector of Patent Document 1 has problems in terms of safety. In addition, the connector of Patent Document 1 has a complicated internal structure, and has a low degree of flexibility in the arrangement of components.

RELATED-ART DOCUMENTS

Patent Document

Patent Document 1: Japanese Patent Laid-Open No. 7-192802

SUMMARY OF THE INVENTION

It is an object of an aspect of an embodiment of the present invention to provide a connector that is capable of reliably preventing accidental unplugging from the inlet and that is highly flexible in the arrangement of components connector.

An aspect of an embodiment of the present invention provides a connector configured to be connected to an inlet of an electric apparatus having a storage battery, the connector including:

a main body portion;

an insertion portion provided on a front side of the main body portion and configured to be inserted into the inlet;

a first arm including a first intermediate portion swingably supported on the main body portion, a first front portion extending from the first intermediate portion to the insertion portion, a hook provided at the first front portion, and a first rear portion provided on a rear side of the first intermediate portion;

a first preloading member configured to preload the first arm such that the hook protrudes from an outer peripheral surface of the insertion portion;

a release member configured to come into contact with the first rear portion such that the first arm is swung in a direction opposite to a preloading direction of the first preloading member;

a solenoid configured to advance or retract the plunger; and a slide member configured to advance or retract in synchronization with an advancing or retracting movement of the plunger, wherein the slide member includes a support piece configured to come into contact with a back surface of the first front portion and a connection piece connecting the plunger and the support piece, the connection piece includes a first connection piece provided on a side of the plunger and a second connection piece provided on a side of the support piece, and the support piece and the first connection piece are provided with a shift in position in a left-and-right direction.

The connector according to the aspect of the embodiment of the present invention is capable of reliably preventing accidental unplugging from the inlet and is highly flexible in the arrangement of components.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
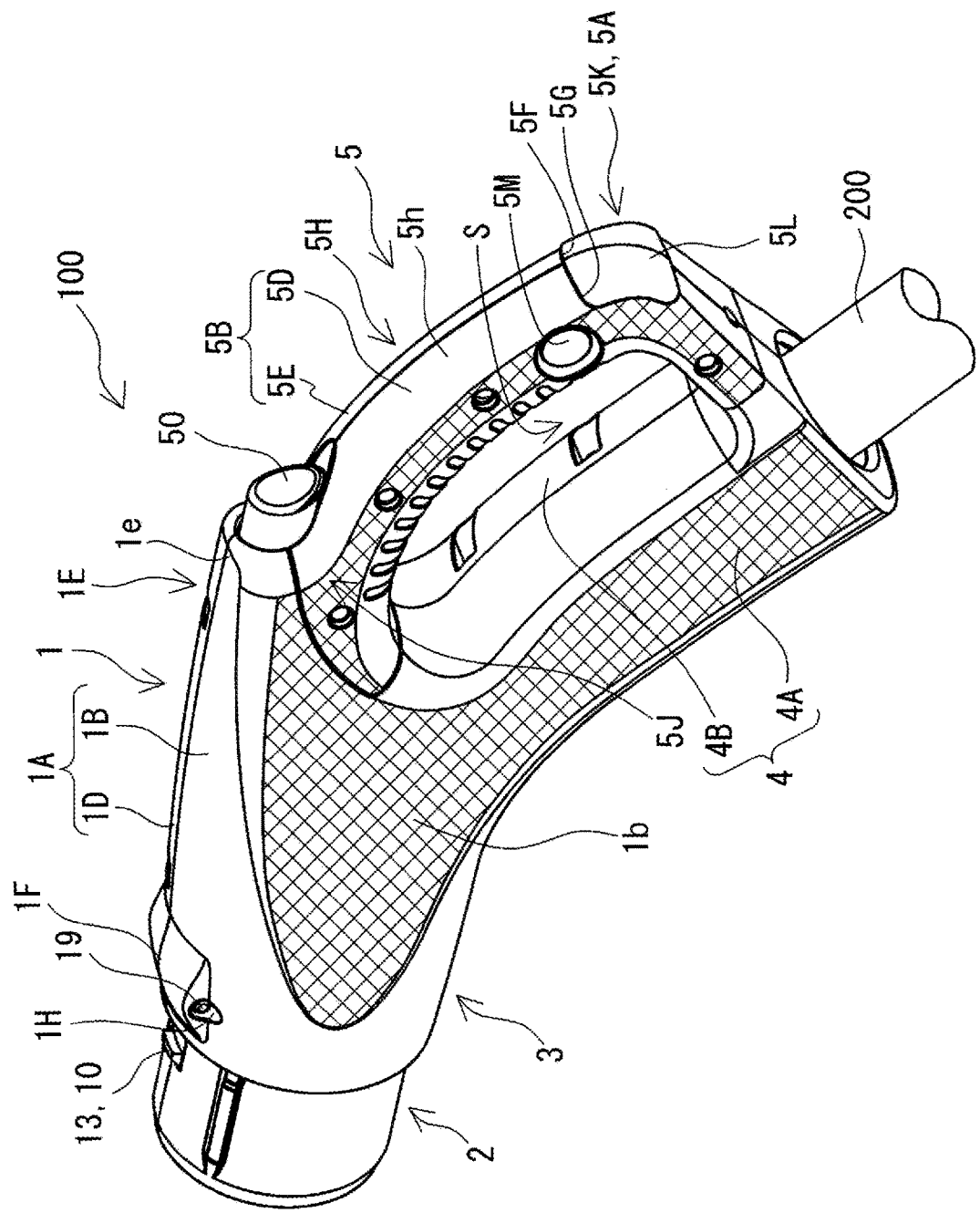
FIG. 1 is a perspective view schematically illustrating a connector according to an embodiment as seen from the left rear side.

Explanation about Embodiments of the Present Disclosure

First, embodiments of the present disclosure are explained.

(1) A connector according to an aspect of an embodiment of the present disclosure is a connector configured to be connected to an inlet of an electric apparatus having a storage battery, the connector including:

a main body portion;

an insertion portion provided on a front side of the main body portion and configured to be inserted into the inlet;

a first arm including a first intermediate portion swingably supported on the main body portion, a first front portion extending from the first intermediate portion to the insertion portion, a hook provided at the first front portion, and a first rear portion provided on a rear side of the first intermediate portion;

a first preloading member configured to preload the first arm such that the hook protrudes from an outer peripheral surface of the insertion portion;

a release member configured to come into contact with the first rear portion such that the first arm is swung in a direction opposite to a preloading direction of the first preloading member;

a solenoid configured to advance or retract the plunger; and a slide member configured to advance or retract in synchronization with an advancing or retracting movement of the plunger, wherein the slide member includes a support piece configured to come into contact with a back surface of the first front portion and a connection piece connecting the plunger and the support piece, the connection piece includes a first connection piece provided on a side of the plunger and a second connection piece provided on a side of the support piece, and the support piece and the first connection piece are provided with a shift in position in a left-and-right direction.

The solenoid moves the support piece in such a manner that the support piece comes into contact with the back surface of the first front portion, so that the above-described connector can directly prevent the hook from retracting from the insertion portion. Therefore, even when a problem such as impact, vibration, damage to the first preloading member, and the like, occurs during feeding, the hook will not retract. Specifically, the engaged state between the hook and the concave portion of the inlet can be reliably prevented from being released. Therefore, the above-described connector is capable of reliably preventing accidental unplugging from the inlet. Also, in the above-described connector, the support piece and the first connection piece are provided with a shift in the left-and-right direction, so that as compared with the case where the support piece and the first connection piece are arranged on the same straight line without a shift in position in the left-and-right direction, the arrangement of other members that are related to the slide member is less likely to be affected. Furthermore, in the above-described connector, a space for containing other members can be readily secured because the support piece and the first connection piece are shifted in the left-and-right direction. Therefore, the above-described connector is highly flexible in the arrangement of components of the connector.

(2) In the above-described connector according to the aspect of the embodiment of the present disclosure, the support piece and the first connection piece may be provided with a shift in a vertical direction.

In the above-described connector, the support piece and the first connection piece are shifted in position in the vertical direction, so that a space can also be secured in the vertical direction. Therefore, the above-described connector has a still higher degree of flexibility in the arrangement of components.

(3) The above-described connector according to the aspect of the embodiment of the present disclosure may further include a guide member formed with a groove configured to guide the first connection piece in a horizontal direction, wherein the insertion portion may include a terminal case containing a terminal, and the guide member and the terminal case may be integrally molded.

In the above-described connector, the groove of the guide member allows the first connection piece to be moved to an appropriate position without shifting in position in the left-and-right direction and the vertical direction. Therefore, the above-described connector moves the support piece such that the support piece comes into contact with an appropriate position of the back surface of the first front portion. In particular, the guide member and the terminal case are integrally molded, so that, as compared with the case where the guide member is separately attached to the terminal case, the guide groove and the terminal case can be positioned at appropriate positions. This is because variation in the attachment of the guide member and the terminal case does not occur. Therefore, in the above-described connector, the first connection piece as well as the support piece move to the appropriate positions.

(4) In the above-described connector according to the aspect of the embodiment of the present disclosure described in (3), the terminal case may include a groove configured to guide the support piece in an advancing-and-retracting direction of the plunger.

In the above-described connector, with the groove, the support piece can be moved so that the support piece comes into contact with an appropriate position of the back surface of the first front portion.

(5) In the above-described connector according to the aspect of the embodiment of the present disclosure, the main body portion may include a left case and a right case that are half-split cases, and the solenoid may be provided on a side of the left case and a side of the right case relative to a boundary between the left case and the right case.

Even if moisture enters the inside of the main body portion from the above-described boundary, the above-described connector can inhibit the water having entered the inside from directly dropping on the solenoid.

(6) The above-described connector according to the aspect of the embodiment of the present disclosure described in (5) may further include:

a second arm including a second intermediate portion swingably supported on the main body portion, a second front portion extending from the second intermediate portion to a boundary between the main body portion and the insertion portion, a protrusion provided on a tip of the second front portion; and a second preloading member configured to preload the second arm such that the protrusion portion protrudes from the boundary between the main body portion and the insertion portion, wherein the first arm and the second arm may be provided side by side, and the solenoid may be provided on an opposite side of the first arm from the second arm in the left-and-right direction.

The above-described connector can alleviate interference between the slide member and the second arm.

Embodiments of the Present Disclosure

The embodiments of the present disclosure are hereinafter explained with reference to drawings. In the drawings, the same reference numerals denote elements of the same names.

First Embodiment

[Connector]

A connector 100 according to the first embodiment is explained with reference to FIG. 1 to FIG. 20. The connector 100 as illustrated in FIG. 1 is connected to an inlet of an electric apparatus having a storage battery not illustrated. An example of an electric apparatus is an electric automobile. The connector 100 is provided at a tip portion of a cable 200 extending from a charger main body not illustrated. The connector 100 includes a main body portion 1, an insertion portion 2 provided on the front side of the main body portion 1, and a handle portion 5 provided on the rear side of the main body portion 1. The cable 200 is introduced into the inside of the main body portion 1 through the rear end of the main body portion 1. The connector 100 includes a first arm 10, a first preloading member 18, a release member 30, a solenoid 40, and a slide member 45. One of the features of the connector 100 according to the present embodiment lies in that the slide member 45 is structured in a particular shape. Each configuration is hereinafter explained in detail. In the following explanation, in the connector 100, the side of the insertion portion 2 is referred to as a front side, and the side of the cable 200 is referred to as a rear side. A direction in which a hook 13 of the first arm 10 is protruding may be referred to as an upper side, and a direction opposite thereto may be referred to as a lower side. Left and right are defined with respect to the connector 100 as seen from the rear side to the front side with the handle portion 5 facing the upper side. A left-and-right direction is a direction extending between left and right.

Main Body Portion

The main body portion 1 is a portion in which the cable 200 is provided and in which mechanical components and structural components of the connector 100 are contained. In this example, the shape of the main body portion 1 is an L shape. The main body portion 1 includes, in the order from the front side to the rear side, a storage unit 3 storing the above-described mechanical components and the above-described electric components and a grip portion 4 holding the cable 200.

Figure 19:
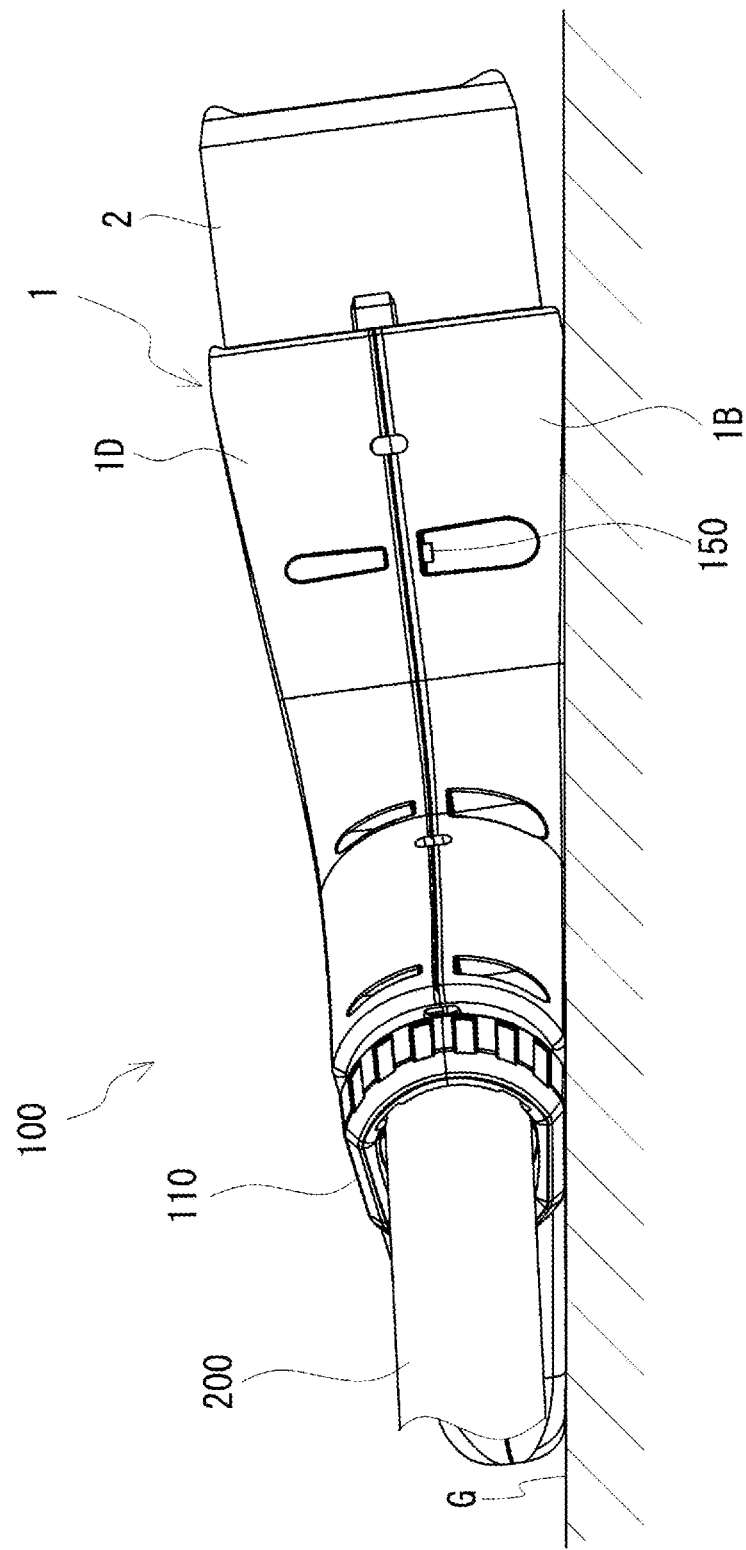
FIG. 19 is a bottom view schematically illustrating the connector according to the first embodiment with the left side surface being placed on the ground.
Figure 20:
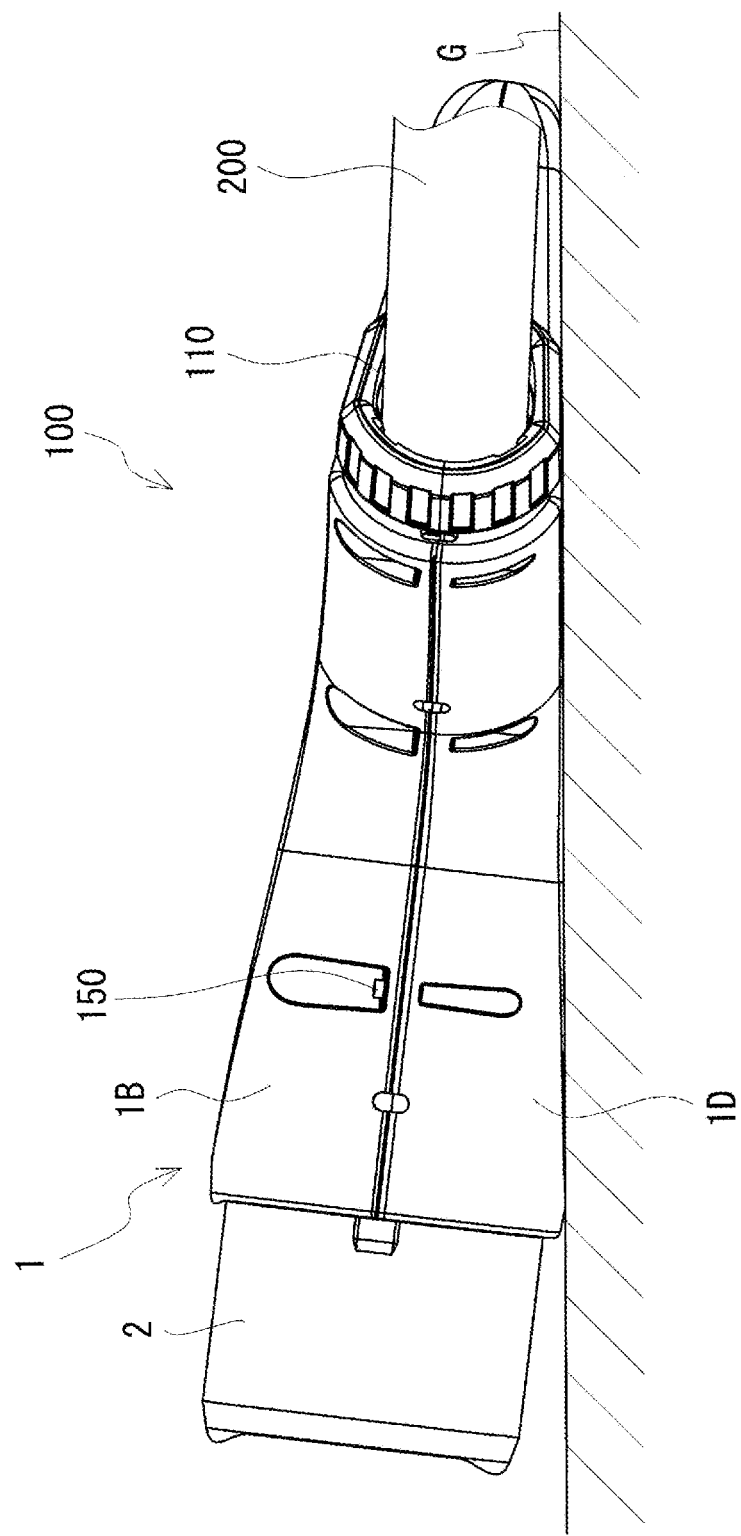
FIG. 20 is a bottom view schematically illustrating the connector according to the first embodiment with the right side surface being placed on the ground.

The main body portion 1 is covered with a main body case 1A. The main body case 1A includes a left case 1B and a right case 1D that are half-split cases. As illustrated in FIG. 19 and FIG. 20, the left case 1B and the right case 1D are combined with each other by fastening them with multiple screws 150. The external shapes of the left case 1B and the right case 1D according to the present embodiment are symmetrical in the left-and-right direction. The left case 1B and the right case 1D according to the present embodiment are explained later in detail.

As illustrated in FIG. 1, the main body portion 1 includes a protruding portion 1F at the upper portion of a tube-shaped front end portion. The protruding portion 1F is a shaft cover portion that covers a shaft 19 explained later in a portion that protrudes to the upper side. The protruding portion 1F is a portion in a gable shape. The protruding portion 1F is constituted by a bulging surface that is bent in a mountain shape and side surfaces located on either side of the bulging surface. The side surface is in a substantially triangular shape along the bent of the bulging surface. The bulging surface is constituted by connecting a pair of inclined surfaces with a ridge portion such that both sides in the axial direction of the above-described tube-shaped front end portion are low and the intermediate portion is high. The side surfaces are arranged side by side to extend in a direction perpendicular to the axial direction of the main body portion 1. A hole, in which the shaft 19 can be inserted from the outside in an insertable and detachable manner, is formed through the respective side surfaces of the protruding portion 1F. The shaft 19 is inserted into this hole through both side surfaces so as to extend therebetween and axially support the first arm 10, and a first intermediate portion 11, explained later, of the first arm 10 is contained in a substantially triangular pillar-shaped space constituted by the above-described bulging surface and the both side surfaces of the protruding portion 1F.

Figure 7:
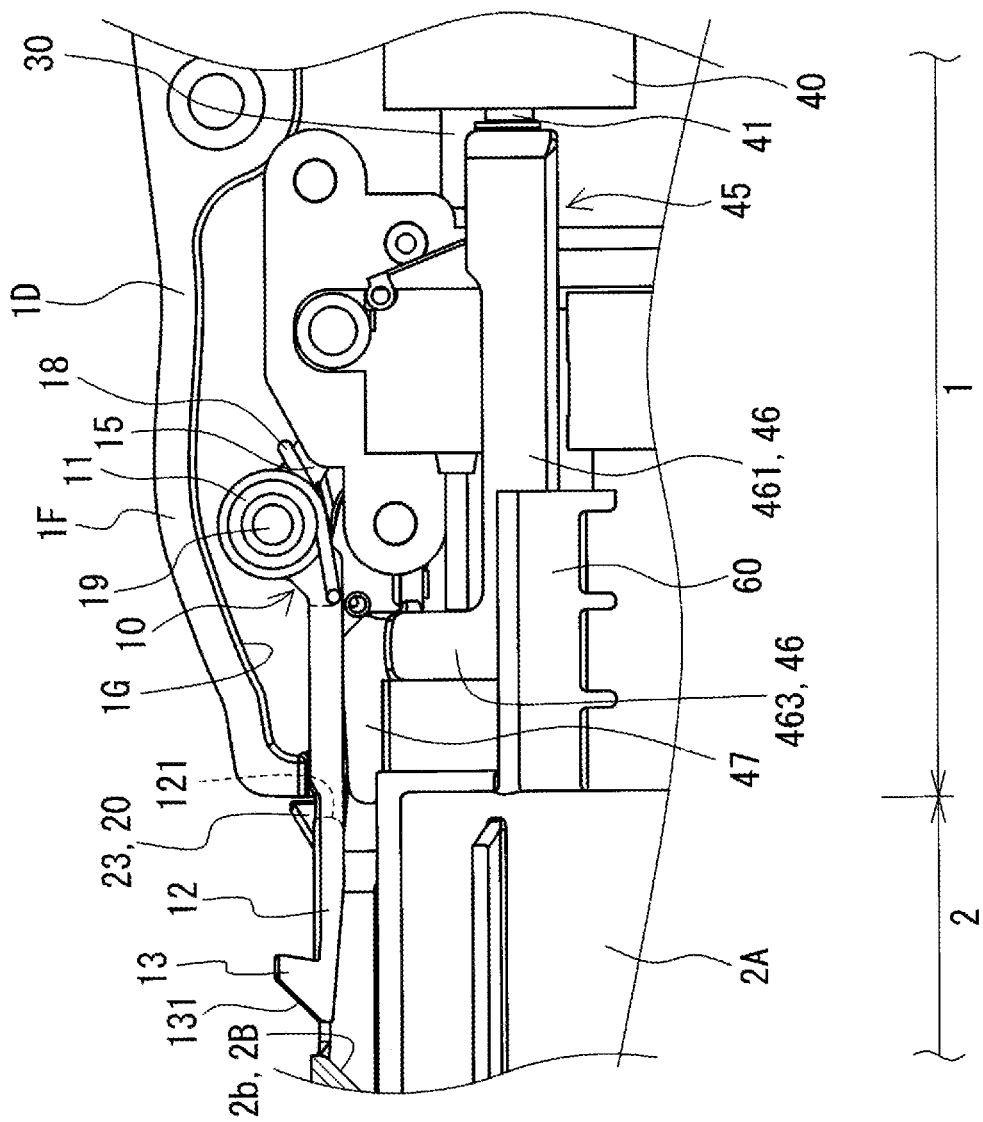
FIG. 7 is a left side view schematically illustrating an essential portion of the internal structure of the connector according to the first embodiment.
Figure 8:
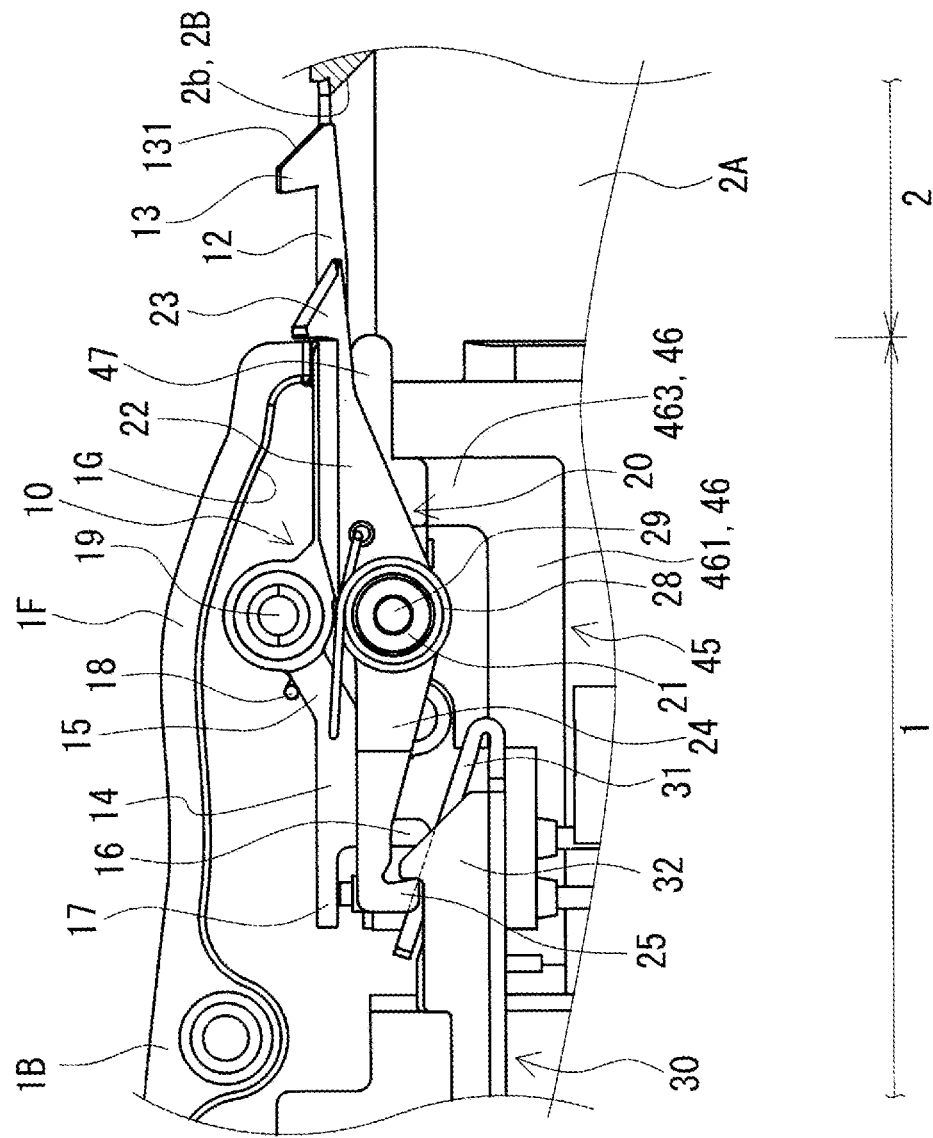
FIG. 8 is a right side view schematically illustrating an essential portion of the internal structure of the connector according to the first embodiment.

A surface, located on the front side of the first intermediate portion 11, of the inner peripheral surface of the protruding portion 1F includes a guiding surface 1G that is inclined toward the main body portion 1 from the main body portion 1 to the front side (FIG. 7 and FIG. 8). In an unplugging operation of the connector 100 non-operating state of the solenoid, the first intermediate portion 11 is guided along the guiding surface 1G, so that the first arm 10 can be guided to the front inner side, which is explained later in detail. A movement margin is provided between the guiding surface 1G and the first intermediate portion 11 to allow the first intermediate portion 11 to move forward. The movement margin allows the first arm 10 to be readily guided to the front side when the shaft 19 is detached from the first intermediate portion 11. The movement margin may be of such a distance that a support piece 47 is inserted into a penetrating hole 121 (FIG. 7) explained later. Accordingly, in the unplugging operation of the connector 100 non-operating state of the solenoid, the penetrating hole 121 can be moved to a position corresponding to the support piece 47.

[Insertion Portion]

Figure 4:
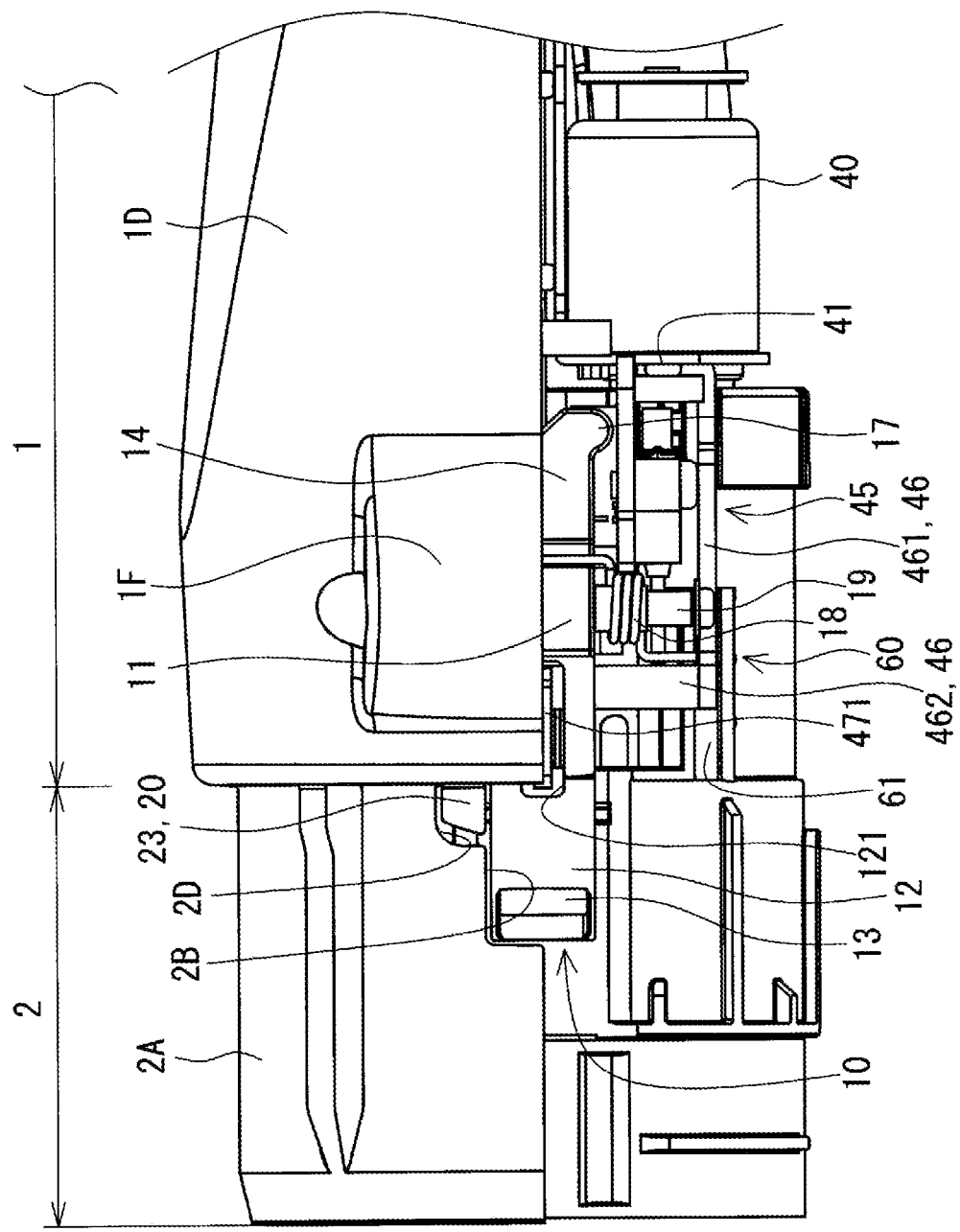
FIG. 4 is a top view schematically illustrating a front portion of the connector according to the first embodiment with a left case detached.

As illustrated in FIG. 1, the insertion portion 2 is a portion that is configured to be inserted into the inlet. In the insertion portion 2, a terminal, not illustrated, is contained in a terminal case 2A. The terminal has, for example, a terminal arrangement compliant with a specification such as JEVS G 105-1993 and the like, and explanation thereabout is omitted. As illustrated in FIG. 4, the terminal case 2A has a notch 2B. As illustrated in FIG. 7, the notch 2B allows the hook 13 to be exposed from the outer peripheral surface of the insertion portion 2.

A surface, facing the end of the first arm 10, of an opening surface formed by the notch 2B in the insertion portion 2 includes a guide surface 2b. The guide surface 2b is inclined in the same direction as a sliding contact surface 131 of the hook 13 explained later. Because the guide surface 2b is provided in addition to the guiding surface 1G and the above-described movement margin, in the unplugging operation of the connector 100 in the non-operating state of the solenoid, the sliding contact surface 131 comes into sliding contact with the guide surface 2b, and the tip portion of the first arm 10 is guided on the inner peripheral surface of the insertion portion 2. Accordingly, the support piece 47 can be inserted into the penetrating hole 121. The guide surface 2b is preferably inclined to be substantially parallel with the sliding contact surface 131. This is because the sliding contact surface 131 can readily come into sliding contact with the guide surface 2b, and the tip portion of the first arm 10 is readily guided on the inner peripheral surface of the insertion portion 2.

Figure 5:
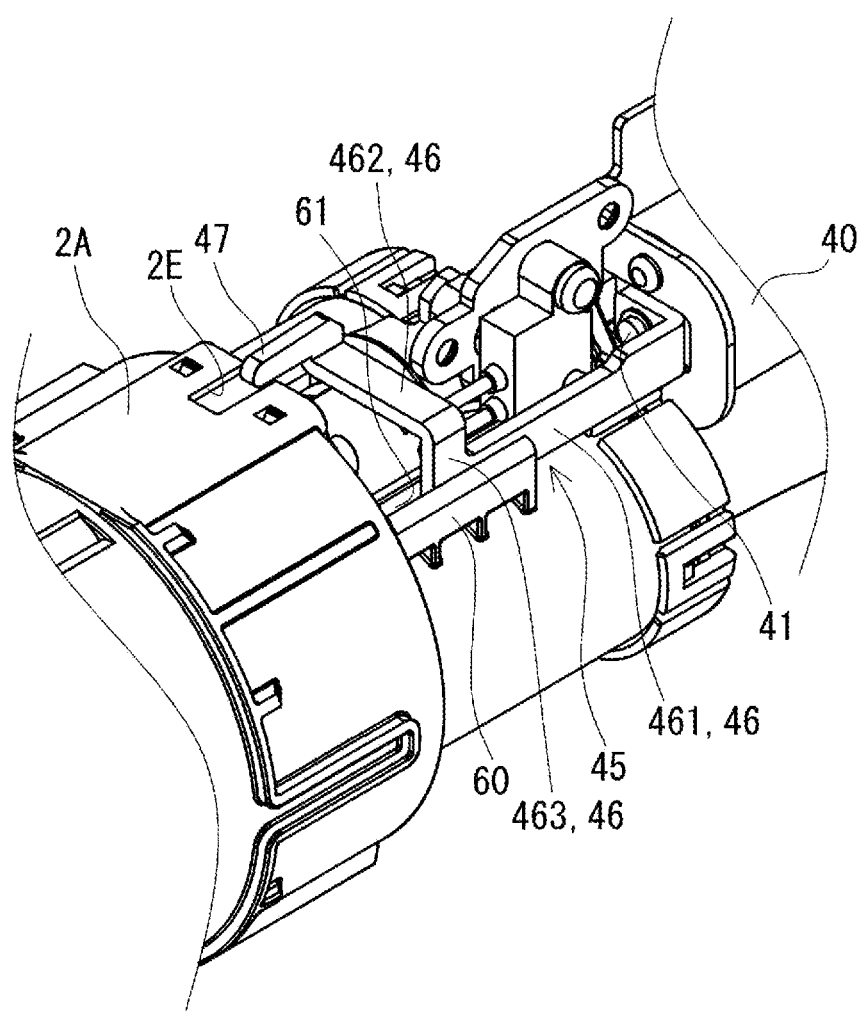
FIG. 5 is a perspective view schematically illustrating a portion of an internal structure of a left front side of the connector according to the first embodiment.

As illustrated in FIG. 5, the terminal case 2A preferably includes a groove 2E. The groove 2E guides the support piece 47 in the horizontal direction. According to this groove 2E, the support piece 47 can be moved to an appropriate position.

[Handle Portion]

As illustrated in FIG. 1, the handle portion 5 is a portion that is grabbed by the user. The shape of the handle portion 5 in the side view of the handle portion 5 is a C shape. The handle portion 5 is connected to the front and rear of the main body case 1A so as to form a space S in which a hand of the user of the connector 100 can be inserted between the handle portion 5 and the main body case 1A. The first end portion of the handle portion 5 is formed to extend along the upper surface of the main body portion 1, and the second end portion is connected to the rear end of the main body portion 1. A push button switch 50 is provided on the upper portion of the handle portion 5 so that a part of the push button switch 50 is exposed. An LED lamp 5M is embedded in the left-and-right side surface on the second end portion side of the handle portion 5.

[Internal Structure]

The internal structure of the connector 100 is explained mainly with reference to FIG. 2 to FIG. 8. Any of FIG. 2 to FIG. 8 indicates an initial state before the connector 100 is inserted and fitted in the inlet.

(First Arm)

The first arm 10 is a member that is fitted in and detached from the inlet. The first arm 10 according to the present embodiment is a flat plate-shaped member. The first arm 10 extends from the main body portion 1 to the insertion portion 2. The first arm 10 includes the first intermediate portion 11, a first front portion 12, the hook 13, and a first rear portion 14.

First Intermediate Portion

The first intermediate portion 11 is swingably supported on the main body portion 1 about the shaft 19. The first intermediate portion 11 is formed in a circular tubular shape having a shaft hole. The shaft 19 is inserted into this shaft hole. The shaft 19 is inserted into a shaft insertion portion 1H (FIG. 1). In the present embodiment, the shaft insertion portion 1H is provided in the protruding portion 1F. The shaft 19 may be in any configuration so long as the shaft 19 can be inserted and detached at the outside. For example, the shaft 19 may be a combination of a female member with a female screw formed at least on one end of a body in a shape of a rod such as a cylindrical pillar or circular tube and a male member such as a male screw screwed into the female screw. However, for example, in a case where a male screw is used for the male member, it is preferable to use a male screw having a special groove formed on its head, instead of a generally-available male screw having a minus or plus-shaped groove formed on its head, so that the shaft 19 can be inserted and detached at the outside of the main body portion 1 but the shaft 19 cannot be easily tampered and detached by mischief. Examples of special grooves include grooves having star and polygonal shapes.

The position of the center axis of the first intermediate portion 11 is higher than the upper surface of the first front portion 12. Therefore, when the hook 13 is engaged on the concave portion provided in the inner peripheral surface of the inlet, the force of the hook 13 can be readily applied to the above-described concave portion, and it is less likely that the hook 13 is unwantedly unlatched from the above-described concave portion. The center axis of the first intermediate portion 11 is preferably configured such that a straight line connecting the center axis of the first intermediate portion 11 and the tip of the hook 13 is substantially at a position along the horizontal direction.

First Front Portion

Figure 6:
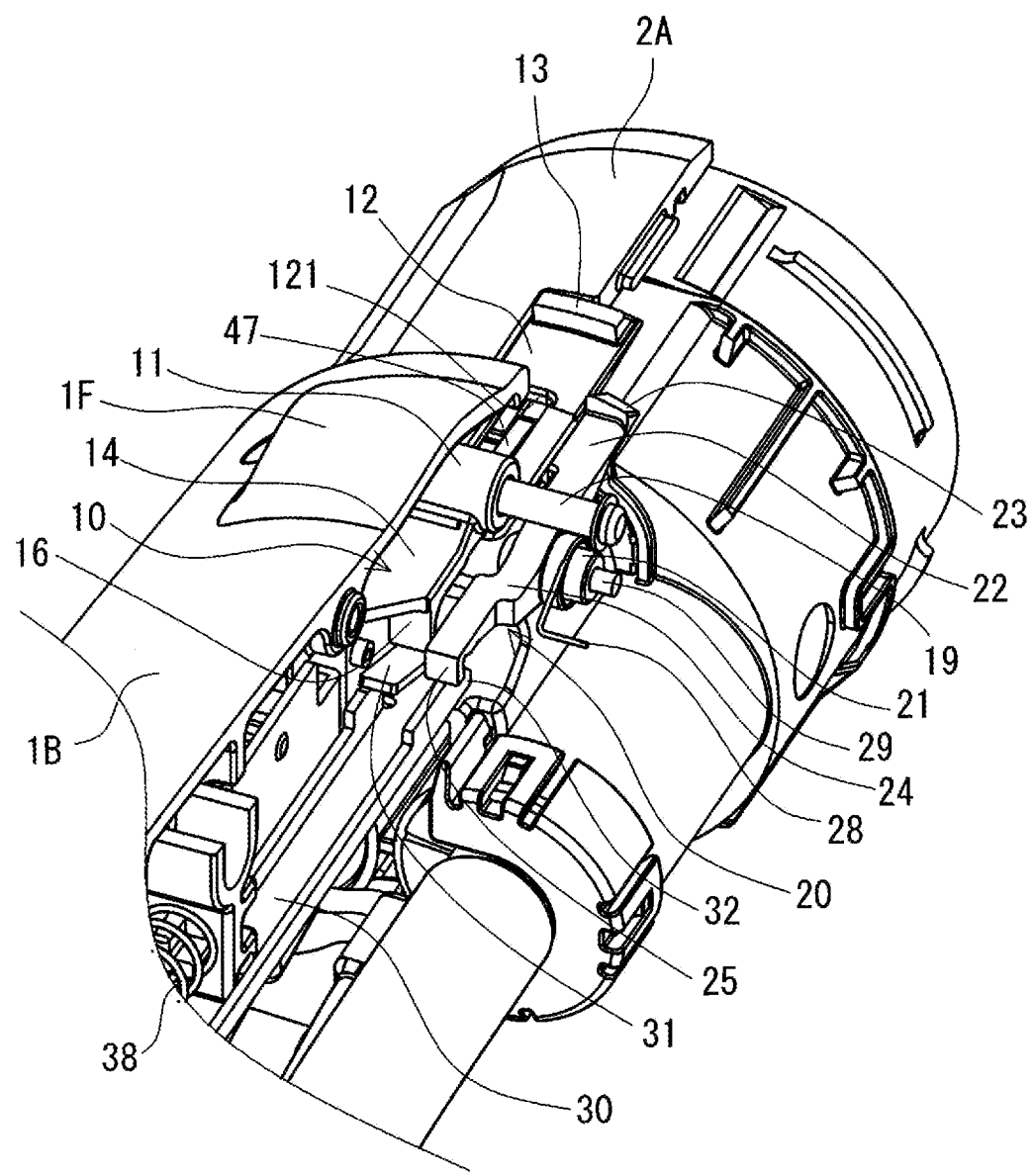
FIG. 6 is a perspective view schematically illustrating an internal structure of the connector according to the first embodiment as seen from the right rear side.

The first front portion 12 extends from the first intermediate portion 11 toward the insertion portion 2. In the present embodiment, the penetrating hole 121 is formed in a center portion of the first front portion 12 (FIG. 4, FIG. 6, and FIG. 7). The penetrating hole 121 according to the present embodiment is a hole penetrating the first front portion 12 in the vertical direction. Alternatively to the configuration of the present embodiment, instead of the penetrating hole 121, a concave portion obtained by cutting a portion of the lower surface of the first front portion 12 may be formed in the first front portion 12.

Hook

The hook 13 protrudes from the outer peripheral surface of the insertion portion 2. In the present embodiment, the hook 13 is provided integrally with the tip of the first front portion 12. The hook 13 protrudes from the notch 2B to the upper side. The hook 13 protrudes from the upper surface of the first front portion 12 to the upper side. The hook 13 is formed in a wedge shape having an inclined surface that becomes thinner toward the tip side of the first front portion 12. When the insertion portion 2 is inserted all the way into the inlet, the hook 13 is located at a position of the inlet corresponding to the above-described concave portion. The hook 13 is located at the front side of a protrusion portion 23 of a second arm 20, explained later.

First Rear Portion

As illustrated in FIG. 8, the first rear portion 14 is provided to extend from the first intermediate portion 11 to the rear side. The first rear portion 14 includes a pressing portion 15, a rear end portion 16, and a bulging portion 17. One end of the first preloading member 18 is pressed against the pressing portion 15. The pressing portion 15 is formed to be inclined from the first intermediate portion 11 to the lower side that is the inner side in the diameter direction of the main body portion 1. The rear end portion 16 is connected to the rear side of the pressing portion 15. The rear end portion 16 is bent in an L shape to protrude toward the inner side in the diameter direction of the main body portion 1. As illustrated in FIG. 4, the bulging portion 17 is connected to the left side of the rear end portion 16 so as to protrude to the left side of the rear end portion 16.

(First Preloading Member)

The first preloading member 18 preloads the first arm 10 so that the hook 13 protrudes from the outer peripheral surface of the insertion portion 2. For example, the first preloading member 18 is a torsion spring and the like. In the present embodiment, the torsion spring is provided in a coaxial manner on the shaft 19. A first end portion presses of the torsion spring is pressed against the upper surface of the pressing portion 15, and a second end portion of the torsion spring is fixed to the main body portion 1. Swinging of the first arm 10 with the first preloading member 18 is tolerated to such an extent that the first front portion 12 comes into contact with the inner peripheral surface of the main body portion 1.

(Second Arm)

As illustrated in FIG. 4, FIG. 6, and FIG. 8, the second arm 20 is a member for confirming that the insertion portion 2 is inserted into the inlet. The second arm 20 is a rod-shaped member. The first arm 10 and the second arm 20 are arranged side by side at the left and right. The second arm 20 includes a second intermediate portion 21, a second front portion 22, a protrusion portion 23, and a second rear portion 24.

Second Intermediate Portion

The second intermediate portion 21 is swingably supported on the main body portion 1 about the shaft 29. The second intermediate portion 21 is formed in a circular tubular shape having a shaft hole. A shaft 29 is inserted into this shaft hole. The shaft 29 supporting the second intermediate portion 21 is a shaft that is different from the shaft 19 supporting the first intermediate portion 11. The shaft 29 is fixed to the main body portion 1.

Second Front Portion

The second front portion 22 extends from the second intermediate portion 21 to the boundary between the main body portion 1 and the insertion portion 2.

Protrusion Portion

The protrusion portion 23 protrudes to the outside from the boundary between the main body portion 1 and the insertion portion 2. The protrusion portion 23 can protrude to the upper side from a notch 2D (FIG. 4) formed in the insertion portion 2. The protrusion portion 23 is provided integrally with the tip of the second front portion 22. The protrusion portion 23 protrudes to the upper side from the upper surface of the tip portion of the second front portion 22. The protrusion portion 23 is formed in a wedge shape having an inclined surface that becomes thinner toward the tip side of the second front portion 22. When the insertion portion 2 is inserted all the way into the inlet, the protrusion portion 23 is located at a position that comes into contact with the periphery of the inlet.

Second Rear Portion

The second rear portion 24 is provided to extend to the rear side from the second intermediate portion 21. The rear end portion 25 of the second rear portion 24 is bent in an L shape to protrude toward the lower side.

(Second Preloading Portion)

A second preloading member 28 preloads the second arm 20 so that the protrusion portion 23 protrudes from the outer peripheral surface of the insertion portion 2. For example, the second preloading member 28 is a torsion spring. In the present embodiment, the torsion spring is provided in a coaxial manner on the shaft 29. The first end portion of the torsion spring is fixed to the second arm 20, and the second end portion of the torsion spring is fixed to the main body portion 1. Swinging of the second arm 20 with the second preloading member 28 is tolerated to such an extent that the second front portion 22 comes into contact with the inner peripheral surface of the main body portion 1.

(Release Member)

The release member 30 is a member configured to release engagement of the hook 13 with the above-described concave portion of the inlet. The release member 30 is a rod-shaped member. The release member 30 extends in a front-and-rear direction (longitudinal direction) on the rear side with respect to the first rear portion 14. The release member 30 is parallel to the first arm 10. In the present embodiment, the rear end portion of the release member 30 is connected to a push button switch 50. Alternatively to the present embodiment, the rear end portion of the release member 30 may be connected to a slide switch 51 of FIG. 21. The release member 30 is supported on the main body portion 1 so as to advance or retract in synchronization with advancement and retraction of the push button switch 50. The release member 30 includes a pushing contact portion 31 and a contact-and-stopping portion 32 (FIG. 3, 6, 8) at the tip.

Pushing Contact Portion

The pushing contact portion 31 pushes up the rear end portion 16 by coming into contact with the rear end portion 16, when the release member 30 advances to the advancement limit. When the rear end portion 16 is pushed up, the first arm 10 is swung in a direction opposite to the preloading direction of the first preloading member 18. According to this swinging in the opposite direction, the hook 13 retracts to the inside of the insertion portion 2. When the hook 13 retracts to the inside of the insertion portion 2, the engagement between the hook 13 and the concave portion of the inlet is released. The pushing contact portion 31 is formed in a wedge shape having an inclined surface that becomes thinner toward the tip side.

Contact-and-Stopping Portion

Figure 2:
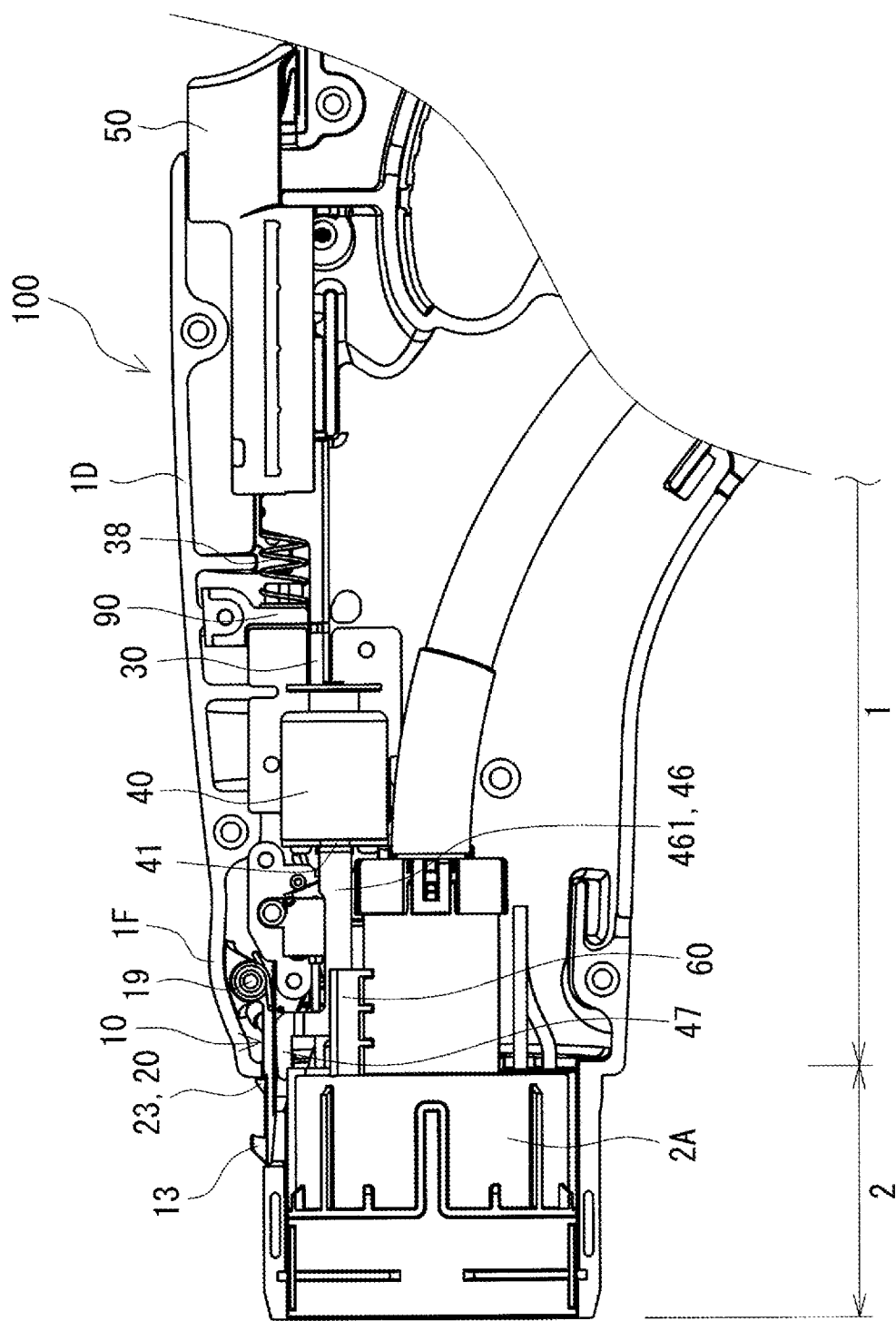
FIG. 2 is a left side view schematically illustrating an internal structure of a connector according to a first embodiment.
Figure 3:
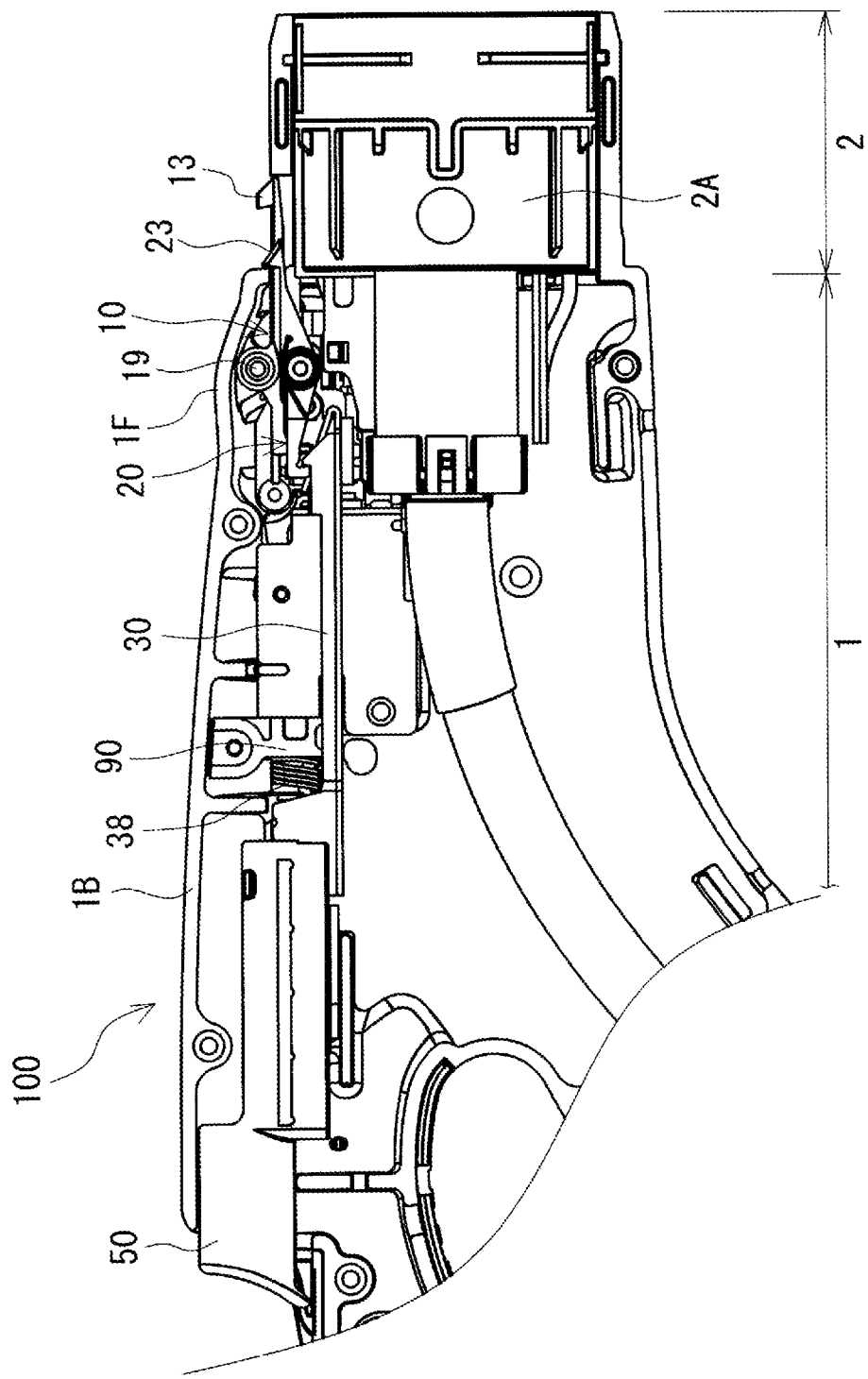
FIG. 3 is a right side view schematically illustrating the internal structure of the connector according to the first embodiment.

When the release member 30 advances to a position before the advancement limit, a contact-and-stopping portion 32 is caught on the rear end portion 25, so that the advancement and retraction of the release member 30 by a third preloading member 38, explained later, is inhibited. When the position of the contact-and-stopping portion 32 is at a position of being caught on the rear end portion 25, the pushing contact portion 31 does not come into contact with the rear end portion 16. When the position of the contact-and-stopping portion 32 is at a position on the front side of the rear end portion 25, the pushing contact portion 31 comes into contact with the rear end portion 16. The contact-and-stopping portion 32 is provided side by side with the pushing contact portion 31. The pushing contact portion 31 includes an upper surface inclined toward the tip side. When the release member 30 advances, the release member 30 can pass the rear end portion 25 by pushing up the rear end portion 25, because the upper surface of the contact-and-stopping portion 32 is inclined. When the contact-and-stopping portion 32 passes the rear end portion 25, the contact-and-stopping portion 32 is caught on the rear end portion 25, as the second preloading member 28 preloads the rear end portion 25 downward. Because the contact-and-stopping portion 32 is caught on the rear end portion 25, the advancement and retraction of the release member 30 is inhibited against the preloading by the third preloading member 38 (FIG. 2, FIG. 3). In other words, the release member 30 and the push button switch 50 are fixed in the advanced state. Also, when the insertion portion 2 is inserted all the way into the inlet, and the protrusion portion 23 comes into contact with and is pushed by the periphery of the inlet, the second arm 20 swings so that the rear end portion 25 moves upward. According to this swinging, the caught state between the contact-and-stopping portion 32 and the rear end portion 25 is released, and the release member 30 and the push button switch 50 are preloaded by the third preloading member 38 and retract to the retraction limit.

(Third Preloading Member)

As illustrated in FIGS. 2 and 3, the third preloading member 38 preloads the push button switch 50 in a retraction direction. For example, the third preloading member 38 is a compression spring. In the present embodiment, the first end portion of the compression spring is fixed to a support plate 90 fixed to the main body portion 1, and the second end portion is fixed to the front end of the push button switch 50. The compression spring is attached so as to preload the push button switch 50 to the rear side.

(Solenoid)

As illustrated in FIG. 2, FIG. 4, and FIG. 5, the solenoid 40 includes a plunger 41. The solenoid 40 advances or retracts the plunger 41. When the solenoid 40 is energized and driven, the plunger 41 is moved in a direction by an internal electromagnetic coil, and when the solenoid 40 is not energized, the solenoid 40 moves the plunger 41 back to its original position by an internal spring. In the present embodiment, when the solenoid 40 is energized and driven, the solenoid 40 advances the plunger 41, and when the solenoid 40 is not energized, the solenoid 40 retracts the plunger 41. The electromagnetic coil and the spring are not illustrated. The solenoid 40 is provided on the rear side of the first arm 10. In the present embodiment, the solenoid 40 is provided closer to one of the left case 1B and the right case 1D than is the boundary between the left case 1B and the right case 1D. Therefore, even if moisture enters the inside of the main body portion 1 from the boundary between the left case 1B and the right case 1D, the water having entered the inside can be inhibited from directly dropping on the solenoid 40. In the present embodiment, the solenoid 40 is provided on an opposite side of the first arm 10 from the second arm 20. Specifically, the solenoid 40 is provided closer to the side of the left case 1B. Therefore, the interference between the slide member 45 and the second arm 20 can be inhibited. The plunger 41 moves in parallel with the extension direction of the first arm 10. Specifically, the plunger 41 moves horizontally in the front-and-rear direction. In the initial state, the plunger 41 is not energized.

(Slide Member)

As illustrated in FIG. 5, the slide member 45 advances or retracts in synchronization with the advancement and retraction of the plunger 41. The slide member 45 includes a support piece 47 and a connection piece 46. The support piece 47 is a member corresponding to a pressing piece in the above-described reference document 1 and the like. The support piece 47 is provided at the tip of the connection piece 46. The support piece 47 and the connection piece 46 are connected integrally. The connection piece 46 connects the support piece 47 and the plunger 41. In the present embodiment, the connection piece 46 includes a first connection piece 461, a second connection piece 462, and a third connection piece 463. The first connection piece 461 is connected to the plunger 41. In the present embodiment, the first connection piece 461 extends in the advancing-and-retracting direction of the plunger 41, i.e., the front-and-rear direction. The first connection piece 461 is provided in the groove 61 of a guide member 60 explained later. The second connection piece 462 is connected to the support piece 47. In the present embodiment, the second connection piece 462 extends in the left-and-right direction. The third connection piece 463 connects the first connection piece 461 and the second connection piece 462. In the present embodiment, the third connection piece 463 extends in the vertical direction. Specifically, the support piece 47 and the first connection piece 461 are arranged with a shift in position in the left-and-right direction and the vertical direction.

When the solenoid 40 is not energized, i.e., when the plunger 41 retracts, the support piece 47 is located at a position facing the penetrating hole 121. Therefore, when the hook 13 is pushed in, the support piece 47 is inserted into the penetrating hole 121 in a loosely fit state. When the solenoid 40 is energized and driven, i.e., when the plunger 41 advances, the support piece 47 advances to the side of the hook 13 to be out of the penetrating hole 121. The support piece 47 that has shifted in position is located at a position in contact with the lower surface, i.e., the back surface of the first front portion 12. The back surface of the first front portion 12 means a surface that is on the opposite side from the side to which the hook 13 protrudes. When the support piece 47 supports the lower surface of the first front portion 12, the hook 13 is inhibited from retracting. Specifically, the hook 13 is maintained in a state of protruding from the outer peripheral surface of the insertion portion 2. Therefore, when the hook 13 engages with the concave portion of the inlet, this engaged state can be maintained. The support piece 47 is preferably tapered to become thinner toward the tip and the corner of tip is preferably rounded, so that the support piece 47 can readily advance to the position in contact with the lower surface of the first front portion 12.

(Guide Member)

As illustrated in FIG. 2, FIG. 5, and FIG. 7, the guide member 60 constitutes a groove 61 configured to guide the first connection piece 461 in the horizontal direction. The groove 61 guides the first connection piece 461 in the horizontal direction, so that the support piece 47 is guided in the horizontal direction, and the support piece 47 can be appropriately brought into contact with the lower surface of the first front portion 12. In the present embodiment, the guide member 60 is formed in the U shape. The guide member 60 and the terminal case 2A are integrally molded. The guide member 60 and the terminal case 2A are integrally molded, so that the position of the support piece 47 is likely to be positioned at an appropriate position.

An insertion operation of the connector 100 to the inlet and an operation of the internal structure in an unplugging operation from the inlet are explained mainly with reference to FIG. 7 to FIG. 17.

As illustrated in FIGS. 7 and 8, in the initial state before the insertion portion 2 is inserted, the hook 13 and the protrusion portion 23 protrude from the insertion portion 2 according to the preloading of the first preloading member 18 and the second preloading member 28. The contact-and-stopping portion 32 is caught on the second rear portion 24, so that the advancement and retraction of the release member 30 is inhibited against the preloading of the third preloading member 38. Specifically, the push button switch 50 is fixed in a one-step-pushed state toward the side of the insertion portion 2.

[Insertion Operation]

Figure 9:
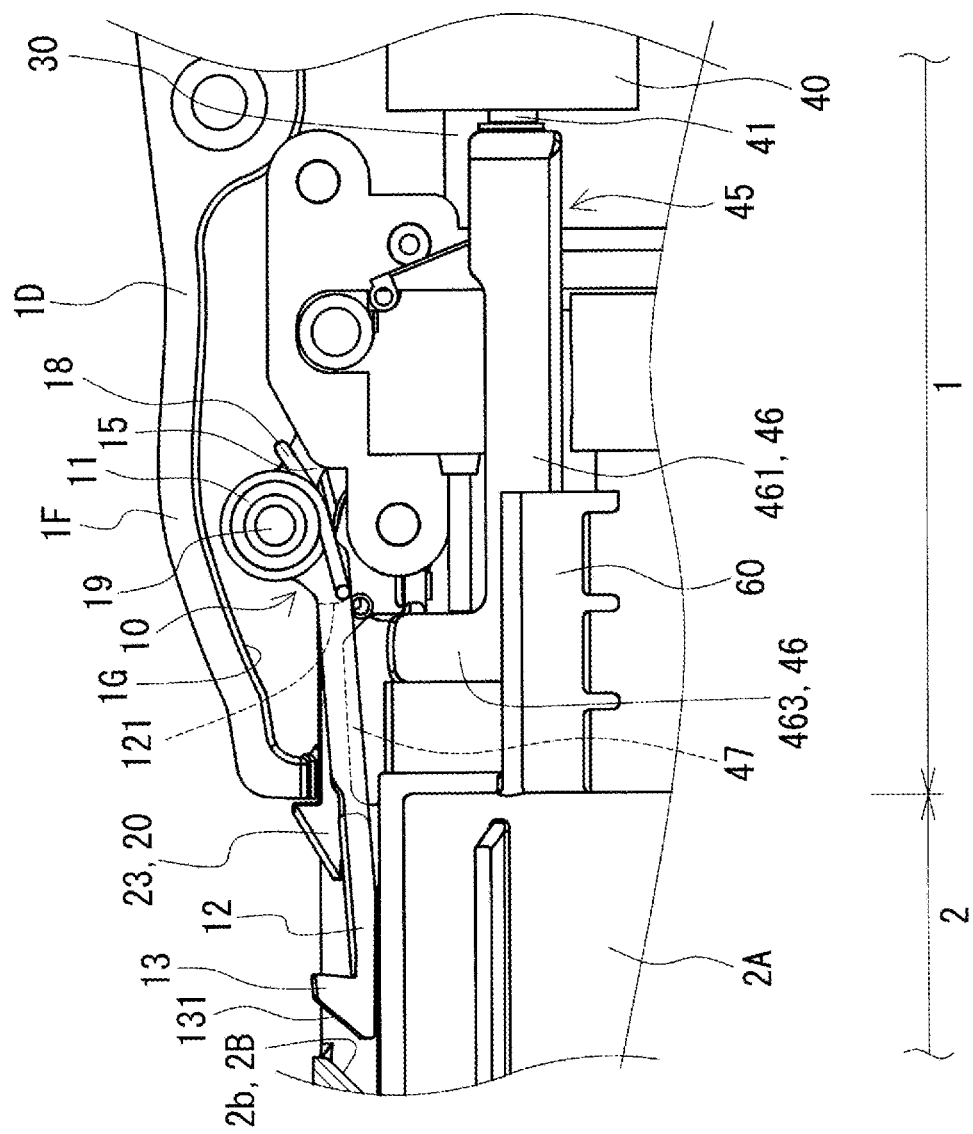
FIG. 9 is a left side view schematically illustrating an essential portion of the internal structure of the connector according to the first embodiment.

As illustrated in FIG. 9, when the insertion portion 2 is inserted into the inlet, the hook 13 comes into contact with the inner peripheral surface of the inlet. The hook 13 is pushed in against the preloading of the first preloading member 18. The hook 13 includes an inclined surface, and therefore, even when the hook 13 protrudes from the insertion portion 2, the hook 13 can be readily inserted into the inlet.

Figure 10:
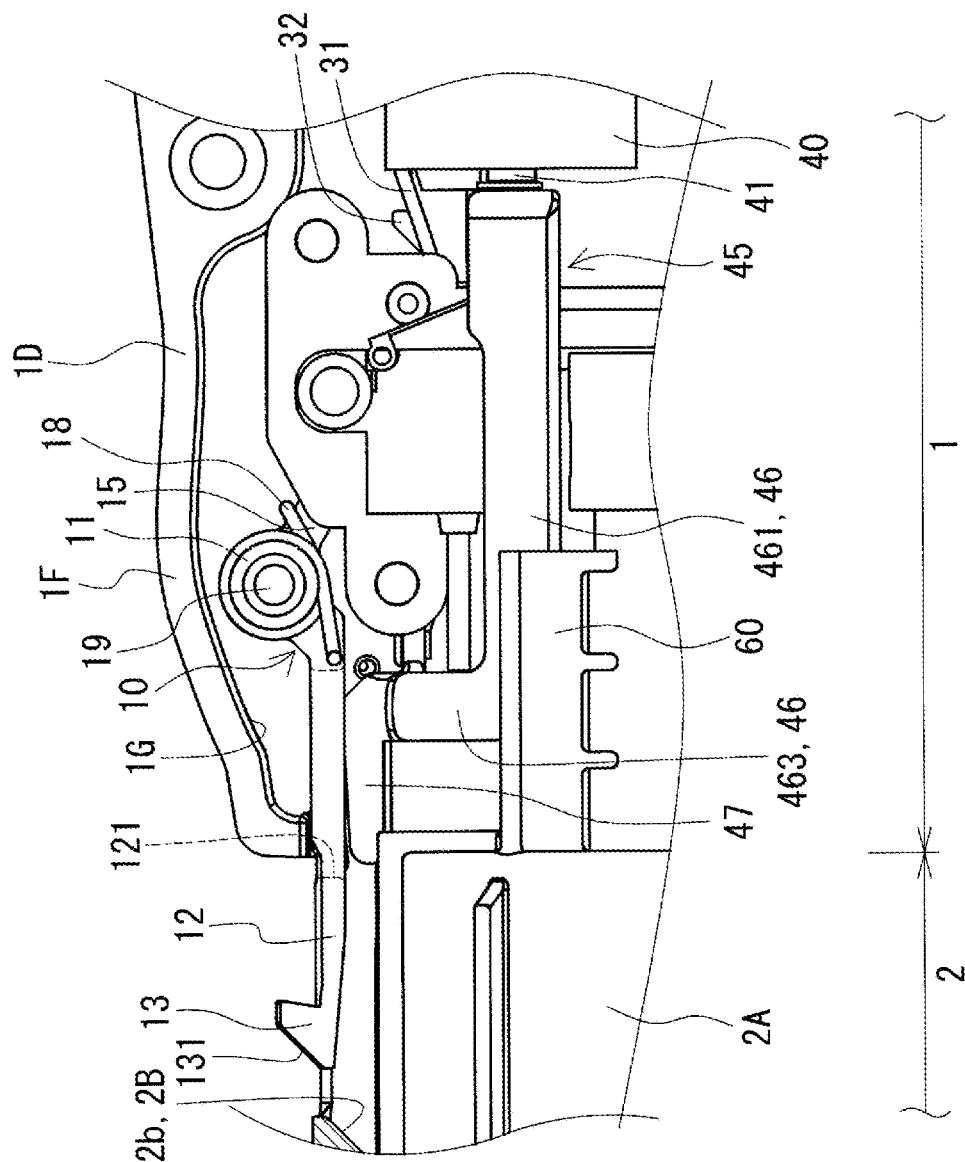
FIG. 10 is a left side view schematically illustrating an essential portion of the internal structure of the connector according to the first embodiment.
Figure 11:
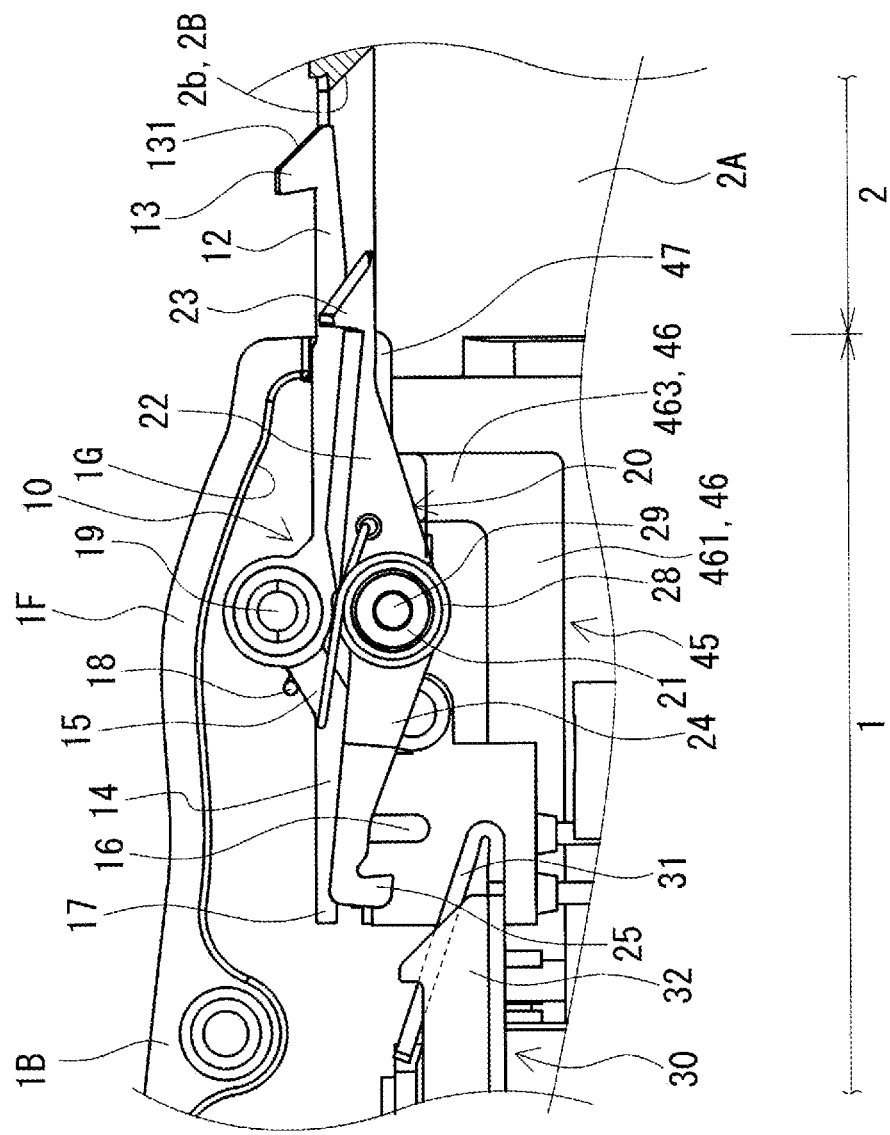
FIG. 11 is a right side view schematically illustrating an essential portion of the internal structure of the connector according to the first embodiment.

When the insertion portion 2 is inserted all the way into the inlet, the protrusion portion 23 comes into contact with the periphery of the inlet. As illustrated in FIG. 11, the protrusion portion 23 is pushed in against the preloading by the second preloading member 28. The protrusion portion 23 includes the inclined surface, and therefore, even when the protrusion portion 23 protrudes from the insertion portion 2, the protrusion portion 23 can be readily inserted into the inlet until the main body portion 1 comes into contact with the back of the inlet. When the protrusion portion 23 is pushed in, the second arm 20 swings so that the rear end portion 25 moves upward. According to this swinging, the caught state between the contact-and-stopping portion 32 and the rear end portion 25 is released. Then, as illustrated in FIGS. 2 and 3, the push button switch 50 retracts to the retraction limit according to the preloading of the third preloading member 38. In synchronization with this retract, the release member 30 retracts. As illustrated in FIGS. 10 and 11, the hook 13 is located at a position corresponding to the concave portion of the inlet, and the hook 13 protrudes from the outer peripheral surface of the insertion portion 2 according to the preloading of the first preloading member 18. The protruding hook 13 is normally engaged with the concave portion of the inlet, and the connector 100 and the inlet are made into a completely fitted state. Accordingly, the insertion operation of the connector 100 into the inlet is completed. In this case, an electrical connection of terminals between the connector 100 and the inlet is established.

Figure 12:
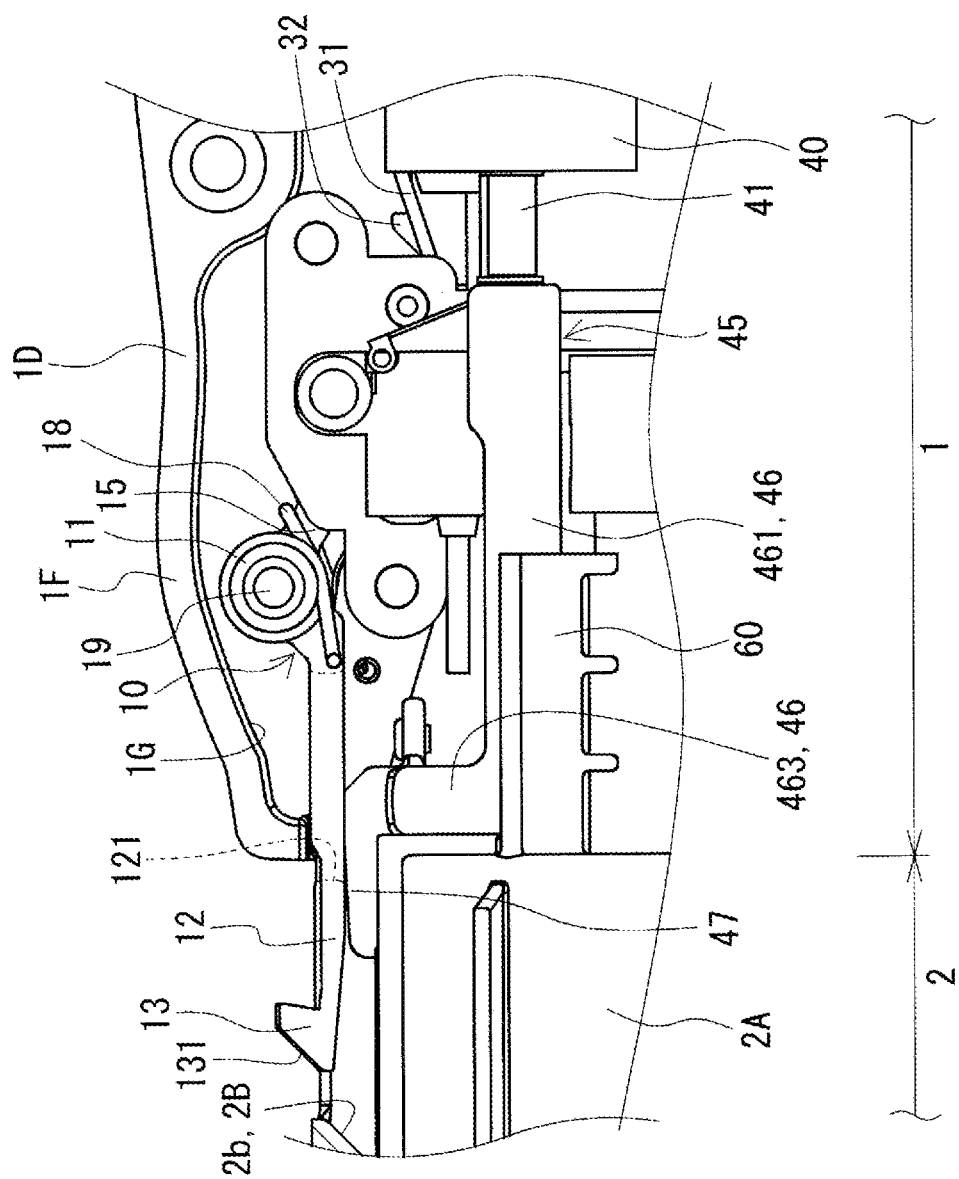
FIG. 12 is a left side view schematically illustrating an essential portion of the internal structure of the connector according to the first embodiment.

In the engaged state between the hook 13 and the concave portion of the inlet, the solenoid 40 is energized and driven. As illustrated in FIG. 12, the plunger 41 advances, and in synchronization with the advancement, the connection piece 46 and the support piece 47 advance. Because the guide member 60 is provided, the first connection piece 461 can be moved along the groove 61. The support piece 47 advances to a position that is shifted in position from the penetrating hole 121 on the lower surface of the first front portion 12. As illustrated in FIG. 5, the groove 2E is provided in the terminal case 2A, so that the support piece 47 can be moved along the groove 2E. According to the groove 61 and the groove 2E, the support piece 47 can readily advance to an accurate position in the horizontal direction. In addition, the upper surface of the support piece 47 is inclined, so that the support piece 47 can readily advance to come into contact with the lower surface of the first front portion 12. As illustrated in FIG. 12, the lower surface of the first front portion 12 comes into contact with the support piece 47, and accordingly, swinging of the first arm 10 is regulated with the hook 13 protruding from the insertion portion 2. In other words, the hook 13 is locked. Therefore, the hook 13 does not retract from the insertion portion 2, and this can reliably prevent the engaged state between the hook 13 and the concave portion of the inlet from being released.

The solenoid 40 starts to be energized, for example, when feeding from the charger main body to the vehicle starts. Accordingly, during the feeding, the user can be reliably prevented from accidentally unplugging the connector 100 from the inlet, and the connector 100 can be reliably prevented from falling off from the inlet. While the solenoid 40 is energized, the LED lamp 5M (FIG. 1) is illuminated.

Figure 18:
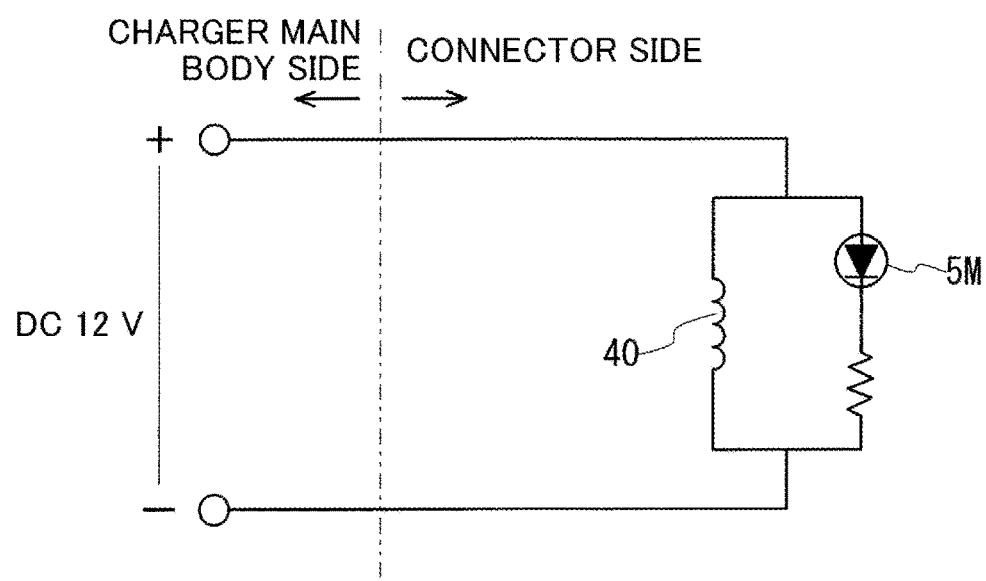
FIG. 18 is a schematic diagram of a circuit for providing power from a charger to a solenoid.

FIG. 18 illustrates an example of a circuit for energizing the solenoid 40 from the charger main body. In this circuit, the solenoid 40 and the LED lamp 5M are connected in parallel, and a driving signal energizing the solenoid 40 from the charger main body is provided, so that the solenoid 40 is driven, and the LED lamp 5M is illuminated.

[Unplugging Operation]
(In Normal State)

When energization of the solenoid 40 stops, the plunger 41 retracts. In synchronization with the retraction, the connection piece 46 and the support piece 47 retract. As illustrated in FIG. 7, the support piece 47 returns to the original position, i.e., the lower side of the penetrating hole 121. Therefore, the above-described locked state of the hook 13 is released. The solenoid 40 stops being energized, for example, when feeding from the charger main body to the vehicle ends.

Figure 13:
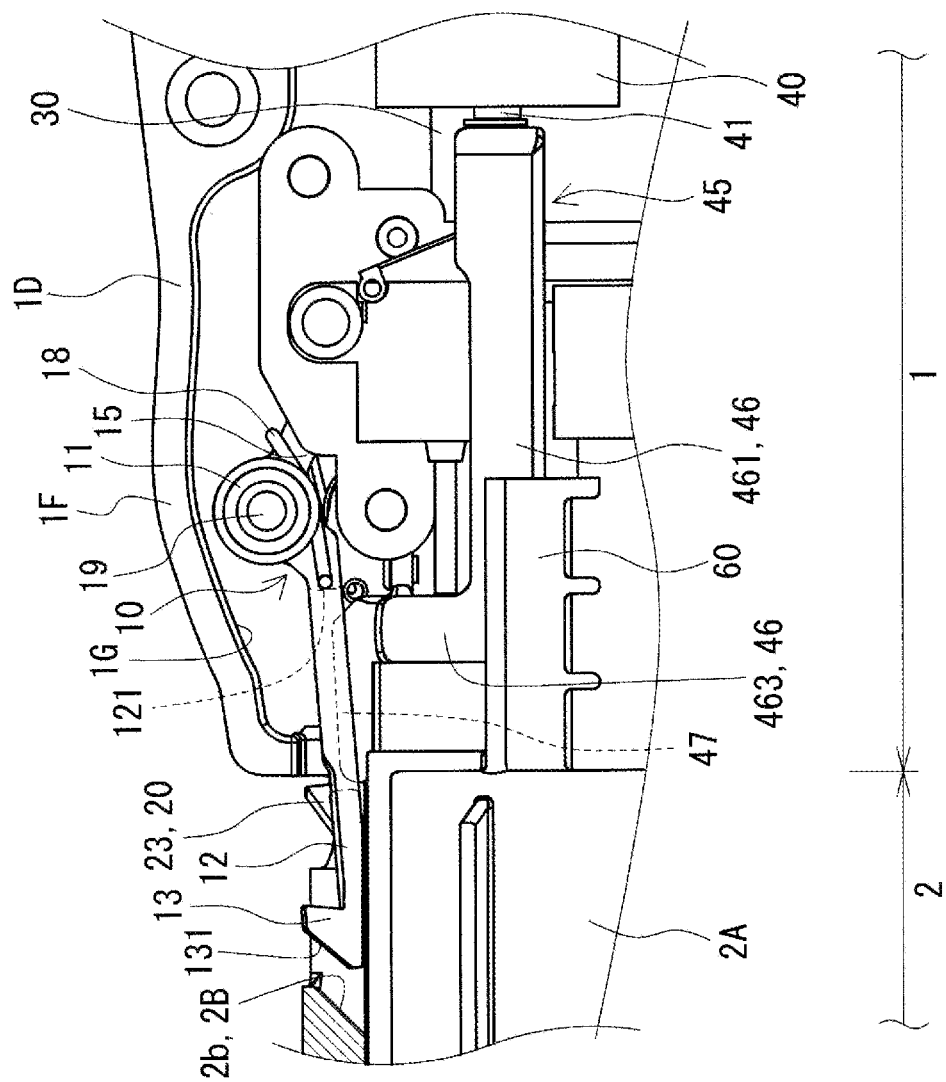
FIG. 13 is a left side view schematically illustrating an essential portion of the internal structure of the connector according to the first embodiment.

As illustrated in FIG. 3, the push button switch 50 is pushed to the front side, and accordingly, the release member 30 advances. According to this advancement, as illustrated in FIG. 11, the pushing contact portion 31 comes into contact with the rear end portion 16, and the rear end portion 16 is pushed up. Because the pushing contact portion 31 includes the inclined surface, the pushing contact portion 31 can readily push up the rear end portion 16. According to this push up, as illustrated in FIG. 13, the hook 13 descends and retracts from the insertion portion 2. Therefore, the engaged state between the hook 13 and the concave portion of the inlet is released.

When the engaged state is released, the connector 100 is unplugged from the inlet, so that the unplugging operation of the connector 100 from the inlet is completed. After the unplugging operation is completed, as illustrated in FIG. 8, the release member 30 retracts according to the preloading of the third preloading member 38 until the contact-and-stopping portion 32 is caught on the rear end portion 25.

(In Abnormal State)

A procedure and operation of respective units, in a case where an abnormal situation in which the engaged state between the hook 13 and the concave portion of the inlet cannot be released by the above-described unplugging operation occurs, are explained. An example of an abnormal situation includes a situation in which the rear end portion 16 cannot be pushed up due to damage of the release member 30. The abnormal situation may occur when the solenoid is operating or when the solenoid is not operating. The abnormal situation that occurs when the solenoid is operating means a case where the solenoid 40 operates normally and accordingly the support piece 47 can move to the position corresponding to the penetrating hole 121. The abnormal situation that occurs when the solenoid is not operating means a case where the solenoid 40 does not operate normally and accordingly the support piece 47 cannot move to the position corresponding to the penetrating hole 121. Hereinafter, the abnormal situation that occurs when the solenoid is operating and the abnormal situation that occurs when the solenoid is not operating are explained in order.

Abnormal Situation that Occurs when the Solenoid is Operating

As illustrated in FIG. 10, the shaft 19 is detached from the first intermediate portion 11. The fixing of the first arm 10 to the main body portion 1 is released. The first preloading member 18 pushes the pressing portion 15. Because the first preloading member 18 pushes the inclined pressing portion 15, the first arm 10 moves to the front inner side, instead of moving straightly downward. Because the support piece 47 retracted by the solenoid 40 is located at the position corresponding to the penetrating hole 121, the penetrating hole 121 is inserted into the support piece 47, and accordingly, the hook 13 retracts from the insertion portion 2. Therefore, the engaged state between the hook 13 and the concave portion of the inlet is released. In this state, the connector 100 is unplugged from the inlet, and the unplugging operation of the connector 100 from the inlet is completed.

Abnormal Situation that Occurs when the Solenoid is not Operating

The procedure and operation of respective units in the engaged state of the hook 13 when the solenoid is not operating are explained with reference to FIG. 14 to FIG. 17. For the sake of explanation, the second arm is not illustrated in FIG. 14 to FIG. 17, and a portion in proximity to the concave portion of an inlet 300 is described.

Figure 14:
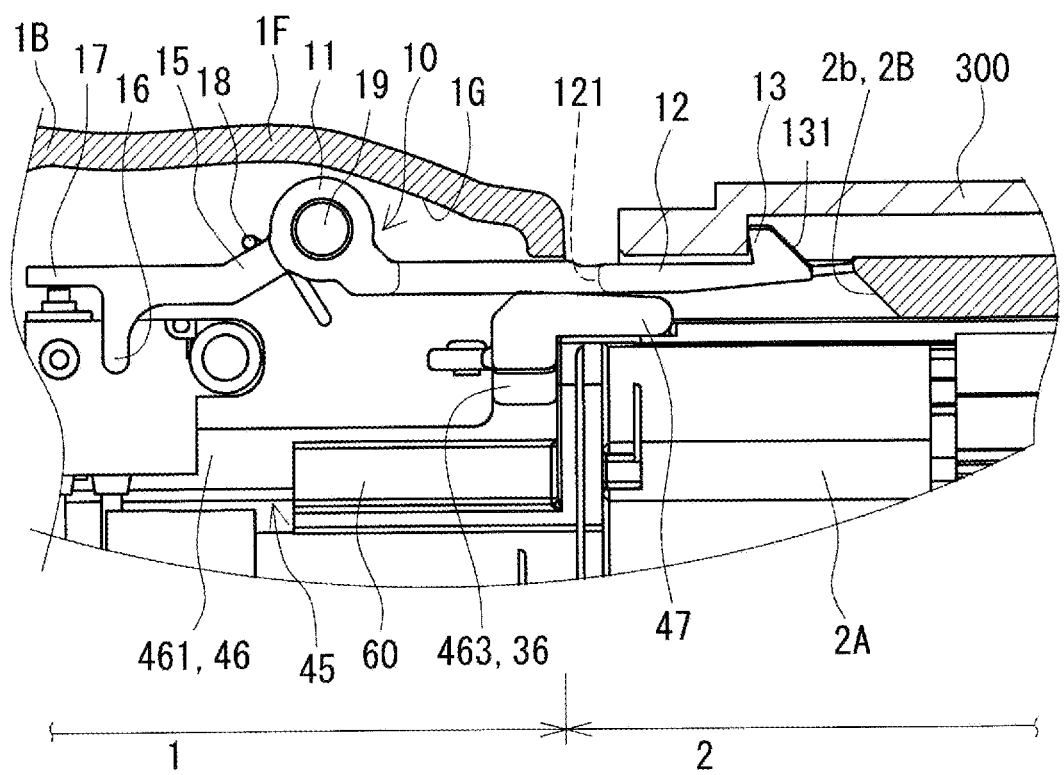
FIG. 14 is a right side view schematically illustrating an essential portion of the internal structure of the connector according to the first embodiment.

As illustrated in FIG. 14, the shaft 19 is detached from the first intermediate portion 11. Similar to the above, the fixing of the first intermediate portion 11 is released, and accordingly, the first preloading member 18 pushes the pressing portion 15 to move the first arm 10 to the front inner side. Because the first front portion 12 is in contact with the support piece 47, the first front portion 12 slides on the support piece 47, and the first arm 10 moves to the front side, instead of moving to the front inner side of the main body portion 1.

Figure 15:
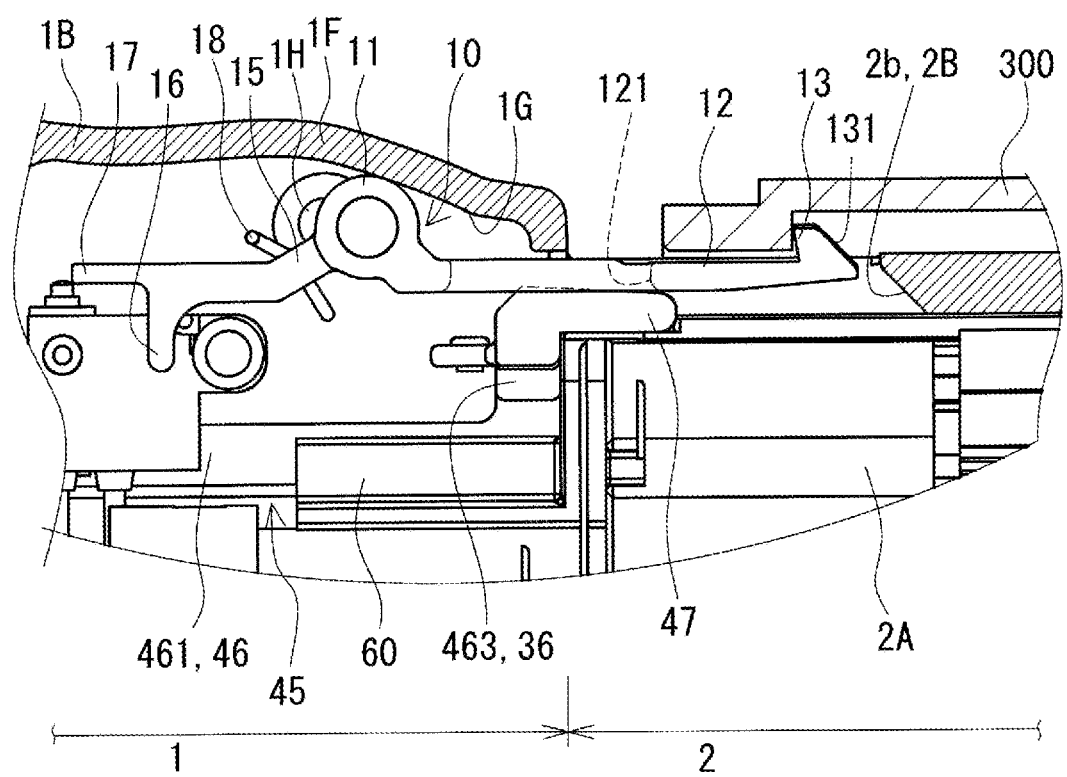
FIG. 15 is a right side view schematically illustrating an essential portion of the internal structure of the connector according to the first embodiment.
Figure 16:
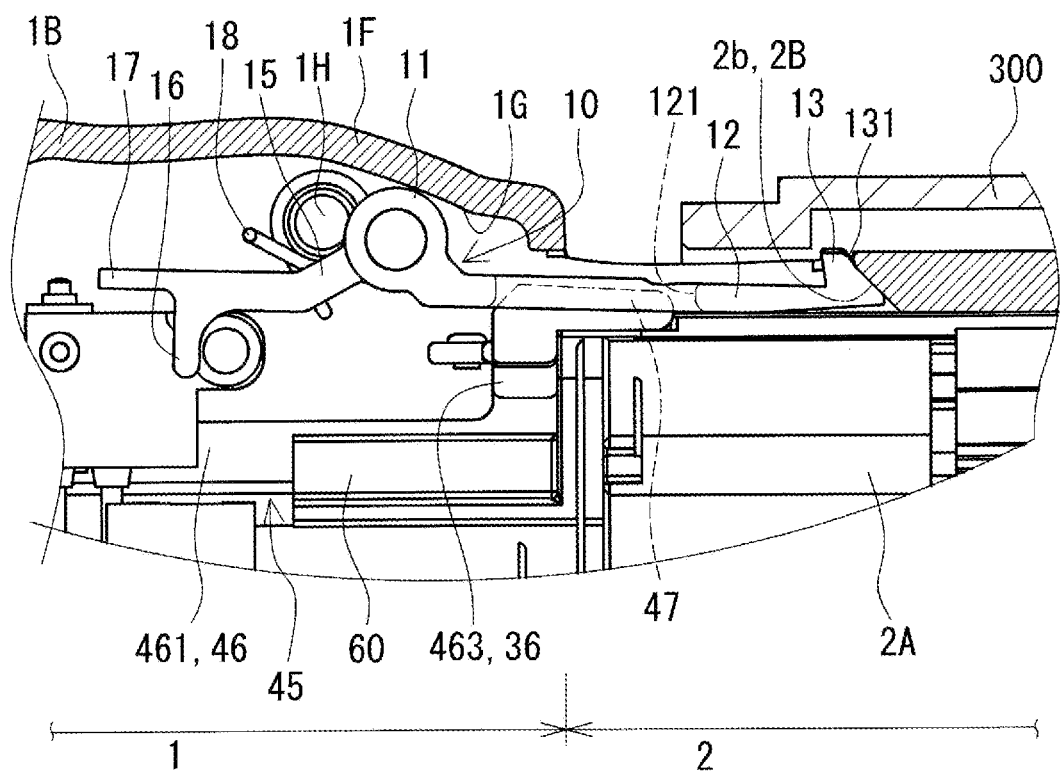
FIG. 16 is a right side view schematically illustrating an essential portion of the internal structure of the connector according to the first embodiment.
Figure 17:
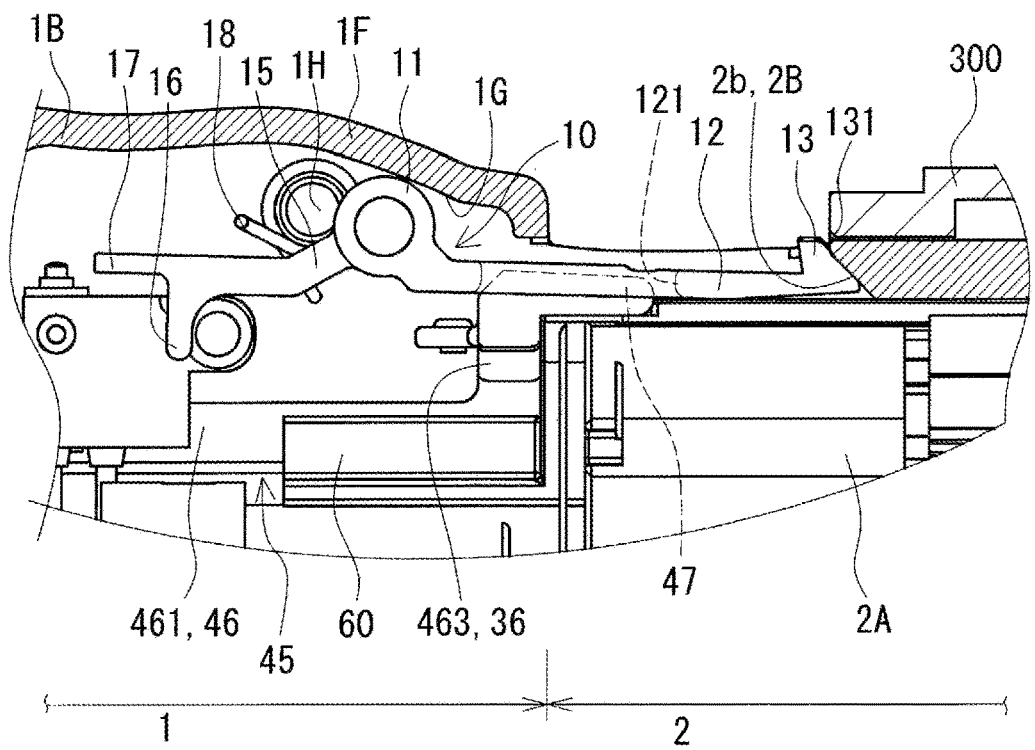
FIG. 17 is a right side view schematically illustrating an essential portion of the internal structure of the connector according to the first embodiment.

The connector 100 is pulled to the rear side of the main body portion 1. In this case, on the front side of the first intermediate portion 11, there is a movement margin between the first intermediate portion 11 and the guiding surface 1G. The hook 13 is in contact with the concave portion of the inlet 300, and the first front portion 12 is in contact with the support piece 47. Therefore, as illustrated in FIG. 15, the first arm 10 slides on the support piece 47 to relatively move to the front side. According to this relative movement of the first arm 10, the penetrating hole 121 moves to the position corresponding to the support piece 47. Together with this, the first intermediate portion 11 comes into contact with the guiding surface 1G, and the tip of the hook 13 comes into contact with the opening surface of the notch 2B. Then, the first intermediate portion 11 is guided on the guiding surface 1G, and the sliding contact surface 131 of the hook 13 moves along the inclination of the guide surface 2b. Accordingly, the first arm 10 moves to the front inner side. In this case, when the guide surface 2b and the sliding contact surface 131 are inclined in the same direction, the sliding contact surface 131 is likely to move along the guide surface 2b. As a result, as illustrated in FIG. 16, the support piece 47 is inserted into the penetrating hole 121. Accordingly, the hook 13 descends to retract from the insertion portion 2, and the engaged state between the hook 13 and the concave portion of the inlet 300 is released. In this state, as illustrated in FIG. 17, the unplugging operation from the inlet 300 of the connector 100 is completed by unplugging the connector 100 from the inlet 300.

[Main Body Case]

The exterior side surface of the left case 1B is constituted by a left flat surface 1b that is continuous from the front side to the rear side, as indicated by hatching in FIG. 1. Although not illustrated, similar to the exterior side surface of the left case 1B, the exterior side surface of the right case 1D is constituted by a right flat surface that is continuous from the front side to the rear side. The left flat surface 1b and the right flat surface are inclined so as to come into proximity with each other from the front side to the rear side. Also, the left flat surface 1b and the right flat surface are inclined so as to come into proximity with each other from the lower side to the upper side. The handle portion 5 may also be constituted by a continuous flat surface. As illustrated in FIG. 19, when the connector 100 is placed on the ground G with the left case 1B facing the ground G, the left side surface 11L comes into contact with the ground G. A gap is substantially prevented from being formed between the left side surface and the ground G. Also, the left side surface of the main body case 1A is in surface contact with the ground G, and accordingly, the connector 100 is stabilized in a constant orientation with respect to the ground G. As illustrated in FIG. 20, even when the right case 1D is placed on the ground G, the right side surface comes into contact with the ground G.

The contact area between the left case 1B and the ground G or the contact area between the right case 1D and the ground G increases in accordance with an increase in the areas of the left flat surface 1b and the right flat surface, and therefore, even when the connector 100 placed on the ground is run over by a vehicle, the compressive stress exerted on the left case 1B and the right case 1D can be dispersed. Also, the connector 100 is placed stably on the ground G. For example, the area of the left flat surface 1b is 30% or more, equal to or more than 35%, equal to or more than 40%, or equal to or more than 45% of a projected area as seen from the side of the left case 1B. The upper limit of the size of area of the left flat surface 1b is not particularly limited, but is, for example, 80% of the above-described projected area. Specifically, for example, the area of the left flat surface 1b is equal to or more than 30% and equal to or less than 80%, equal to or more than 35% and equal to or less than 80%, equal to or more than 40% and equal to or less than 80%, or equal to or more than 45% and equal to or less than 80% of the above-described projected area. A preferred range of the area of the right flat surface is substantially the same as the above preferred range of the area of the left flat surface 1b.

As illustrated in FIG. 19 and FIG. 20, the left flat surface 1b and the right flat surface are inclined as described above, and the main body case 1A becomes thinner from the front side to the rear side. Therefore, the handle portion 5 provided on the rear side of the main body case 1A can be made thinner, so that the handle portion 5 can be grabbed easily. In addition, as illustrated in FIG. 19 and FIG. 20, a step formed between a cable introductory portion 110 and the cable 200 can be reduced. The cable introductory portion 110 is a boundary between the main body case 1A and the cable 200. Furthermore, formation of the step can be inhibited. In FIG. 1, for the sake of explanation, the cable introductory portion is not illustrated. When this step is reduced, an excessive bending stress is inhibited from being exerted on a portion around the cable introductory portion 110, even if the portion around the cable introductory portion 110 is run over by a vehicle. For example, the step is 10 mm, equal to or less than 8 mm, equal to or less than 6 mm, or equal to or less than 5 mm.

The material of the main body case 1A may be metal or resin. An example of metal includes aluminum alloy. When the main body case 1A is constituted by metal, the strength of the connector 100 is likely to be increased. Examples of resins include one or more thermoplastic resins selected from the group consisting of polypropylene resin, acrylonitrile-butadiene-styrene (ABS) resin, polycarbonate resin, polyamide resin, polybutylene terephthalate resin, polyphenylene sulfide resin, and the like. The above-described resin may be a reinforced resin to which a reinforcing additive is added. Examples of reinforcing additives include glass fiber, glass beads, and carbon fiber. Also, the main body case 1A may be constituted by a resin alloy or the like, which is a mixed resin of polybutylene terephthalate resin and polycarbonate resin. When the main body case 1A is constituted by resin, the cost and weight of the connector 100 can be readily reduced. The main body case 1A according to the present embodiment is constituted by aluminum alloy. Even when the connector 100 is run over by a vehicle, the compressive stress exerted on the left case 1B and the right case 1D can be dispersed with the left flat surface 1b and the right flat surface 1d, and therefore, alternatively to the present embodiment, the main body case 1A may be constituted by resin.

Actions and Effects of First Embodiment

When the support piece 47 is advanced by the solenoid 40 via the connection piece 46, the connector 100 according to the present embodiment can advance the first connection piece 461 to the appropriate position with the groove 61 of the guide member 60, and can advance the support piece 47 to the appropriate position with the groove 2E. In particular, the guide member 60 and the terminal case 2A are integrally molded, so that as compared with the case where the guide member 60 is separately attached to the terminal case 2A, variation in the attachment of the guide member and the terminal case does not occur. Therefore, the support piece 47 can be advanced to the appropriate position on the front lower side with respect to the penetrating hole 121 of the first front portion 12. Therefore, according to the support piece 47, the hook 13 can be directly prevented from retracting from the insertion portion 2. In the connector 100, even when a problem such as impact, vibration, damage to the first preloading member 18, and the like, occurs during feeding, the hook does not retract. Specifically, the engaged state between the hook 13 and the concave portion of the inlet can be reliably prevented from being released. Therefore, the connector 100 is capable of reliably preventing accidental unplugging from the inlet.

In the connector 100 according to the present embodiment, the support piece 47 and the first connection piece 461 are provided with a shift in the left-and-right direction, so that as compared with the case where the support piece 47 and the first connection piece 461 are arranged on the same straight line without a shift in position in the left-and-right direction, the arrangement of other members that are related to the slide member 45 is less likely to be affected. In addition, in the connector 100 according to the present embodiment, the support piece 47 and the first connection piece 461 are shifted in position in the left-and-right direction, and accordingly, a space for containing other members can be secured. In addition, in the connector 100 according to the present embodiment, the support piece 47 and the first connection piece 461 are shifted in position in the vertical direction, and accordingly, a space for containing other members can be also secured in the vertical direction. Therefore, the connector 100 according to the present embodiment is highly flexible in the arrangement of components of the connector 100. The solenoid 40 is provided on the rear side of the first arm 10, and the plunger 41 advances toward the insertion portion 2 so as to allow the support piece 47 to advance below the first front portion 12, so that the space for containing the solenoid 40 can be secured.

In the connector 100 according to the present embodiment, when the insertion portion 2 is inserted all the way into the inlet, the push button switch 50 retracts to the retraction limit. Therefore, whether the connector 100 has been securely inserted into the inlet can be confirmed by checking whether the push button switch 50 has retracted to the retraction limit. Therefore, even an unskilled user can reliably insert the connector 100 into the inlet by checking the state of the push button switch 50.

In contrast to the connector of Patent Document 1 of which the lever is grabbed after the connector is inserted, the connector 100 according to the present embodiment can complete the insertion operation into the inlet with just an operation for inserting the insertion portion 2 of the connector 100 into the inlet. Therefore, as compared with the connector of Patent Document 1, the connector 100 according to the present embodiment can be intuitively operated and is excellent in operability. Also, the internal structure of the connector 100 has a simple structure with a relatively small number of components, and accordingly, achieves a high degree of reliability, a reduction in the size, an improvement of maintainability, and a reduction in the cost. Furthermore, the push button switch 50 is provided in the upper portion of the handle portion 5, and accordingly, the unplugging operation from the inlet can be performed with a single hand.

In the connector 100 according to the present embodiment, in a case where an abnormal situation occurs when the above-described solenoid is operating, the fixing of the first arm 10 to the main body portion 1 can be released by detaching the shaft 19 from the first intermediate portion 11. Therefore, the engaged state between the hook 13 and the concave portion of the inlet can be released. Also, in the connector 100 according to the present embodiment, in a case where an abnormal situation occurs when the above-described solenoid is not operating, the engaged state between the hook 13 and the concave portion of the inlet can be released by detaching the shaft 19 from the first intermediate portion 11 and unplugging the connector 100 from the inlet. Therefore, even if an abnormal situation occurs, the connector 100 can be unplugged from the inlet without disassembling or breaking the connector 100.

In the connector 100 according to the present embodiment, when the connector 100 is placed or dropped to the ground, the left flat surface 1b and the right flat surface allow the side surface of the main body case 1A to be in surface contact with the ground G. Therefore, the connector 100 can be maintained stably with a constant orientation with reference to the ground G.

In the connector 100 according to the present embodiment, the side surface of the main body case 1A is in surface contact with the ground G, and therefore, the contact area between the main body case 1A and the ground G can be increased. Therefore, even if the connector 100 is run over by a vehicle, the compressive stress exerted on the main body case 1A can be dispersed. Also, the side surface of the main body case 1A comes into surface contact with the ground G, and accordingly, the gap between the side surface of the main body case 1A and the ground G can be reduced. Therefore, even when the connector 100 is run over by a vehicle, an excessive bending stress is alleviated from being exerted on the main body case 1A. Furthermore, the main body case 1A becomes thinner from the front side to the rear side, and accordingly, the step formed between the cable introductory portion 110 and the cable 200 is likely to be reduced. Therefore, even when a portion around the cable introductory portion 110 is run over, an excessive bending stress is alleviated from being exerted on the portion that is run over. Therefore, even if the connector 100 is run over by a vehicle, the main body case 1A is less likely to be damaged.

Because the main body case 1A becomes thinner from the front side to the rear side, the handle portion 5 becomes thinner. Therefore, the handle portion 5 can be grabbed easily with a hand, and the operability improves.

The connector 100 according to the present embodiment can be preferably used as a connector for a vehicle. For example, the connector 100 according to the present embodiment can be suitably used as a connector used for a moving body other than a vehicle, such as a ship, a submersible, or aircraft. The connector 100 according to the present embodiment can be suitably used as a connector connected to an inlet of a power storage apparatus installed in a home, a building, or a factory.

Second Embodiment

[Connector]

A connector 100 according to the second embodiment is explained mainly with reference to FIG. 21 to FIG. 27. The connector 100 according to the present embodiment is different from the first embodiment in that a slide switch 51 is provided instead of the push button switch 50 and in that a first switch 81 and a second switch 82 are provided. Hereinafter, difference from the first embodiment is mainly explained. Explanation about substantially the same configuration as in the first embodiment may be omitted. For the sake of explanation, in FIG. 21 to FIG. 24, the inlet 300, the first arm 10, the second arm 20, the slide switch 51, the first switch 81, and the second switch 82 are illustrated in a simplified manner.

[Slide Switch]

Figure 21:
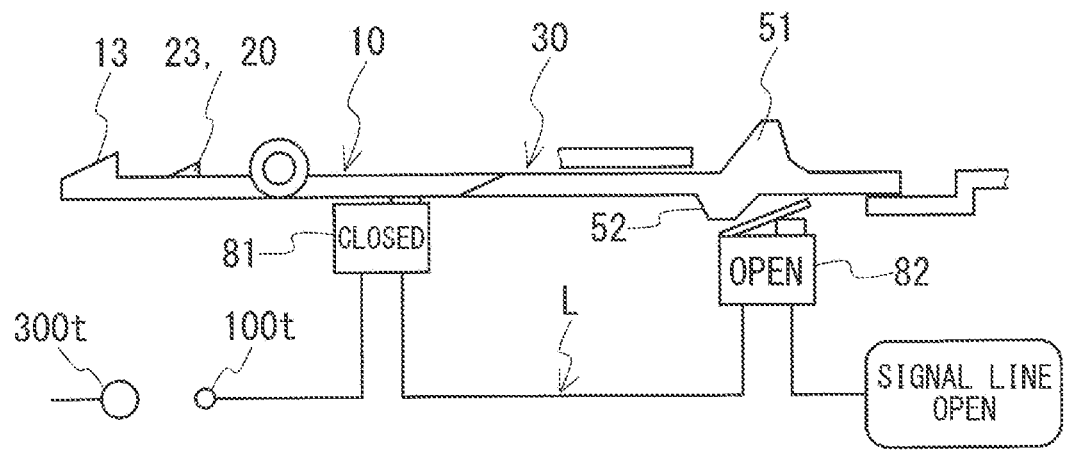
FIG. 21 is a schematic diagram illustrating a state of a signal line before a connector according to a second embodiment is inserted.

As illustrated in FIG. 21, the slide switch 51 is connected to the rear end portion of the release member 30. The slide switch 51 is preloaded in a backward direction by the above-described third preloading member 38 (FIG. 2). The slide switch 51 includes a trigger unit 52. The trigger unit 52 is provided on the lower surface of the slide switch 51 to protrude to the inner side in the diameter direction of the main body portion 1. This trigger unit 52 pushes the second switch 82.

[First Switch]

The contact of the first switch 81 opens and closes according to a swinging operation of the first arm 10. An example of the first switch 81 is a miniature basic switch with a pin-plunger actuator. The first switch 81 is provided on the lower side of the bulging portion 17. As illustrated in FIG. 8, the first switch 81 is attached to the main body portion 1 so that, at the first swinging position, the bulging portion 17 pushes the button of the first switch 81 to make the first switch 81 in the closed state, and at the second swinging position, the bulging portion 17 moves away from the button of the first switch 81 to make the first switch 81 in the open state. The first swinging position is the position where the hook 13 protrudes from the outer peripheral surface of the insertion portion 2. The second swinging position is the position where the hook 13 does not protrude from the outer peripheral surface of the insertion portion 2.

[Second Switch]

The contact of the second switch 82 opens and closes according to advancement or retraction of the release member 30. An example of the second switch 82 is a miniature basic switch with a hinge roller lever actuator. The second switch 82 is provided below the trigger unit 52. The second switch 82 is attached to the main body portion 1 so that at the first slide position, the trigger unit 52 pushes the lever of the second switch 82 to make the second switch 82 in the closed state, and at the second slide position, the trigger unit 52 moves away from the lever of the second switch 82 to make the second switch 82 in the open state. The first slide position is the position where the slide switch 51 has retracted to the retraction limit. The second slide position is the position where the slide switch 51 is against the preloading of the third preloading member 38.

The first switch 81 and the second switch 82 are provided in a signal line explained later.

The connector 100 according to the present embodiment includes a signal line electrically connected to the inlet to pass an electric signal. The signal line includes a connection confirmation signal line and a solenoid driving signal line. The connection confirmation signal line passes a signal for confirming the electrical connection state between the connector 100 and the inlet. The connection confirmation signal line is formed by electrically connecting the connector 100 and the inlet. The solenoid driving signal line passes a driving signal for energizing the solenoid 40. The solenoid driving signal line forms a circuit for energizing the solenoid 40 from the charger main body. In the present embodiment, the first switch 81 and the second switch 82 are provided in the connection confirmation signal line.

Operations of the first switch 81 and the second switch 82 described above and the state of the signal line in an insertion operation of the connector 100 into the inlet and an unplugging operation from the inlet are explained with reference to FIG. 21 to FIG. 25. Operations of the internal structure during the insertion operation and the unplugging operation are substantially the same as in the first embodiment.

In the initial state before the above-described insertion portion 2 is inserted, the first arm 10 is at the above-described first swinging position, and the slide switch 51 is at the above-described second slide position. As illustrated in FIG. 21, the button of the first switch 81 is pressed by the bulging portion 17 illustrated in FIG. 8 so that the first switch 81 is made in the closed state. Also, as illustrated in FIG. 21, the lever of the second switch 82 is not pressed by the trigger unit 52 so that the second switch 82 is in the open state. Furthermore, a terminal 100t of the connector 100 and a terminal 300t of the inlet 300 are not in contact with each other, so that the connector 100 and the inlet 300 are not electrically connected. A signal line L that is the connection confirmation signal line is in the open state.

[Insertion Operation]

Figure 22:
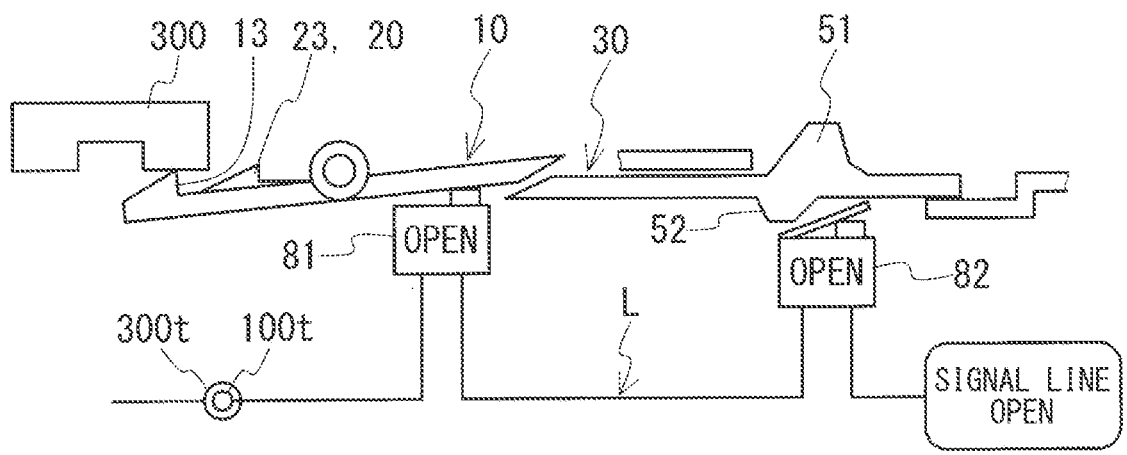
FIG. 22 is a schematic diagram illustrating a state of a signal line while the connector according to the second embodiment is in the process of being inserted.

When the insertion portion 2 is inserted into the inlet as illustrated in FIG. 1, the hook 13 is pushed in as illustrated in FIG. 22. This state is a state in which the connector 100 is in the process of being inserted, and this is a half-fitted state in which the hook 13 does not protrude to the concave portion of the inlet 300 and does not engage therewith.

In this case, the first arm 10 is at the above-described second swinging position, and the slide switch 51 is at the above-described second slide position. As illustrated in FIG. 22, the button of the first switch 81 is not pressed by the bulging portion 17 illustrated in FIG. 8 so that the first switch 81 is in the open state. Also, as illustrated in FIG. 22, the lever of the second switch 82 is not pressed by the trigger unit 52 so that the second switch 82 is in the open state. Furthermore, the terminal 100t and the terminal 300t are in contact with each other, so that the connector 100 and the inlet 300 are electrically connected. The signal line L is in the open state. Even if the electrical connection between the connector 100 and the inlet 300 is established, the signal line L is made in the open state in the half-fitted state in which mechanical connection is incomplete.

Figure 23:
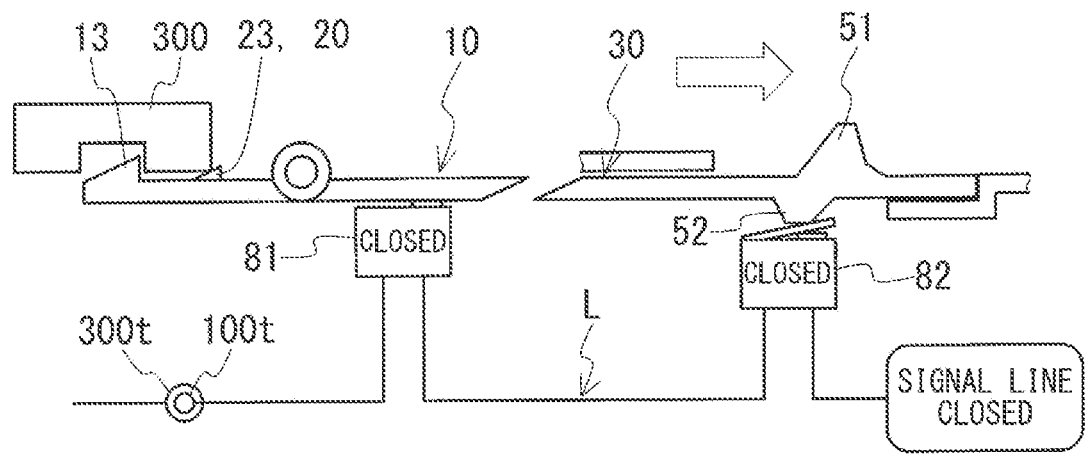
FIG. 23 is a schematic diagram illustrating a state of a signal line after the connector according to the second embodiment has been inserted.

As illustrated in FIG. 1, when the insertion portion 2 is inserted all the way into the inlet, the hook 13 engages with the concave portion of the inlet 300 as illustrated in FIG. 23. Also, as illustrated in FIGS. 10 and 11, the protrusion portion 23 is pushed in, and the caught state between the contact-and-stopping portion 32 and the rear end portion 25 is released. According to this release, the slide switch 51 retracts to the retraction limit according to the preloading of the third preloading member 38. Accordingly, the insertion operation of the connector 100 into the inlet is completed.

In this case, the first arm 10 is at the above-described first swinging position, and the slide switch 51 is at the above-described first slide position. As illustrated in FIG. 23, the button of the first switch 81 is pressed by the bulging portion 17 illustrated in FIG. 8 so that the first switch 81 is made in the closed state. Also, as illustrated in FIG. 23, the lever of the second switch 82 is pressed by the trigger unit 52 so that the second switch 82 is made in the closed state. Furthermore, the connector 100 and the inlet 300 are still electrically connected. The signal line L is made in the closed state. In this manner, only in a case where the connector 100 and the inlet 300 are reliably connected in terms of mechanical and electrical manner, the signal line L is in the closed state, and therefore, the half-fitted state of the connector 100 is detected by monitoring the state of the signal line L.

[Unplugging Operation]

When the slide switch 51 is advanced after energization of the solenoid 40 is stopped, the engaged state between the hook 13 and the concave portion of the inlet is released.

Figure 24:
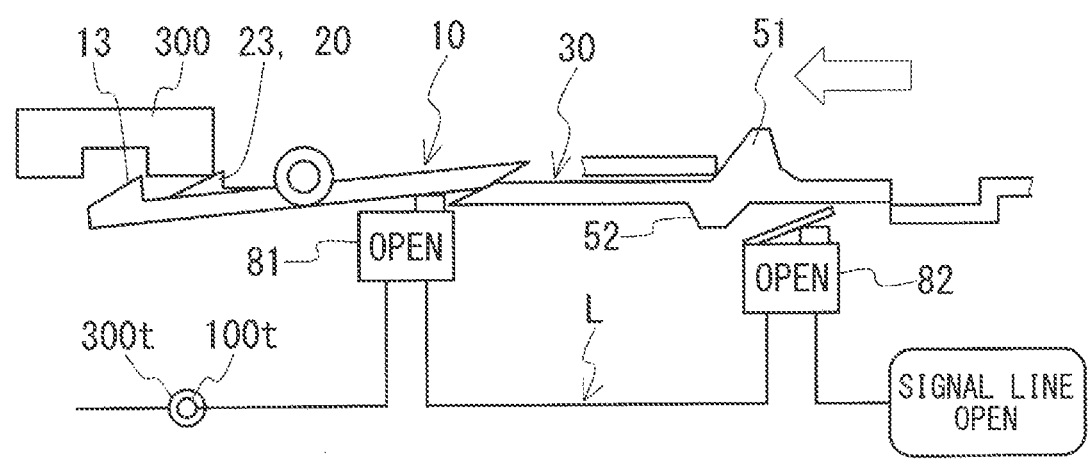
FIG. 24 is a schematic diagram illustrating a state of a signal line during an unplugging operation of the connector according to the second embodiment.

In this case, the first arm 10 is at the above-described second swinging position, and the slide switch 51 is at the above-described second slide position. As illustrated in FIG. 24, the button of the first switch 81 is not pressed by the bulging portion 17 illustrated in FIG. 8 so that the first switch 81 is made in the open state. Also, as illustrated in FIG. 24, the lever of the second switch 82 is not pressed by the trigger unit 52 so that the second switch 82 is made in the open state. The connector 100 and the inlet 300 are still electrically connected. The signal line L is made in the open state.

Thereafter, the unplugging operation is completed as described above, so that the electrical connection between the connector 100 and the inlet is released.

In this case, in a case where the user attempts to unplug the connector 100 from the inlet during charging in an abnormal situation in which the support piece 47 illustrated in FIG. 7 does not advance due to some problem, the slide switch 51 illustrated in FIG. 23 is advanced. Specifically, the second switch 82 is made in the open state before the first switch 81. Therefore, because the second switch 82 is provided, the unplugging operation of the connector 100 can be detected more quickly by detecting that the slide switch 51 has been operated. Therefore, when the user attempts to unplug the connector 100 from the inlet by operating the slide switch 51 during charging, charging from the charger main body can be stopped more quickly, and therefore, the safety can be more greatly improved.

Figure 25:
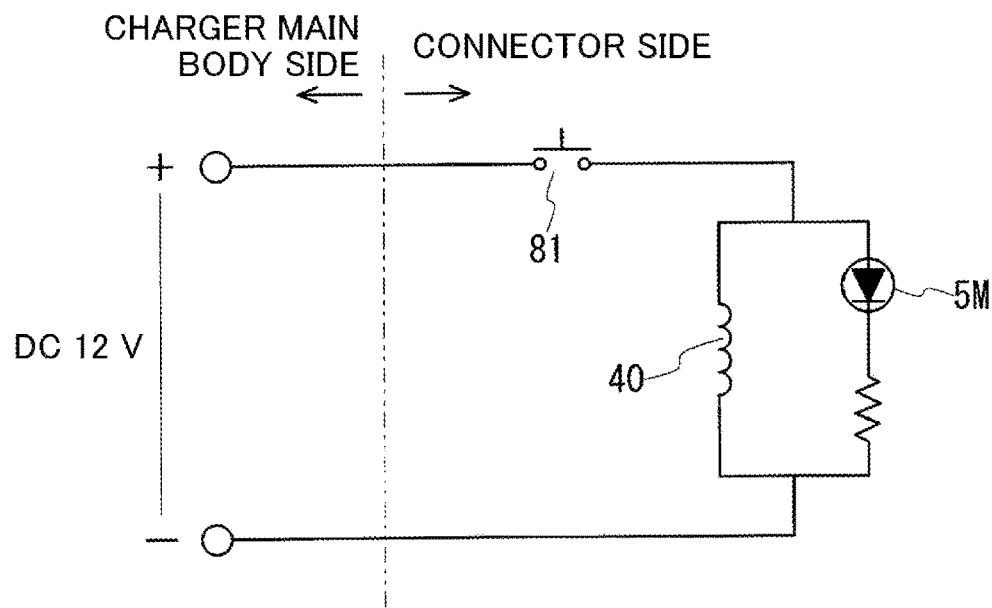
FIG. 25 is a schematic diagram illustrating an example of a circuit in a case where a first switch is provided in a solenoid driving signal line.

In the present embodiment, for example, the first switch 81 is provided in the connection confirmation signal line. Alternatively, the first switch 81 may be provided in the solenoid driving signal line. Specifically, as illustrated in FIG. 25, in the circuit for energizing the solenoid 40 from the charger main body, the first switch 81 may be provided in the solenoid driving signal line for passing the driving signal energizing the solenoid 40. Even in this case, the state of the signal line, for example, the disconnection state of the circuit, is monitored, so that the half-fitted state of the connector 100 can be detected. Also, in a case where the connection confirmation signal line and the solenoid driving signal line are provided as signal lines as in the connector 100 explained in the present embodiment, the first switch and the second switch 82 may be provided in the same signal line or may be provided in different signal lines. As long as the signal lines are lines that pass electric signals when the connector 100 and the inlet are electrically connected, the signal lines are not limited to the connection confirmation signal line and the solenoid driving signal line, and other signal lines may be used. In the present embodiment, it is assumed that, for example, the first switch 81 and the second switch 82 are provided. Alternatively, only the first switch 81 may be provided, even in which case the safety can be sufficiently ensured. In the case where only the first switch 81 is provided, the number of components can be reduced, and the failure rate can be reduced.

In the present embodiment, the slide switch 51 is used as an example, but the above explanation is also applicable to the push button switch 50 according to the first embodiment.

OTHERS

Figure 26:
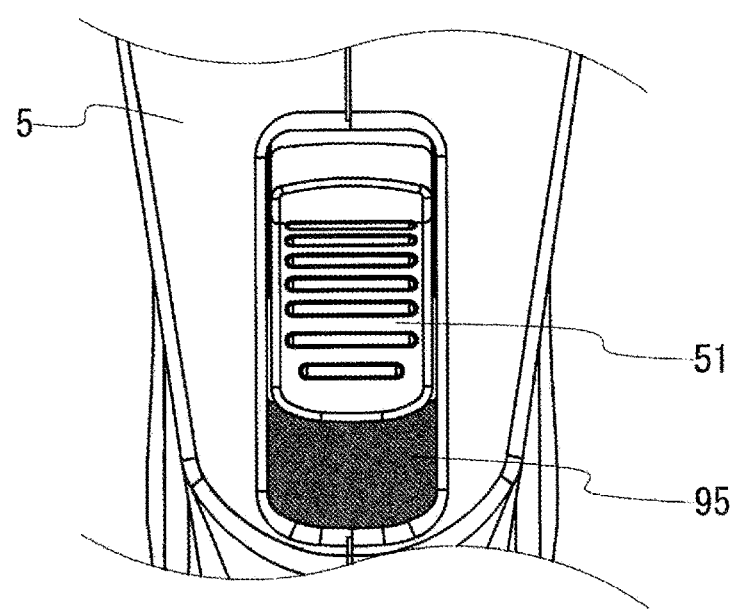
FIG. 26 is a top view schematically illustrating a slide switch in the connector according to the second embodiment.

As illustrated in FIG. 26, on the upper portion of the handle portion 5, a portion that is exposed when the slide switch 51 is in the pushed state and that is not exposed when the slide switch 51 retracts to the retraction limit can be used for an indication portion 95. For example, this indication portion 95 is painted in a color different from the portion around the indication portion 95, so that the user can easily find in a visual manner by color the state in which the slide switch 51 is in the pushed state, i.e., the state in which the contact-and-stopping portion 32 is caught on the rear end portion 25 and the advancement and retraction of the release member 30 is inhibited.

Figure 27:
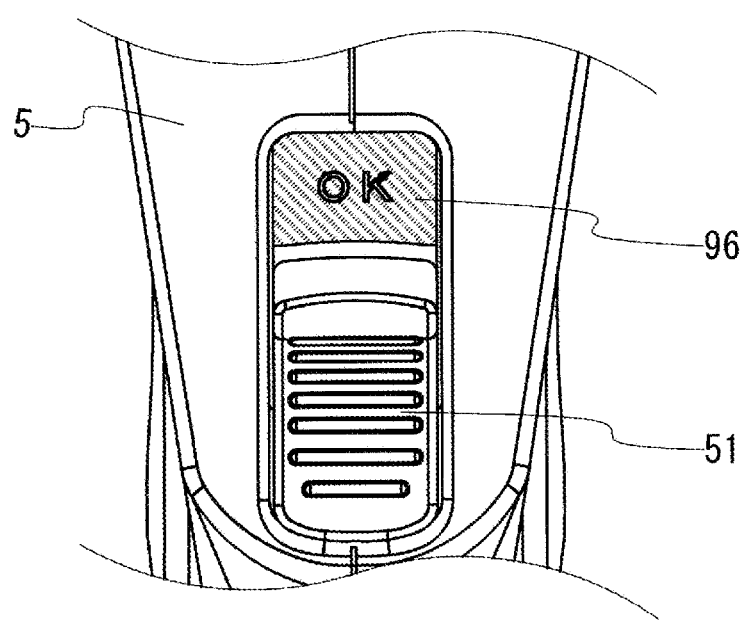
FIG. 27 is a top view schematically illustrating the slide switch in the connector according to the second embodiment.

As illustrated in FIG. 27, in the upper portion of the handle portion 5, a portion that is exposed when the slide switch 51 is in the pushed state and that is not exposed when the slide switch 51 retracts to the retraction limit can be used for an indication portion 96. For example, characters may be indicated in this indication portion 96 or the indication portion 96 is painted in a color different from the portion around the indication portion 96, so that the user can easily find in a visual manner by characters and color that the release member 30 has retracted to the retraction limit.

Actions and Effects of Second Embodiment

In the connector 100 according to the present embodiment, a first switch 81 is provided in the signal line, so that the above-described half-fitted state can be detected. Therefore, in the case of the above-described half-fitted state, charging from the charger main body can be stopped, and the safety is high. Also, in the connector 100 according to the present embodiment, a second switch 82 is provided in the signal line, so that an operation of the slide switch 51 can be detected. Therefore, even if, during charging, the user attempts to unplug the connector 100 from the inlet by operating the slide switch 51 before the user performs an operation to stop the charging from the charger main body, the charging from the charger main body can be stopped, and therefore, the safety can be more greatly enhanced.

In the connector 100 according to the present embodiment, the indication portions 95, 96 allow the user to easily determine that the slide switch 51 has retracted to the retraction limit.

Therefore, the user can easily confirm whether insertion to the inlet has been securely performed.

Third Embodiment

[Connector]

Figure 28:
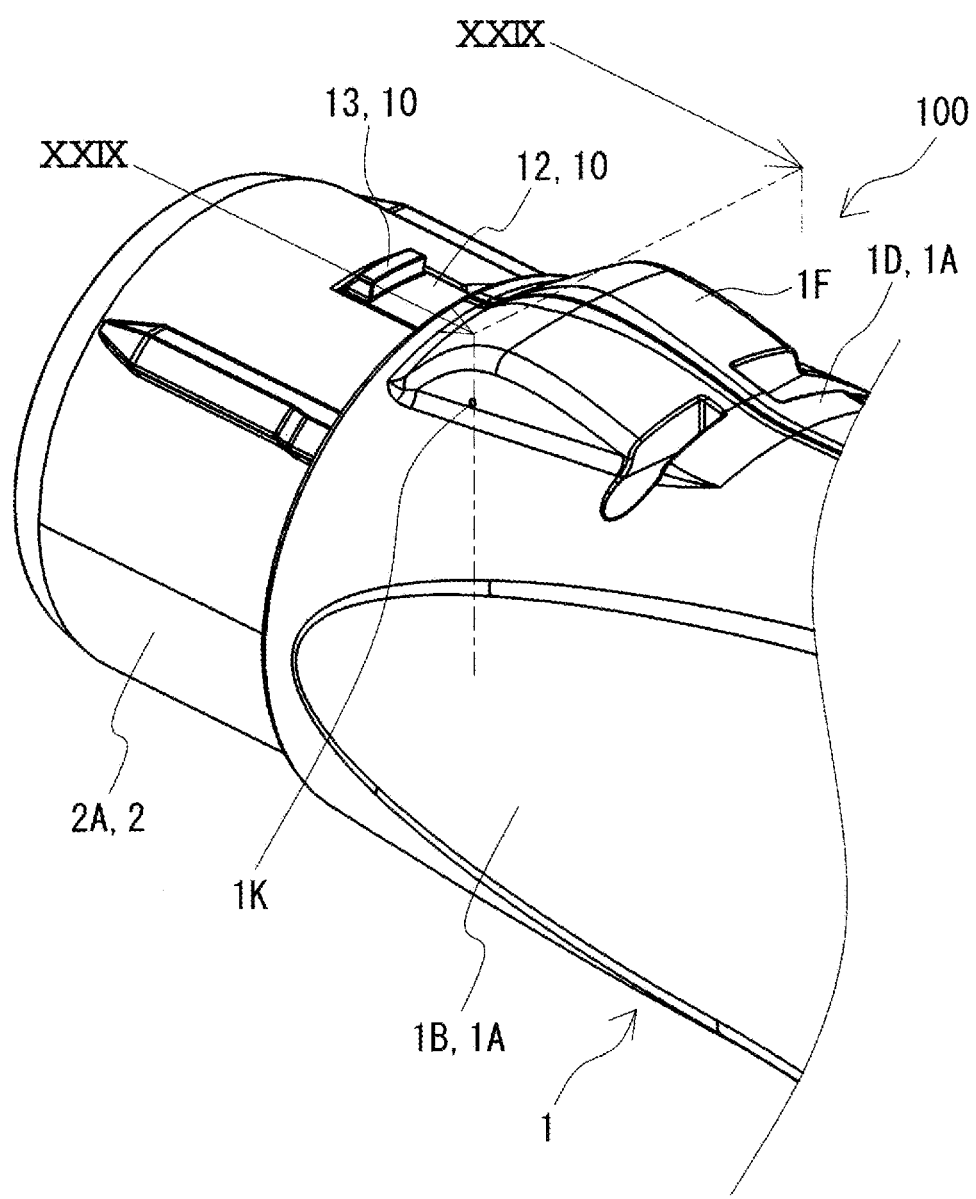
FIG. 28 is a perspective view schematically illustrating a front portion of a connector according to a third embodiment as seen from the left rear side.
Figure 29:
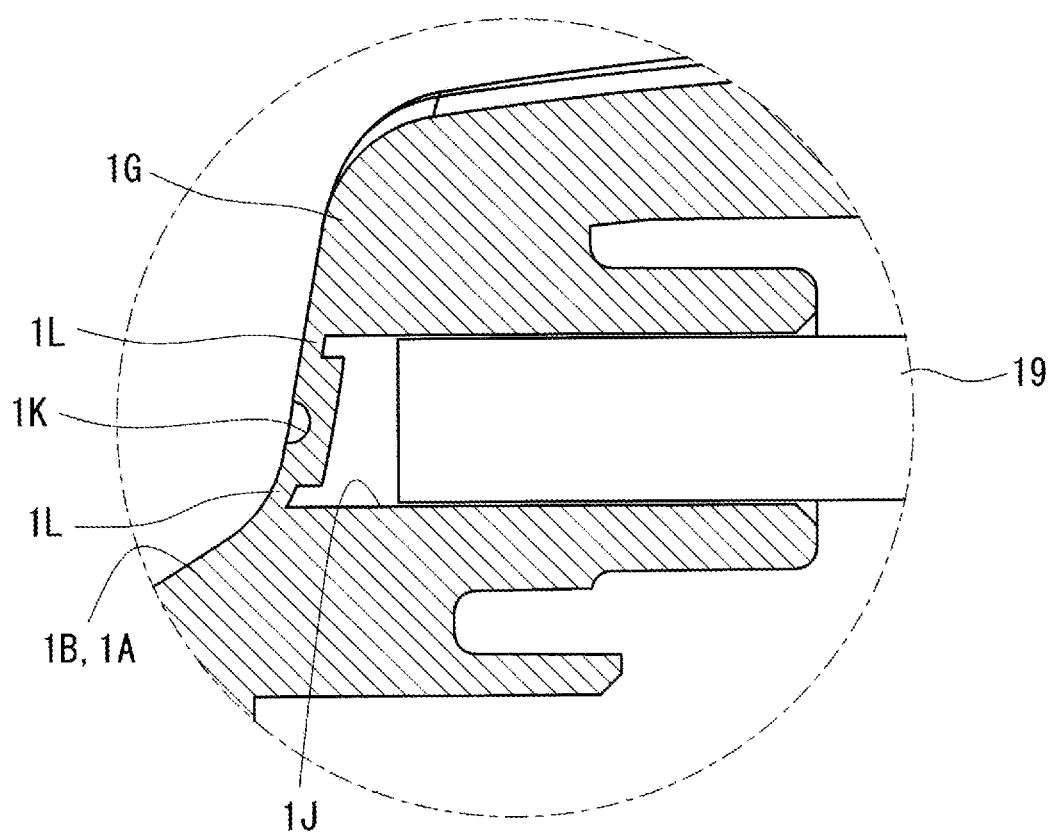
FIG. 29 is a cross sectional view taken along XXIX-XXIX of FIG. 28.

A connector 100 according to according to the third embodiment is explained mainly with reference to FIGS. 28 and 29. The connector 100 according to the present embodiment is different from the first embodiment in that the material of the main body case 1A is resin, that the protruding portion 1F does not include the shaft insertion portion 1H, and that the shaft 19 is exposed to the outside. In the following explanation, a difference from the first embodiment is mainly explained. Explanation about substantially the same configuration as in the first embodiment may be omitted.

[Main Body Case]

An example of resin for forming the main body case 1A is as described above. In the present embodiment, the main body case 1A is made of a resin alloy that is a mixed resin of polybutylene terephthalate resin and polycarbonate resin.

(Protruding Portion)

As illustrated in FIG. 29, a shaft receiving portion 1J supporting the shaft 19 is formed on the inner surface of each side surface of the protruding portion 1F. The shaft receiving portion 1J is formed on the inner surface of each side surface. The shaft 19 is extended between the shaft receiving portions 1J, 1J. As illustrated in FIG. 7, this shaft 19 is inserted into the first intermediate portion 11, and the first arm 10 is swingably supported on the main body portion 1 via the shaft 19.

The protruding portion 1F includes: an identification portion 1K through which the position of the shaft 19 can be identified from the outside; and a fragile portion 1L that can be broken so as to expose the shaft 19 to the outside.

Identification Portion

The form of the identification portion 1K can be appropriately selected so long as the position of the shaft 19 can be identified from the outside of the main body case 1A. The identification portion 1K according to the present embodiment is constituted by a concave portion formed at the position corresponding to the end face of the shaft 19 on each side surface of the protruding portion 1F. The recessed part of the concave portion is preferably located on the extension line of the axial center of the shaft 19. Because the identification portion 1K is in the concave portion, a pushing member such as a stick can be readily brought into contact with the recessed part of the concave portion, and the pushing member can be readily pushed into the inner side of the main body case 1A. Also, because the recessed part of the concave portion is thinner and locally lower in strength than the other areas of the protruding portion 1F, the recessed part can be readily broken. Alternatively to the present embodiment, the identification portion 1K may be constituted by a convex portion or a rough surface. When the identification portion 1K is constituted by a concave portion, a convex portion, or a rough surface, the identification portion 1K can be visually and tactilely confirmed.

Alternatively to the present embodiment, the identification portion 1K may be configured to have a color different from the colors of the portions other than the identification portion 1K of the main body case 1A. The identification portion 1K may be constituted by a symbol such as an arrow indicating the end face of the shaft 19. In a case where the identification portion 1K is a symbol, then the identification portion 1K may be formed at the position corresponding to the end face of the shaft 19, or it does not have to correspond to the end face of the shaft 19, and the identification portion 1K may be formed at a position so that the position corresponding to the end face of the shaft 19 can be indicated by the symbol.

Fragile Portion

The fragile portion 1L is a portion that is configured to be locally lower in strength. With the fragile portion 1L, at least a portion of the protruding portion 1F can be readily broken. Therefore, the shaft 19 can be made in the state of being exposed to the outside of the protruding portion 1F. The fragile portion 1L according to the present embodiment is constituted by a thin portion formed on each side surface. In the thin portion, the thickness of a portion of each side surface is thinner than the thickness of the other areas. On the inner surface of each side surface, the thin portion is formed by a notch formed in the circumferential portion facing the periphery of the end face of the shaft 19. In this manner, in a case where the thin portion is formed by a notch, the notch is preferably formed in the inner surface of each side surface. Alternatively to the present embodiment, a notch may be formed radially around the axial center of the shaft 19.

Alternatively to the present embodiment, the fragile portion 1L may be formed on the outer surface of each side surface. For example, when notches in a shape of a cross are formed on the outer surface of each side surface as the fragile portion 1L, the intersection of the notches can also serve as the identification portion 1K.

Alternatively to the present embodiment, the fragile portion 1L may be constituted by a notch formed along the boundary portion between the protruding portion 1F and the areas other than the protruding portion 1F. The left case 1B and the right case 1D can be separated to the right and left, and likewise, the protruding portion 1F can be separated to the left and right. Therefore, with the breaking at the above-described boundary portion, the protruding portion 1F can be separated to the left and right and detached, so that the support of the first intermediate portion 11 by the shaft 19 can be released. In this case, the protruding portion 1F also serves as the identification portion 1K.

Because the identification portion 1K and the fragile portion 1L are formed on each side surface, the side surfaces can be broken using the identification portion 1K as a mark from any of the left-and-right side surfaces. Therefore, this configuration is capable of supporting both of a left-open or a right-open lid of the inlet. For example, in a case where the lid of the inlet is a left-open lid, the identification portion 1K and the fragile portion 1L on the side of the open lid are covered with the lid, but when the identification portion 1K and the fragile portion 1L on the right surface that is on the opposite side to the open lid are used, the lid of the inlet does not get in the way when the shaft 19 is removed, and therefore, this task can be readily performed.

[Unplugging Operation]

(Abnormal State)

A procedure in a case where an abnormal situation as described above occurs is explained. When a pushing member such as a stick is brought into contact with the identification portion 1K provided on one side surface and the pushing member is pushed into the inner side of the main body case 1A, one of the side surfaces is broken with the fragile portion 1L being the start point. In this case, a disk-shaped resin piece surrounded by the fragile portion 1L is separated from the protruding portion 1F and pushed toward the end face of the shaft 19. When the pushing member is further pushed, the pushing member comes into contact with one of the end faces of the shaft 19, and the other of the end faces of the shaft 19 comes into contact with the inner surface of the other of the side surfaces. Then, the other of the side surfaces is broken by a shaft portion 13*i* with the fragile portion 1L being the start point. In this case, the disk-shaped resin piece surrounded by the fragile portion 1L is separated from the protruding portion 1F, and detached to the outside of the protruding portion 1F. When the shaft 19 is retrieved from the broken portion, the shaft 19 can be detached from the first intermediate portion 11. The operation of the internal structure after the shaft 19 is detached is as described in the first embodiment.

Actions and Effects of Third Embodiment

In the connector 100 according to the present embodiment, the shaft 19 is covered with the protruding portion 1F that is integrally molded as a portion of the main body case 1A, so that as compared with the connector 100 according to the first embodiment having the shaft insertion portion 1H, foreign matters such as water or dust can be inhibited from entering the inside of the main body case 1A. Therefore, damage to the shaft 19 or other internal structures of the connector 100 due to dirt, dust, or the like is alleviated. Also, because the shaft 19 is covered with the protruding portion 1F, the shaft 19 cannot be easily removed from the outside. Therefore, the shaft 19 can be prevented from being pulled out during normal use by mischief or the like.

In the connector 100 according to the present embodiment, in a case where the above-described abnormal situation occurs, fixing of the first arm 10 to the main body portion 1 can be released by detaching the shaft 19 from the first intermediate portion 11. Therefore, the engaged state between the hook 13 and inlet can be released. In this case, in the connector 100 according to the present embodiment, although the shaft 19 is covered with the protruding portion 1F, the accurate position of the shaft 19 can be identified from the outside through the identification portion 1K. Also, in the connector 100 according to the present embodiment, only the portion of the fragile portion 1L of the main body case 1A can be readily broken, so the shaft 19 can be exposed to the outside.

In the connector 100 according to the present embodiment, the main body case 1A is made of resin, and therefore, as compared with the connector 100 according to the first embodiment, the cost and weight of the connector 100 can be reduced. Also, the shape of the main body case 1A has excellent load resistance, specifically, excellent vehicle load resistance. Therefore, even though the main body case 1A is made of resin, the main body case 1A is less likely to be damaged even if the main body case 1A is run over by a vehicle.

Fourth Embodiment

[Connector]

Figure 30:
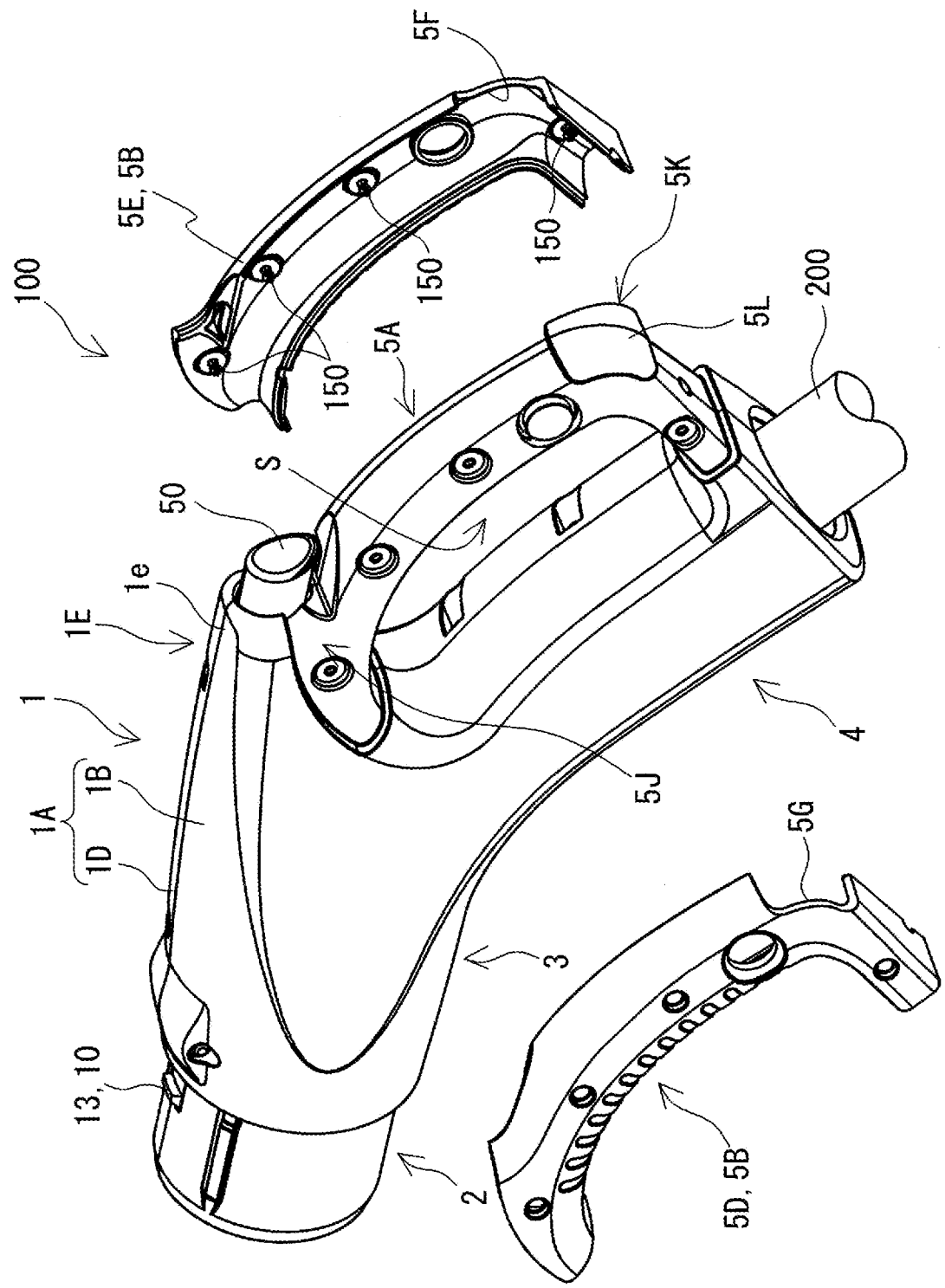
FIG. 30 is a partial exploded perspective view schematically illustrating a connector according to a fourth embodiment.
Figure 31:
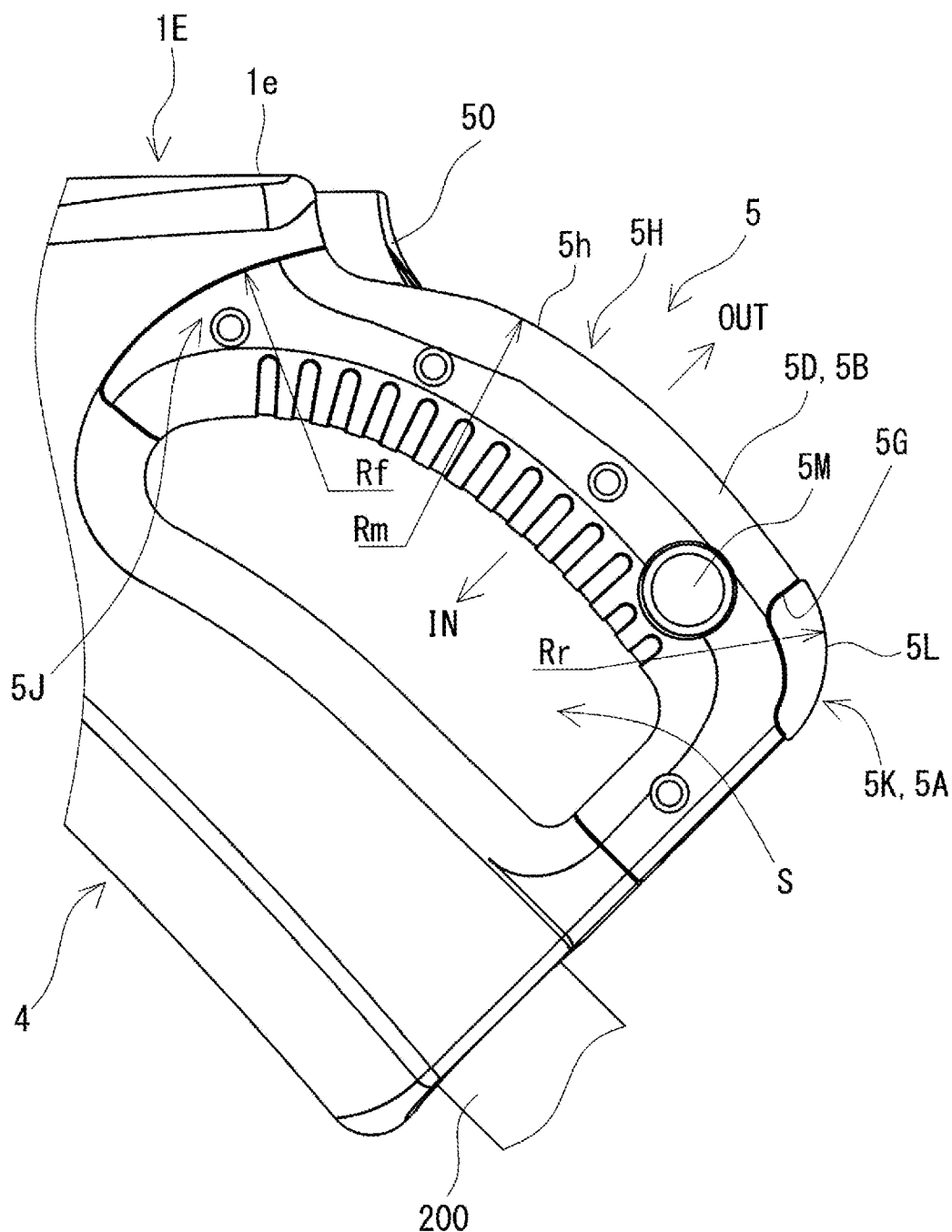
FIG. 31 is a side view schematically illustrating a handle portion provided in the connector according to the fourth embodiment.

A connector 100 according to the fourth embodiment is explained mainly with reference to FIG. 1, FIG. 30, and FIG. 31. The connector 100 according to the present embodiment is different from the first embodiment in that a particular portion of the outer surface that is the exposed surface of the handle portion 5 is constituted by a metal surface. In the following explanation, the difference from the first embodiment is mainly explained. Explanation about substantially the same configuration as in the first embodiment may be omitted. In the following explanation, a side of the handle portion 5 closer to the main body case 1A is referred to as an inner side, and a side opposite thereto is referred to as an outer side. In FIG. 31, "IN" indicates the inner side, and "OUT" indicates an outer side.

(Covered Portion)

The main body case 1A includes a covered portion 1E. As illustrated in FIGS. 1 and 31, the covered portion 1E covers an outer side of a front side bent portion 5J, explained later, of the handle portion 5. The covered portion 1E is constituted by a portion of the main body case 1A. Specifically, the material of the covered portion 1E is the same as the metal of the main body case 1A. The covered portion 1E includes a metal exposed surface 1e exposed to the outside.

The metal exposed surface 1e is constituted by the same metal as the main body case 1A. Accordingly, damage to the front side bent portion 5J that occurs when the connector 100 is dropped is likely to be alleviated. This is because when the connector 100 is dropped, the outer side of the front side bent portion 5J, which is likely to collide with the ground, is covered with the covered portion 1E, so that the metal exposed surface 1e of the covered portion 1E can be caused to collide with the ground. Therefore, the front side bent portion 5J can be prevented from colliding with the ground.

The covered portion 1E preferably covers at least a portion of the push button switch 50 by extending to the outside of the front side bent portion 5J, specifically, by extending to a further outer side than the outer edge of the outer side of the push button switch 50 provided immediately above the front side bent portion 5J as shown in this example. In this case, damage to the push button switch 50 that occurs when the connector 100 is dropped is likely to be alleviated. This is because when the connector 100 is dropped, the metal exposed surface 1e of the covered portion 1E can be caused to collide with the ground, so that the push button switch 50 can be inhibited from colliding with the ground.

[Handle Portion]

In the present embodiment, the outer contour shape in a cross section orthogonal to the longitudinal direction of the handle portion 5 is a rectangular pillar shape. Alternatively to the present embodiment, the above-described outer contour shape may be a pillar shape of a polygon having five or more sides. Also, alternatively to the present embodiment, the above-described outer contour shape may be a circular cylindrical shape or elliptic pillar shape. The handle portion 5 according to this example includes a handle main body portion 5A and a cover portion 5B.

(Handle Main Body Portion)

As illustrated in FIG. 30, the handle main body portion 5A is integrally formed with the main body case 1A. Specifically, the material of the handle main body portion 5A may be the same metal as the main body case 1A. The shape of the handle main body portion 5A in the side view of the handle portion 5 is the same shape as the handle portion 5, and is a C shape in this example. The handle main body portion 5A is configured such that a portion corresponding to an exterior side surface of a rear side bent portion 5K, explained later, i.e., a metal exposed surface 5L, explained later, protrudes to the outside more greatly than a portion therearound. The amount of protrusion may be an amount equal to or more than the thickness of the cover portion 5B. In this case, the exterior side surface of the rear side bent portion 5K can constitute a portion of the exposed surface of the handle portion 5. The amount of protrusion and the thickness of the cover portion 5B may be the same as each other, and the external surface of the rear side bent portion 5K and the external surface of the cover portion 5B may be flush with each other. However, the amount of protrusion is preferably larger than the thickness of the cover portion 5B as in this example. In this case, as illustrated in FIG. 31, the exterior side surface of the rear side bent portion 5K protrudes to the outside more greatly than the external surface of the cover portion 5B. Therefore, when the connector 100 is dropped, the exterior side surface of the rear side bent portion 5K is caused to collide with the ground.

(Cover Portion)

As illustrated in FIG. 1, the cover portion 5B covers an area extending substantially the entirety of the handle main body portion 5A except for a portion corresponding to the exterior side surface of the rear side bent portion 5K, i.e., the metal exposed surface 5L, explained later. The surface of the cover portion 5B constitutes the majority of the exposed surface of the handle portion 5. As illustrated in FIG. 30, the cover portion 5B includes a left cover piece 5D and a right cover piece 5E that are left-and-right half-split C-shaped pieces. The left cover piece 5D and the right cover piece 5E are combined with each other by fastening the left cover piece 5D and the right cover piece 5E with multiple screws 150. The shape of the cover portion 5B in the side view of the handle portion 5 is a shape along the shape of the handle main body portion 5A, and is a C shape in this example. The left cover piece 5D and the right cover piece 5E are formed with notches 5F, 5G for exposing portions of the handle main body portion 5A to the outside.

As illustrated in FIGS. 1 and 30, the portions where the notches 5F, 5G are formed are portions corresponding to the metal exposed surface 5L, explained later, that is the exterior side surface of the rear side bent portion 5K, of the handle main body portion 5A. As illustrated in FIG. 31, the shape of each of the notches 5F, 5G is a rectangular shape in this example. Alternatively, the shape of each of the notches 5F, 5G may be in trapezoidal, triangular, bow shapes, and the like. The trapezoidal shapes include a right-angled trapezoid, an isosceles trapezoid, and the like. The bow shapes include a semicircle and the like. No matter what kind of shape each of the notches 5F, 5G has, a side of a straight line constituting the shape is provided to be along the boundary between the left cover piece 5D and the right cover piece 5E.

The material of the cover portion 5B may be preferably made of a resin-based material that has heat resistance against the highest temperature of the use of the cable 200 and that has low thermal conductivity. For example, the thermal conductivity of the resin-based material is preferably low. When the connector 100 is used outdoors, a resin-based material having weather resistance is more preferable. When the connector 100 is used in a low temperature environment, a resin-based material that further includes low-temperature resistance is preferable. For example, the embrittlement temperature of the resin-based material, which indicates low temperature brittleness, is preferably low. In view of the impact resistance, it is preferable that, for example, the Charpy impact strength of the resin-based material is high. The material of the cover portion 5B can be appropriately selected in view of the operating temperature of the connector 100. For example, the operating temperature of the connector 100 is about −30° C. to 50° C. Examples of the material of the cover portion 5B include polycarbonate resin, polybutylene terephthalate resin, and fiber reinforced plastic. As the material of the cover portion 5B, polycarbonate resin is particularly suitable in view of the impact resistance. The handle portion 5 has a grip area 5H, a front side bent portion 5J, and a rear side bent portion 5K.

(Grip Area)

The grip area 5H is a portion that the user directly grips, that is, a portion that the user touches by hand. The grip area 5H is provided in the center of the longitudinal direction of the handle portion 5, as illustrated in FIG. 31. The grip area 5H is formed over the entire circumference in the circumferential direction of the handle portion 5. In this example, the inner side of the grip area 5H has a surface in which irregularities are repeatedly formed along the longitudinal direction. The irregularities achieve non-slip property when the user grips grip area 5H. In this example, the shape of the grip area 5H is an arc shape that gently curves so as to be convex toward the outer side. This shape is a shape in the side view of the handle portion 5. Therefore, it is easy for the user to grip the grip area 5H. The shape of the grip area 5H may be a straight line shape. The grip area 5H is constituted by resin and has a resin exposed surface 5h that is exposed over the entirety of the grip area 5H. Therefore, it is easy for the user to directly grip the grip area 5H by hand. This is because even if the user directly grips the grip area 5H by hand, the user does not feel that the grip area 5H heated by the heat transfer from the cable 200 is excessively hot. The grip area 5H has a longitudinal central portion of the handle main body portion 5A and the cover portion 5B. The resin exposed surface 5h is constituted by the external surface of the cover portion 5B. Specifically, the shape of the resin exposed surface 5h has the same shape as the outer contour shape of the handle portion 5, and in this example, a rectangular pillar shape. The material of the resin exposed surface 5h is a resin-based material that is the same as the cover portion 5B.

(Front Side Bent Portion)

The front side bent portion 5J is provided on the front side of the grip area 5H of the handle portion 5. The front side bent portion 5J is formed to be bent toward the inner side. Similar to the grip area 5H, the shape of the front side bent portion 5J is curved so as to be convex toward the outer side. This shape is a shape in the side view of the handle portion 5. The shape of the front side bent portion 5J is an arc shape with a sharper bend than the grip area 5H. The outer side of the front side bent portion 5J is not exposed and is covered with the covered portion 1E. Therefore, when the connector 100 is dropped, the covered portion 1E can be caused to collide with the ground, and the front side bent portion 5J can be prevented from colliding with the ground. The front side bent portion 5J has a front portion of the handle main body portion 5A and a front portion of the cover portion 5B.

(Rear Side Bent Portion)

The rear side bent portion 5K is provided on the rear side of the grip area 5H of the handle portion 5 and is formed so as to curve toward the inner side. Similar to the grip area 5H and the front side bent portion 5J, the shape of the rear side bent portion 5K is curved so as to be convex toward the outer side. This shape is a shape in the side view of the handle portion 5. The shape of the rear side bent portion 5K is an arc shape with a sharper bend than the front side bent portion 5J. The rear side bent portion 5K has the metal exposed surface 5L exposed on the outer side. The metal exposed surface 5L is made of the metal integrated with the main body case 1A. Specifically, the material of the metal exposed surface 5L is the same metal as the main body case 1A. The rear side bent portion 5K is constituted by a rear portion of the handle main body portion 5A. The metal exposed surface 5L is constituted by the external surface of the handle main body portion 5A. The metal exposed surface 5L is exposed to the outside through the notches 5F, 5G. The shape of the metal exposed surface 5L is a shape corresponding to the shapes of the notch 5F, 5G, and in this example, a rectangular shape.

(Relationship Between Grip Area and Bend Radius of Each Bent Portion)

In the side view of the handle portion 5, the bend radius of the outer side of the front side bent portion 5J is referred to as Rf, the bend radius of the outer side of the grip area 5H is referred to as Rm, and the bend radius of the outer side of the rear side bent portion 5K is referred to as Rr. The magnitude relationship of these bend radiuses Rf, Rm, and Rr satisfy Rm>Rf and Rm>Rr. In this case, when the connector 100 is dropped, the resin exposed surface 5h is inhibited from colliding with the ground, and the metal exposed surface 1e and the metal exposed surface 5L can be caused to collide with the ground. In a case where the shape of the grip area 5H is a straight line, the bend radius Rm of the outer side of the grip area 5H does not exist, but Rm is deemed to be ∞ (infinite), and it is assumed that Rm>Rf and Rm>Rr are satisfied. In a case where each of the outer side of the front side bent portion 5J, the grip area 5H, and the rear side bent portion 5K is constituted by multiple curved surfaces, the bend radius Rf and the bend radius Rr are the maximum bend radius, and the bend radius Rm is the minimum bend radius. In this example, the magnitude relationship of the bend radiuses Rf, Rm, and Rr is Rm>Rf>Rr.

Actions and Effects of Fourth Embodiment

The connector 100 according to the present embodiment can alleviate damage of the main body case 1A and the handle portion 5 when the connector 100 is dropped. This is because the exposed surface of the rear side bent portion 5K and the exposed surface of the covered portion 1E, which are likely to collide with the ground when the connector 100 is dropped, include metal exposed surfaces 5L, 1e made of metal. Therefore, when the connector 100 is dropped, the metal exposed surfaces 5L, 1e can be caused to collide with the ground. Furthermore, it is easy for the user to directly grip the grip area 5H by hand. This is because, the exposed surface of the grip area 5H includes the resin exposed surface 5h constituted by resin, and even if the user directly grips the grip area 5H by hand, the user does not feel that the grip area 5H heated by the heat transfer from the cable 200 is excessively hot.

The connector 100 according to the present embodiment is preferably used for a connector of which the external diameter of the cable is, for example, 35 mm or more, and the cross sectional area of the conductor that is the power line provided in the cable is, for example, 65 mm$^2$ or more. The connector 100 can be suitably used as a connector with an electric rating of more than 50 kW. Because cables for such a high current application tend to require large connectors, it is particularly effective to employ the connector 100 according to the present embodiment as the connector for such an application in order to prevent damage of the connector that occurs when the connector is dropped.

Test Examples

Using the connector 100 according to the present embodiment, how the connector 100 is damaged after a dropping impact test is evaluated.

The dropping impact test was conducted in a room temperature environment as follows. The connector 100 related to the embodiment was connected to the front end of the cable 200 with a length of 2.25 m, and the rear end of the cable 200 was fixed at a height of 1 m above the ground. The connector 100 was lifted and the cable 200 was pulled so that the cable 200 was parallel to the ground at a height of 1 m above the ground over its entire length. In that state, the connector 100 was dropped to the ground. In this case, the rear end of the cable 200 remains fixed at a height of 1 m above the ground. The total number of times the cable 200 was dropped was eight. For each drop, the cable 200 was dropped upon rotating the connector 100 45 degrees in the circumferential direction with the cable 200 as the axis.

As a result, the connector 100 was not damaged to such an extent that its functionality is impaired. The surface of the connector 100 was visually checked. As a result, it was found that the metal exposed surface 1e and the metal exposed surface 5L collided with the ground on the basis of damage such as scratches on the surface of the connector 100. In addition, it was found that damage caused by the dropping was not substantially made on the resin exposed surface 5h, and the grip area 5H did not collide with the ground when the cable 200 was dropped.

As a comparison, a connector that is the same as the connector 100 according to the embodiment except that the entirety of the external surface that is the exposed surface of the handle portion of the connector is made of resin was prepared, and the same dropping impact test was conducted. As a result, the handle portion was damaged.

Fifth Embodiment

[Connector]

Figure 32:
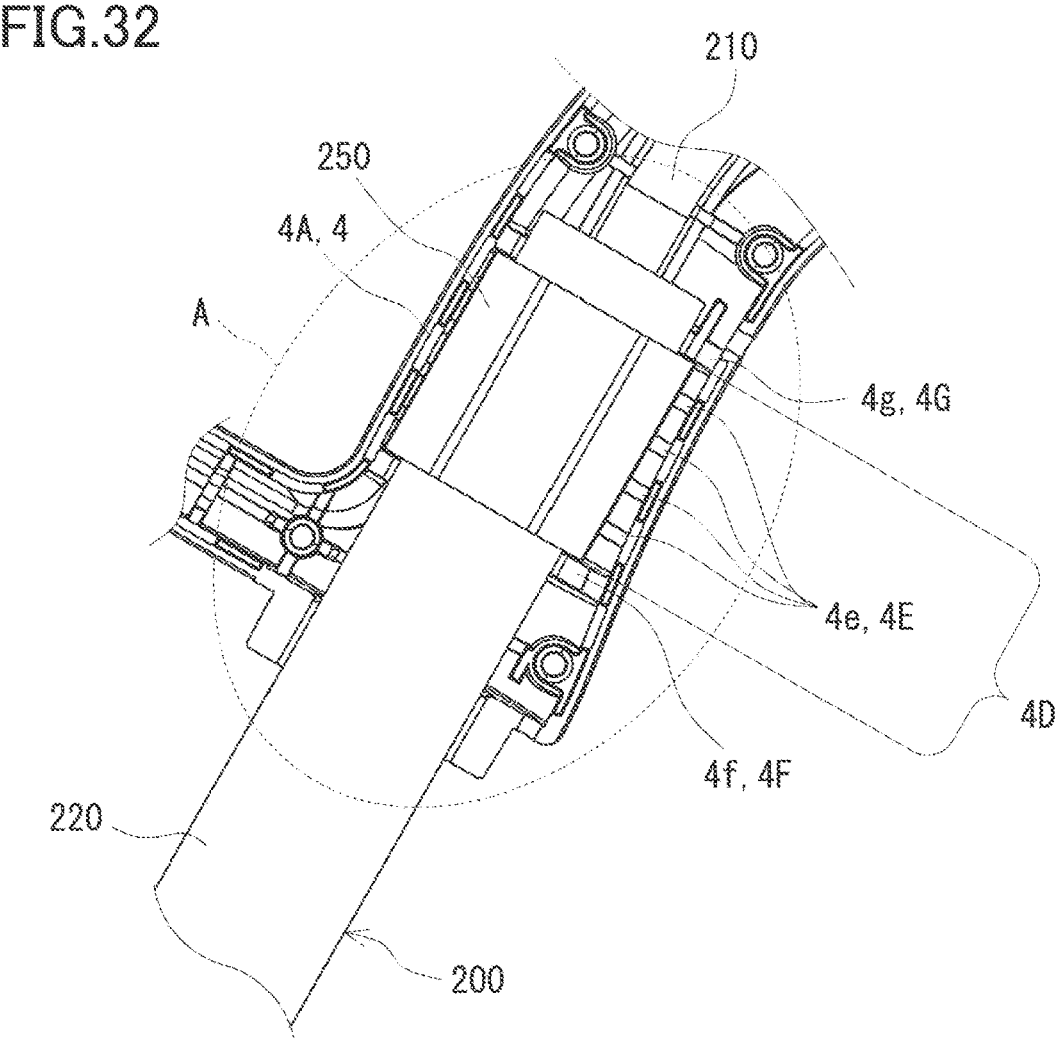
FIG. 32 is a right side view schematically illustrating the inside of a grip portion of a connector according to a fifth embodiment.

A connector 100 according to the fifth embodiment is explained mainly with reference to FIG. 1 and FIGS. 32 to 39. The connector 100 according to the present embodiment is different from the first embodiment in the fixing structure of the cable 200 to the main body case 1A. Hereinafter, difference from the first embodiment is mainly explained. Explanation about substantially the same configuration as in the first embodiment may be omitted. FIG. 32 illustrates the inside around the left grip piece 4A of the grip portion 4, as seen from the right direction, with the right case 1D of the connector 100 detached for the sake of explanation.

[Cable]

Figure 33:
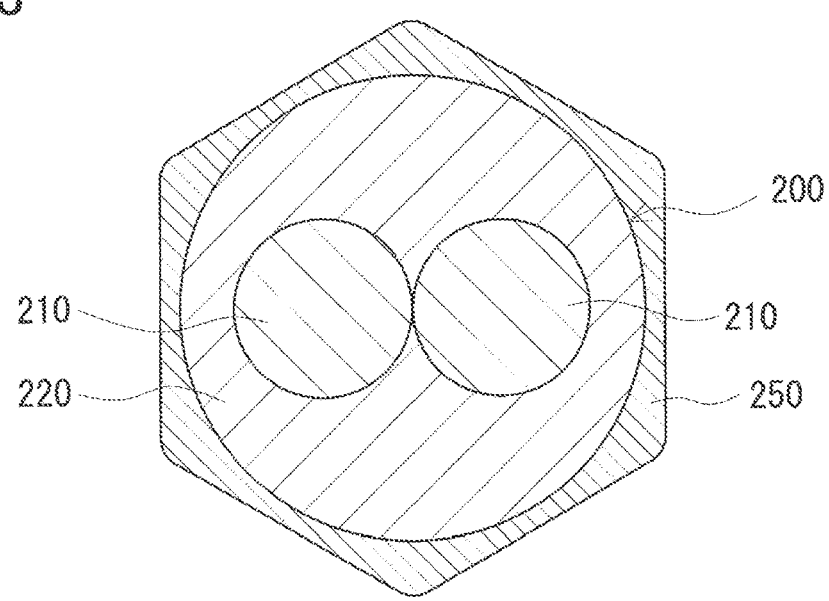
FIG. 33 is a lateral cross sectional view schematically illustrating an outer tubular portion of a cable of the connector according to the fifth embodiment.
Figure 34:
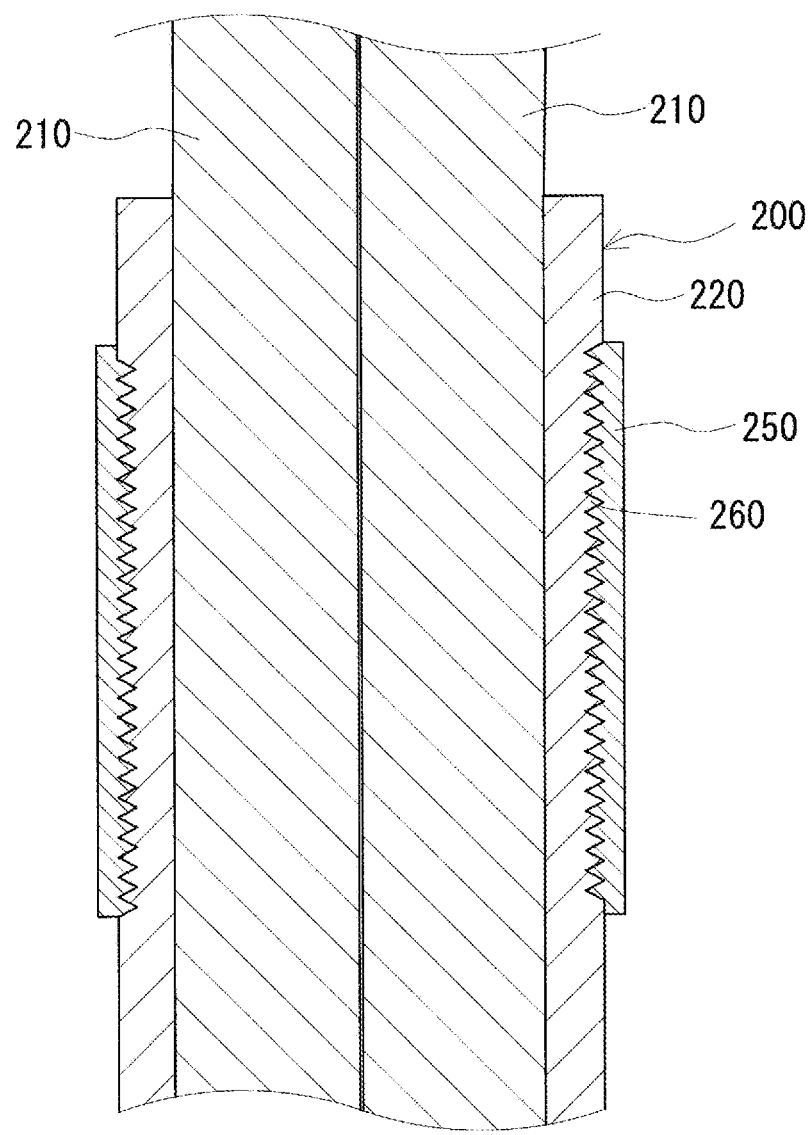
FIG. 34 is a longitudinal cross sectional view schematically illustrating the outer tubular portion of the cable of the connector according to the fifth embodiment.

As illustrated in FIGS. 33 and 34, the cable 200 is a composite cable that includes multiple wires 210 and a sheath 220 collectively covering the multiple wires 210. The lateral cross sectional view illustrated in FIG. 33 is a cross sectional view of an outer tubular portion 250 explained later taken along the direction orthogonal to the axial direction of the cable 200. The longitudinal cross sectional view illustrated in FIG. 34 is a cross sectional view of the outer tubular portion 250 taken along the axial direction of the cable 200. The multiple wires 210 are integrated by the sheath 220. Each of the wires 210 is an insulated wire in which the conductor is coated with an insulator. In this case, two wires 210 are illustrated as a typical case, but in reality, there is a wire corresponding to each terminal contained in the insertion portion 2. As illustrated in FIG. 32, at the tip side of the cable 200 located inside the main body case 1A, the wires 210 are exposed from the sheath 220, and the wires 210 are separated and connected to the corresponding terminals.

The sheath 220 may be made of a material for a conventional cable sheath. The sheath 220 is made of an insulator such as rubber. Examples of this rubber include chloroprene rubber (CR), ethylene propylene rubber (EPM, EPDM), butadiene rubber (BR), butyl rubber (IIR), styrene butadiene rubber (SBR), nitrile rubber (NBR), fluororubber (FKM, FFKM), and the like.

[Outer Tubular Portion]

The cable 200 includes the outer tubular portion 250 in a portion of the longitudinal direction provided in the inside of the main body case 1A. As illustrated in FIG. 33, the outer tubular portion 250 covers the circumference of the cable 200. The external shape of the outer tubular portion 250 is a non-circular shape. The external shape means an external shape as seen from the axial direction of the cable 200. Examples of non-circular shapes include polygonal, oval, elliptic shapes, and the like. In the present embodiment, the external shape of the outer tubular portion 250 is a substantially regular hexagonal shape. The external shape of the outer tubular portion 250 is preferably a regular polygonal shape of which the number of sides of the polygon is an even number that is equal to or more than four.

In the present embodiment, the outer tubular portion 250 is a metal sleeve. The outer tubular portion 250 is crimped to the outer peripheral surface of the cable 200. A circular tube-shaped metal sleeve is fit into a predetermined position of the cable 200. The sleeve is passed through a die with a die hole in a predetermined shape, and the sleeve is compressed in the diameter direction. The shape of the die hole in the present embodiment is approximately a regular hexagon. Due to this compression, the sleeve is fixed to the cable 200 and the external shape of the sleeve is plastically deformed into a predetermined shape to form the outer tubular portion 250.

The outer tubular portion 250 may be made of resin or rubber. For example, the outer tubular portion 250 in the predetermined shape may be formed by molding rubber or resin around the outer peripheral surface of the cable 200 through outsert molding. Also, a molded product obtained by molding resin or rubber into a predetermined shape may be fitted on the outer peripheral surface of the cable 200 to form the outer tubular portion 250 in the predetermined shape. The outer tubular portion 250 may be formed by bonding the above-described molded product with an adhesive.

The outer tubular portion 250 is formed by crimping the metal sleeve, so that as compared with the case where the outer tubular portion 250 is formed through outsert molding of resin and rubber, the outer tubular portion 250 can be formed more easily. Furthermore, with the crimping of the metal sleeve, the outer tubular portion 250 can securely grip the cable 200. Therefore, with the outer tubular portion 250, not only the sheath 220 of the surface portion of the cable 200 but also the wires 210 inside of the cable 200 can be bound sufficiently. Examples of metals forming the sleeve include aluminum, aluminum alloys, copper, copper alloys, iron, iron alloys, steel, stainless steel, and the like. In particular, aluminum alloys, which are lightweight, have high strength, and have excellent workability and corrosion resistance, are suitable. The outer tubular portion 250 according to the present embodiment is made of an aluminum alloy.

In a case where the outer tubular portion 250 is formed by crimping the metal sleeve, the external shape of the outer tubular portion 250 is preferably a regular polygonal shape of which the number of sides of the polygon is an even number that is equal to or more than six, and is more preferably a regular polygonal shape of which the number of sides of the polygon is an even number that is equal to or more than six and that is equal to or less than sixteen. In a case where the outer tubular portion 250 is made in a regular polygonal shape of which the number of sides of the polygon is an even number that is equal to or more than six, when the metal sleeve is crimped, the sleeve can be readily compressed, and the outer tubular portion 250 can securely grip the cable 200. In a case where the outer tubular portion 250 is made in a regular polygonal shape of which the number of sides of the polygon is an even number that is equal to or less than sixteen, when the metal sleeve is crimped, the sleeve can be readily formed into the polygonal shape, and the external shape of the outer tubular portion 250 can be brought closer to a circular shape.

As illustrated in FIG. 34, multiple protrusions 260 are formed on the inner peripheral surface of the outer tubular portion 250. The multiple protrusions 260 are arranged side by side in the axial direction of the outer tubular portion 250. In the present embodiment, the cross-sectional shape of each protrusion 260 is in a substantially V-shape. The multiple protrusions 260 are formed by forming screw grooves having a substantially V-shaped cross section on the inner peripheral surface of the metal sleeve. The height of each protrusion 260 may be appropriately set according to the thickness and the like of the sheath 220 so as not to damage the wire 210.

[Grip Portion]

As illustrated in FIG. 1, the grip portion 4 gripping the cable 200 constitutes the rear end of the main body portion 1, and is located below the handle portion 5. The grip portion 4 includes a left grip piece 4A and a right grip piece 4B that are left-and-right half-split pieces. The left grip piece 4A is constituted by a portion of the left case 1B. The right grip piece 4B is constituted by a portion of the right case 1D. Specifically, the material of the grip portion 4 is the same metal as the main body case 1A. In this example, the grip portion 4 is made of an aluminum alloy. The left grip piece 4A and the right grip piece 4B have the same shape. The left grip piece 4A and the right grip piece 4B can be combined with each other by fastening them with multiple screws. The external shape of the grip portion 4 can be selected as appropriate. The external shape of the grip portion 4 according to the present embodiment is a rectangular pillar shape. Alternatively to the present embodiment, the external shape of the grip portion 4 may be a polygonal pillar shape of which the number of sides of the polygon is equal to or more than four, or may be a circular tube-shape.

(Tube Containment Portion)

Figure 35:
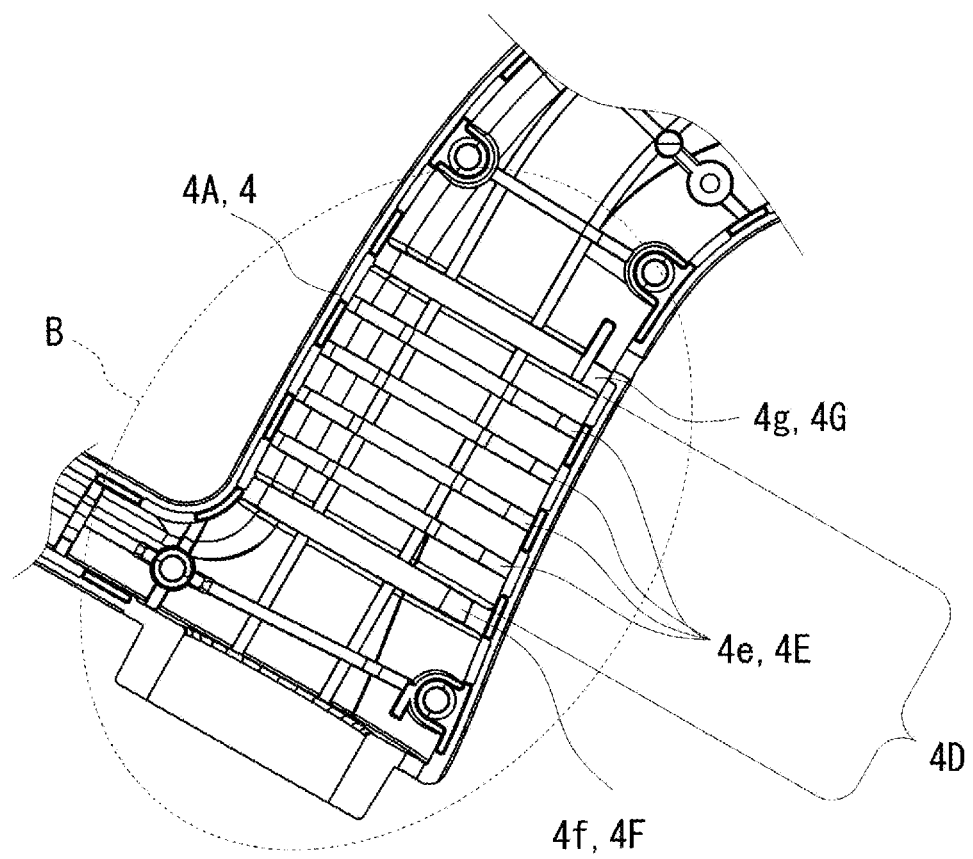
FIG. 35 is a left side view schematically illustrating the inside of a left grip piece of the connector according to the fifth embodiment.

As illustrated in FIG. 32 and FIGS. 35 to 37, an outer tube containment portion 4D for containing the outer tubular portion 250 is provided in a portion of the inner surface of the grip portion 4 where the cable 200 is inserted. FIGS. 32 and 35 illustrate the outer tube containment portion 4D provided in the left grip piece 4A, as a representing example. Although not illustrated, an outer tube containment portion is also provided in the right grip piece 4B. The outer tube containment portion 4D is provided with at least one of a rotation stop portion 4E illustrated in FIGS. 36 to 38, a retaining portion 4F illustrated in FIGS. 36, 37, and 39, and a push-holding portion 4G illustrated in FIGS. 36 and 37.

<Rotation Stop Portion>

Figure 36:
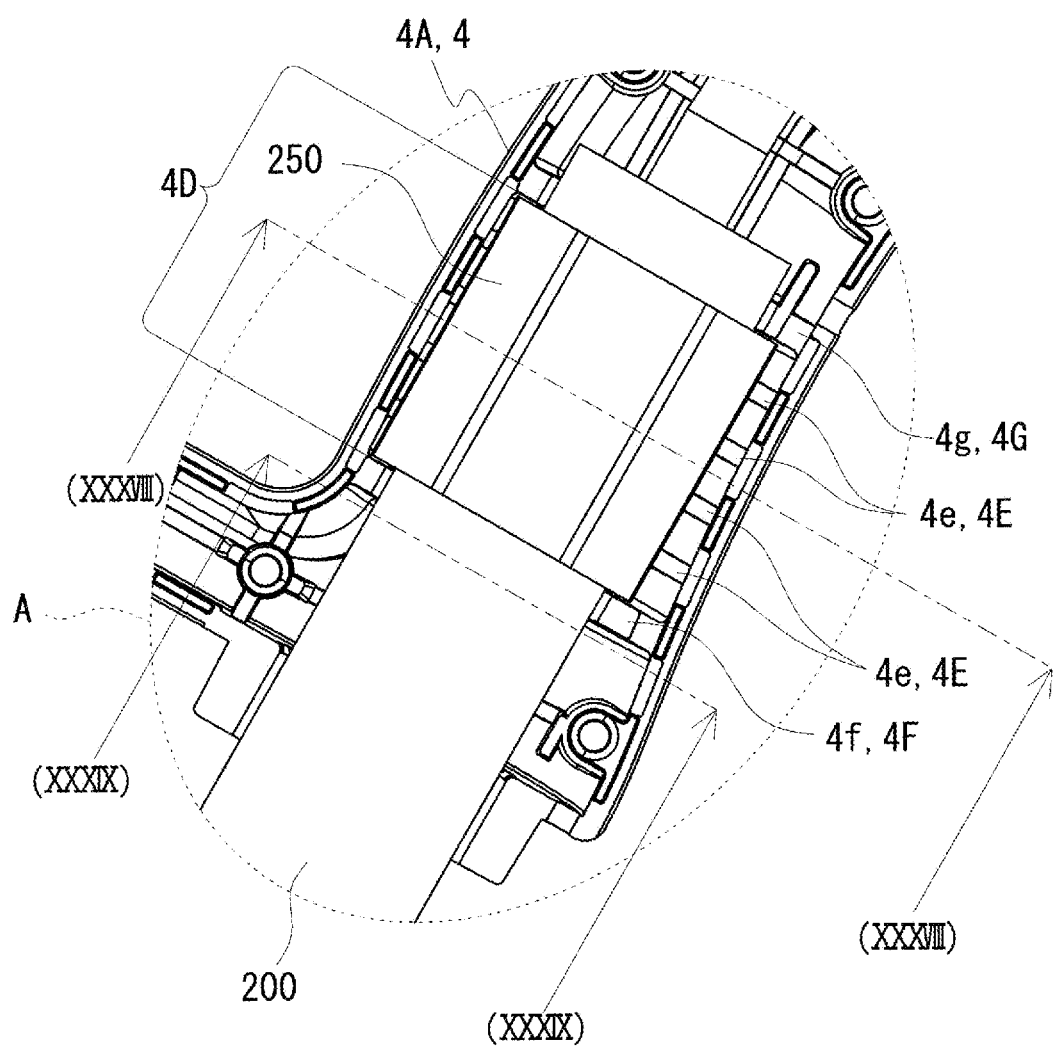
FIG. 36 is an enlarged view of an area A of FIG. 32.
Figure 37:
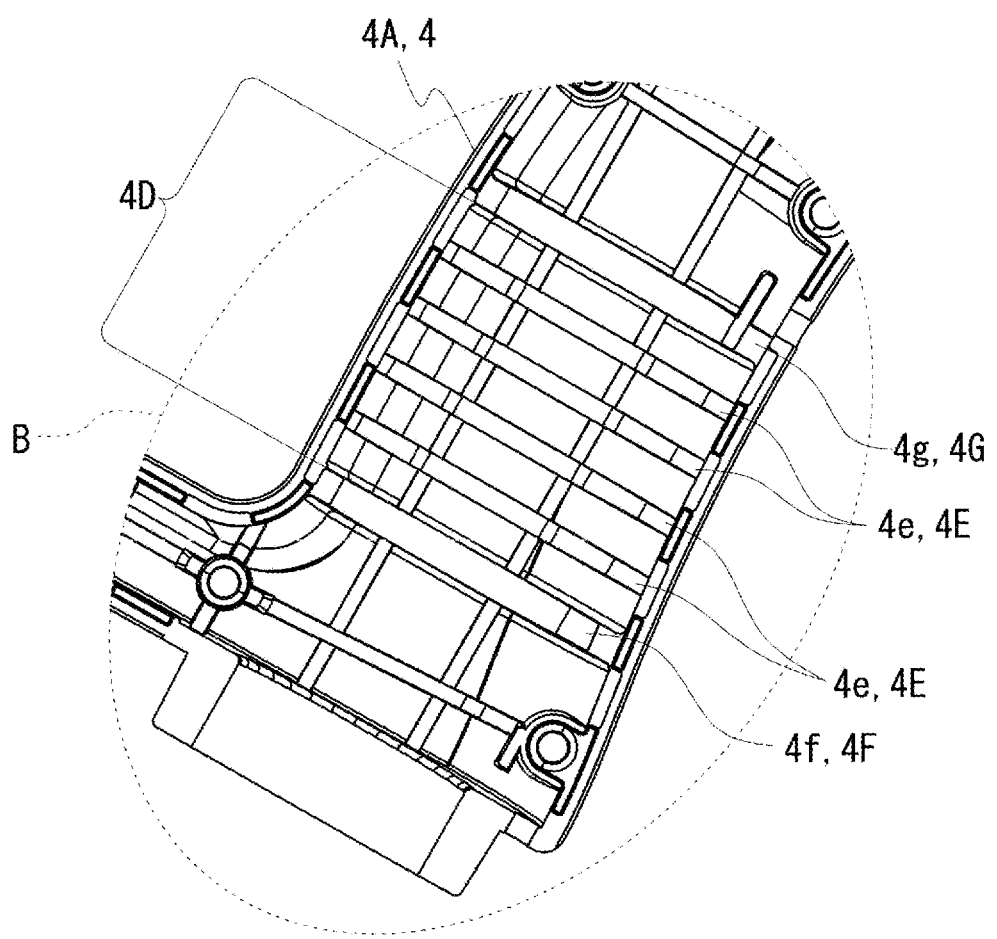
FIG. 37 is an enlarged view of an area B of FIG. 35.
Figure 38:
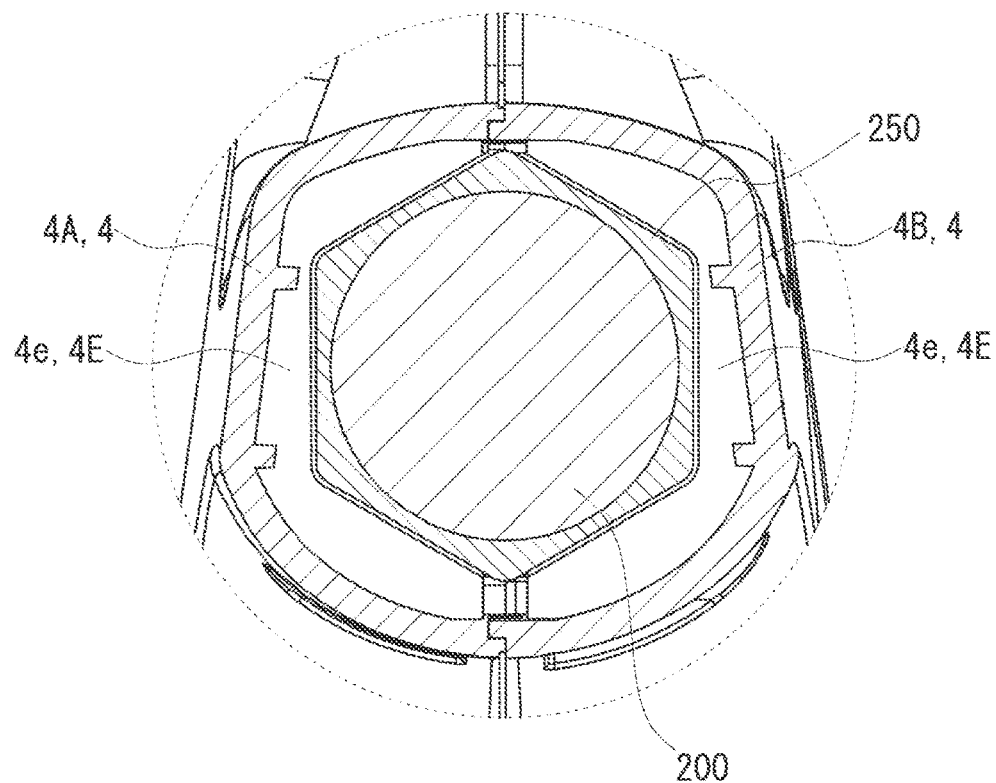
FIG. 38 is a cross sectional view taken along XXXVIII-XXXVIII of FIG. 36.

As illustrated in FIGS. 36 to 38, the rotation stop portion 4E inhibits the rotation of the cable 200. When it is attempted to rotate the cable 200, the rotation stop portion 4E is formed so that the outer peripheral surface of the outer tubular portion 250 comes into contact with and is stopped by the inner peripheral surface of the rotation stop portion 4E. The rotation stop portion 4E protrudes from the inner peripheral surface of the outer tube containment portion 4D to the inner side in the diameter direction. The inner shape of the rotation stop portion 4E is the above-described non-circular shape. The inner shape means an inner shape as seen from the insertion direction of the cable 200.

For example, in a case where the external shape of the outer tubular portion 250 and the inner shape of the rotation stop portion 4E are regular rectangular shapes, these shapes may be such that the circumscribed circle of the external shape of the outer tubular portion 250 is larger than the inscribed circle of the inner shape of the rotation stop portion 4E. The inner shape of the rotation stop portion 4E is preferably a shape that is along the external shape of the outer tubular portion 250. When the inner shape of the rotation stop portion 4E is the same shape as the external shape of the outer tubular portion 250, the outer peripheral surface of the outer tubular portion 250 and the inner peripheral surface of the rotation stop portion 4E come into proximity with each other. Therefore, a gap between the outer peripheral surface of the outer tubular portion 250 and the inner peripheral surface of the rotation stop portion 4E can be reduced. Therefore, the rotation angle of the outer tubular portion 250, i.e., the rotation angle of the cable 200 can be reduced. As illustrated in FIG. 38, in the present embodiment, the inner shape of the rotation stop portion 4E is a substantially regular hexagonal shape that is the same as the external shape of the outer tubular portion 250. As illustrated in FIGS. 36 and 37, the multiple rotation stop portions 4E are provided with intervals in the axial direction of the outer tube containment portion 4D.

In the present embodiment, as illustrated in FIG. 38, rotation stop pieces 4e are provided integrally to protrude toward the inner side in the diameter direction from the inner peripheral surface of the left case 1B that correspond to the outer tube containment portion 4D. Although not illustrated, similar to the left case 1B, the rotation stop pieces 4e are also provided in the right case 1D. When the main body case 1A is made by combining the left case 1B and the right case 1D, the rotation stop portions 4E in the circular shape are made by combining the rotation stop pieces 4e of the left case 1B and the rotation stop pieces 4e of the right case 1D with each other.

<Retaining Portion>

Figure 39:
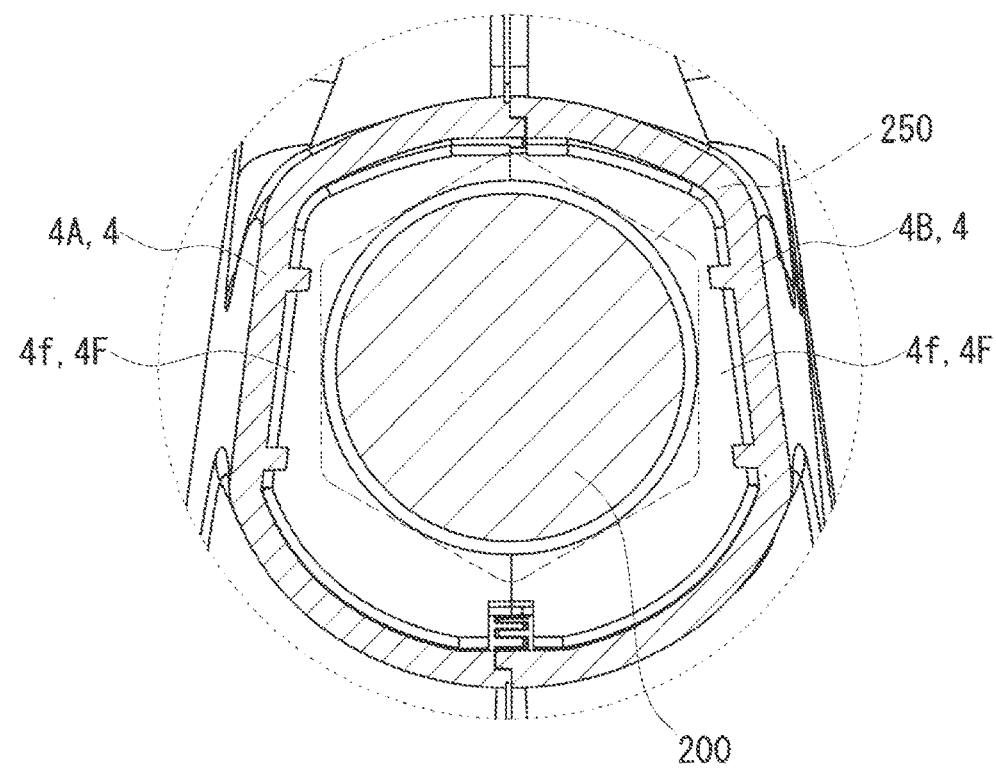
FIG. 39 is a cross sectional view taken along XXXIX-XXXIX of FIG. 36.

As illustrated in FIGS. 36, 37, and 39, the retaining portion 4F inhibits the outer tubular portion 250 from being unplugged from the grip portion 4. The retaining portion 4F protrudes from the inner peripheral surface of the grip portion 4 to the inner side in the diameter direction. The retaining portion 4F is in contact with the rear end surface of the outer tubular portion 250. The shape of the retaining portion 4F may be such a shape that the cable 200 can be inserted into the retaining portion 4F and that the retaining portion 4F is in contact with the rear end surface of the outer tubular portion 250. For example, the shape of the retaining portion 4F may be such that the inscribed circle of the inner shape of the retaining portion 4F is larger than the external diameter of the cable 200, and is smaller than the circumscribed circle of the external shape of the outer tubular portion 250. As illustrated in FIG. 39, the inner shape of the retaining portion 4F is a substantially circular shape that is larger than the external diameter of the cable 200 and that is smaller than the external shape of the outer tubular portion 250.

In the present embodiment, as illustrated in FIG. 39, an unplug stop piece 4f is integrally formed so as to protrude toward the inner side in the diameter direction from the inner peripheral surface of the portion of the left case 1B that corresponds to the rear end side of the outer tube containment portion 4D. Although not illustrated, similar to the left case 1B, another unplug stop piece 4f is also formed in the right case 1D. When the main body case 1A is made by combining the left case 1B and the right case 1D, the retaining portion 4F in the circular shape is made by combining the unplug stop piece 4f of the left case 1B and the unplug stop piece 4f of the right case 1D with each other.

<Push-Holding Portion>

As illustrated in FIGS. 36 and 37, the push-holding portion 4G inhibits the outer tubular portion 250 from excessively entering the inside of the main body portion 1. The push-holding portion 4G protrudes from the inner peripheral surface of the grip portion 4 to the inner side in the diameter direction. The push-holding portion 4G is in contact with the front end surface of the outer tubular portion 250. The shape of the push-holding portion 4G may be such a shape that the cable 200 can be inserted into the push-holding portion 4G and that the push-holding portion 4G is in contact with the front end surface of the outer tubular portion 250. Similar to the shape of the retaining portion 4F, for example, the shape of the push-holding portion 4G may be such a shape that the inscribed circle of the inner shape of the push-holding portion 4G is larger than the external diameter of the cable 200 and is smaller than the circumscribed circle of the external shape of the outer tubular portion 250. As illustrated in FIG. 39, similar to the retaining portion 4F, the inner shape of the push-holding portion 4G is a substantially circular shape that is larger than the external diameter of the cable 200 and is smaller than the external shape of the outer tubular portion 250. In this case, as illustrated in FIG. 39, the configuration of the push-holding portion 4G is the same configuration as the retaining portion 4F.

In the present embodiment, a push stop piece 4g is integrally formed so as to protrude toward the inner side in the diameter direction from the inner peripheral surface of the portion of the left case 1B that corresponds to the front end side of the outer tube containment portion 4D. Although not illustrated, similar to the left case 1B, another push stop piece 4g is formed in the right case 1D. When the main body case 1A is made by combining the left case 1B and the right case 1D, the push-holding portion 4G in the circular shape is made by combining the push stop piece 4g of the left case 1B and the push stop piece 4g of the right case 1D with each other.

Actions and Effects of Fifth Embodiment

In the connector 100 according to the present embodiment, even in a case where twisting force is applied to the cable 200 on the outer side of the main body case 1A, the outer peripheral surface of the outer tubular portion 250 comes into contact with and is stopped by the inner peripheral surface of the rotation stop portion 4E, so that rotation of the cable 200 is regulated. Therefore, the connector 100 according to the present embodiment can alleviate damage to the connection portion between the terminal and the wire 210 even if twisting force is applied to the cable 200.

In the connector 100 according to the present embodiment, with the retaining portion 4F and the push-holding portion 4G, the movement of the cable 200 in the longitudinal direction in the main body case 1A can be regulated. Therefore, the connector 100 according to the present embodiment can regulate the movement of the cable 200 in a tensile direction even when a tensile force is applied to the cable 200. Furthermore, the connector 100 according to the present embodiment can regulate the movement of the cable 200 in a push-in direction even when the cable 200 is pushed into the connector 100. Therefore, the connector 100 according to the present embodiment can alleviate damage to the connection portion between the terminal and the wire 210 even when a bending stress is applied to the connection portion between the terminal and the wire 210 when the cable 200 is pushed in. Furthermore, the cable 200 can be inhibited from being unplugged from the main body case 1A.

The outer tubular portion 250 is crimped to the cable 200, and therefore, the outer tubular portion 250 can securely grip the cable 200. In particular, multiple protrusions 260 are formed on the inner peripheral surface of the outer tubular portion 250, so that the protrusions 260 bite into the sheath 220 on the surface of the cable 200 due to crimping, and accordingly, the outer tubular portion 250 can more securely grip the cable. Therefore, the wires 210 inside of the cable 200 can be bound sufficiently. Even when the cable 200 is twisted, bent, or pulled, the outer tubular portion 250 can prevent the wires 210 from shifting in position from each other. Therefore, occurrence of stress concentration due to the shifting in position of the wires 210 from each other can be alleviated, and partial disconnection of the cable 200 caused by repeated twisting, bending, or pulling can be effectively alleviated.

Because the outer tubular portion 250 is formed by crimping the metal sleeve to the cable 200, the outer tubular portion 250 can be easily formed. Therefore, the task can be simplified, and the time it takes for the task (tact time) can be reduced.

Sixth Embodiment

[Connector]

A connector 100 according to the sixth embodiment is explained mainly with reference to FIG. 1 and FIGS. 40 to 45. The connector 100 according to the present embodiment is different from the connector 100 according to the first and fifth embodiments in that the connector 100 according to the present embodiment further includes an interposed member 70 that is interposed detachably between the cable 200 and the grip portion 4 to fill the diameter difference between the diameter difference cable 200 and the grip portion 4. Hereinafter, difference from the first and fifth embodiments is mainly explained. Explanation about substantially the same configuration as in the first and fifth embodiments may be omitted.

[Grip Portion]

The grip portion 4 can directly grip, without relying on the interposed member 70, a cable with an external diameter different from the external diameter of the cable 200 that is gripped via the interposed member 70.

Figure 43:
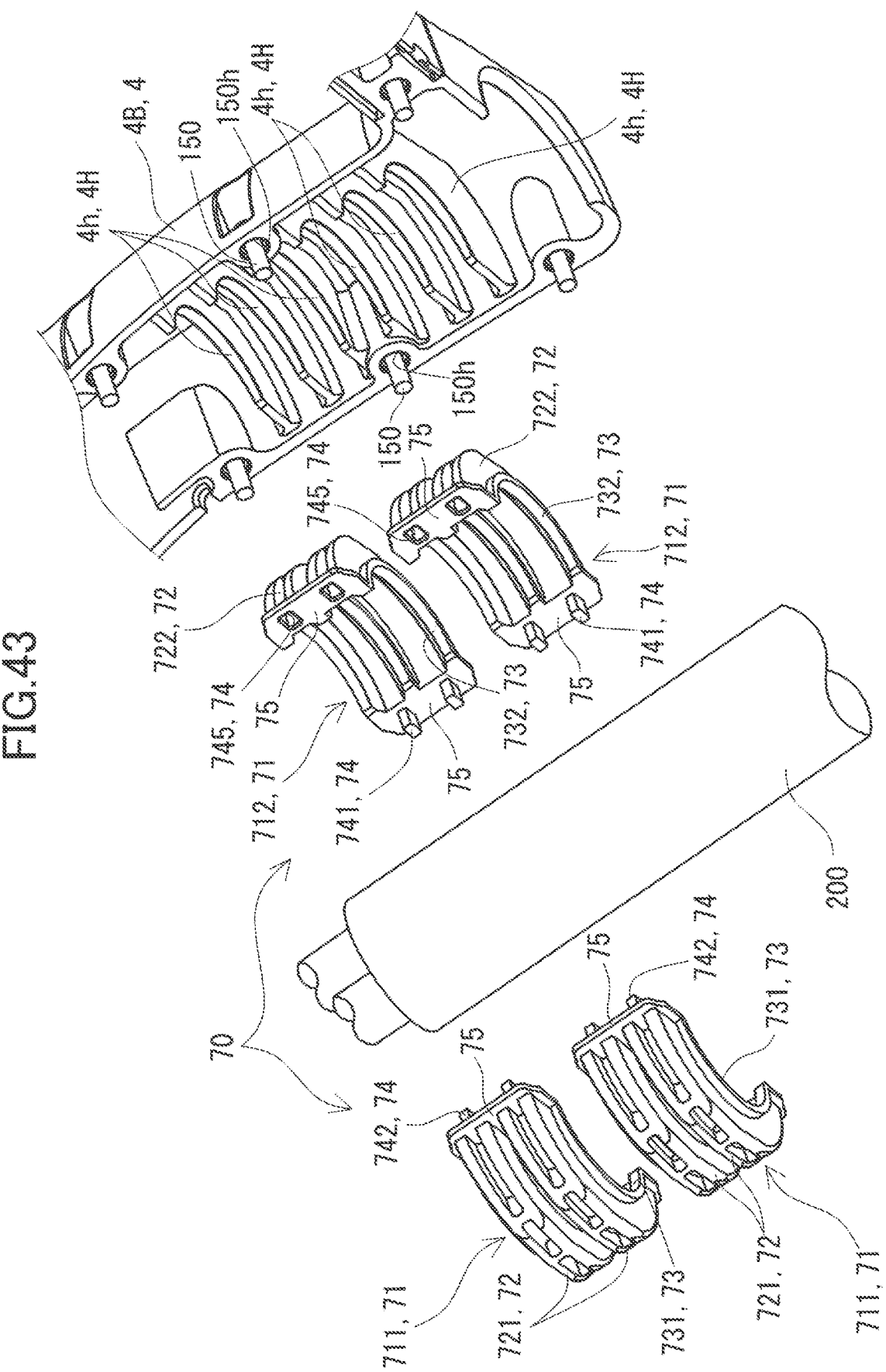
FIG. 43 is a partial exploded perspective view schematically illustrating around the grip portion of the connector illustrated in FIG. 42.

As illustrated in FIG. 43, the grip portion 4 according to the present embodiment includes multiple protrusion portions 4H that protrude from the inner peripheral surface of the grip portion 4 toward the cable 200 on the inner side. The multiple protrusion portions 4H are arranged side by side so as to divide the axial direction of the cable 200. As explained later, the interposed member 70 is detachable to the grip portion 4. Therefore, when the interposed member 70 is detached, the protrusion portions 4H can be caused to bite into the outer peripheral surface of the cable 200 having the external diameter corresponding to the inner diameter of the protrusion portions 4H. Therefore, with the multiple protrusion portions 4H, the movement of the cable 200 in the axial direction can be regulated. Between neighboring protrusion portions 4H, a groove is formed in which a fitting unit 72, explained later, of the interposed member 70 is fitted.

The number of protrusion portions 4H can be appropriately selected, and is six in this example. Specifically, the number of grooves explained above is five. At the central groove, screw holes 150h are formed on both ends in the circumferential direction of the cable 200. Screws 150 are inserted into the screw holes 150h. An interval between adjacent protrusion portions 4H can be appropriately selected. In the present embodiment, intervals between neighboring protrusion portions 4H are the same. Alternatively to the present embodiment, some of the intervals of the neighboring protrusion portions 4H may be configured to be larger or smaller than the remaining intervals.

The external shape of each protrusion portion 4H is a circular shape when the left grip piece 4A and the right grip piece 4B are combined. The inner circumferential contour shape of each protrusion portion 4H is a circular shape along the outer circumferential shape of the cable 200. Each protrusion portion 4H is made by combining two C-shaped protruding pieces 4h. The protruding pieces 4h are formed on both of the left grip piece 4A and the right grip piece 4B illustrated in FIG. 1. For the sake of explanation, FIG. 43 illustrates only the protruding pieces 4h of the right grip piece 4B, and protruding pieces of the left grip piece 4A illustrated in FIG. 1 have substantially the same configuration as the protruding pieces 4h of the right grip piece 4B, and therefore, the protruding pieces of the left grip piece 4A are not illustrated.

In the following explanation, the thickest cable with the largest external diameter may be referred to as a thick cable, and a thin cable with a smaller external diameter than the diameter of the thick cable may be referred to as a thin cable. The height of the protrusion portions 4H may be such that the inner diameter of the protrusion portions 4H corresponds to the external diameter of the thick cable explained above. The height refers to a length along the diameter direction of the cable 200. The projection portions 4H configured as described above can support multiple types of cables 200 with different external diameters. Specifically, the projection portions 4H configured as described above can support the thin cable by causing the stopper portion 73 of the interposed member 70 to bite into the outer peripheral surface of the thin cable and regulating the movement of the thin cable in the axial direction. Because the interposed member 70 is configured to be detachable as explained later, the projection portions 4H can also handle the thick cable by detaching the interposed member 70, allowing the protrusion portions 4H to bite into the outer peripheral surface of the thick cable, and regulating the movement of the thick cable in the axial direction.

Figure 45:
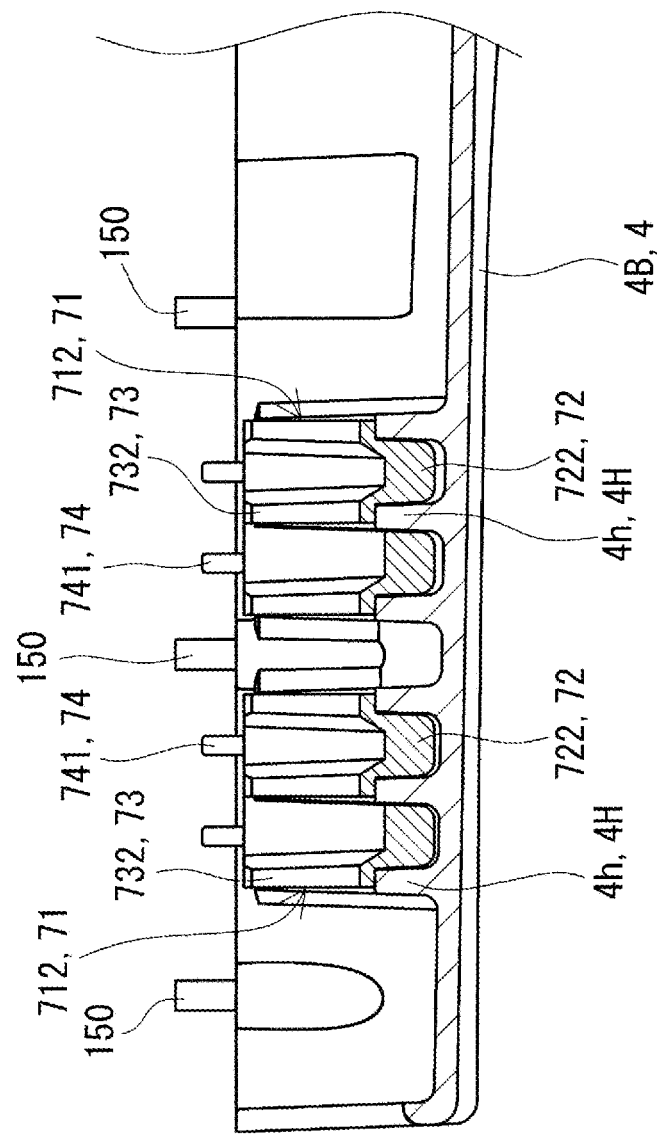
FIG. 45 is a cross sectional view taken along XLV-XLV of FIG. 42.

As illustrated in FIG. 45, the cross-sectional shape of each protrusion portion 4H is a rectangular shape with a substantially uniform thickness. The cross section refers to a cross section taken along the axial direction of the cable 200. The thickness refers to a length along the axial direction of the cable 200. The cross-sectional shape of each protrusion portion 4H is a rectangular shape, so that an interval between neighboring protrusion portions 4H, i.e., a width of the groove, is substantially uniform in the depth direction. The end face of each protrusion portion 4H is constituted by a flat surface. Therefore, the stopper portion 73 of the interposed member 70 can be easily overlaid.

The cross-sectional shape of each protrusion portion 4H may be a trapezoidal shape or a triangular shape of which the thickness at the tip side is smaller. In such cases, the width of the groove gradually decreases in the thickness direction, with the opening side of the groove being wider and the bottom side of the groove being narrower. In this case, the fitting unit 72 of the interposed member 70 can be easily fitted.

[Interposed Member]

Figure 40:
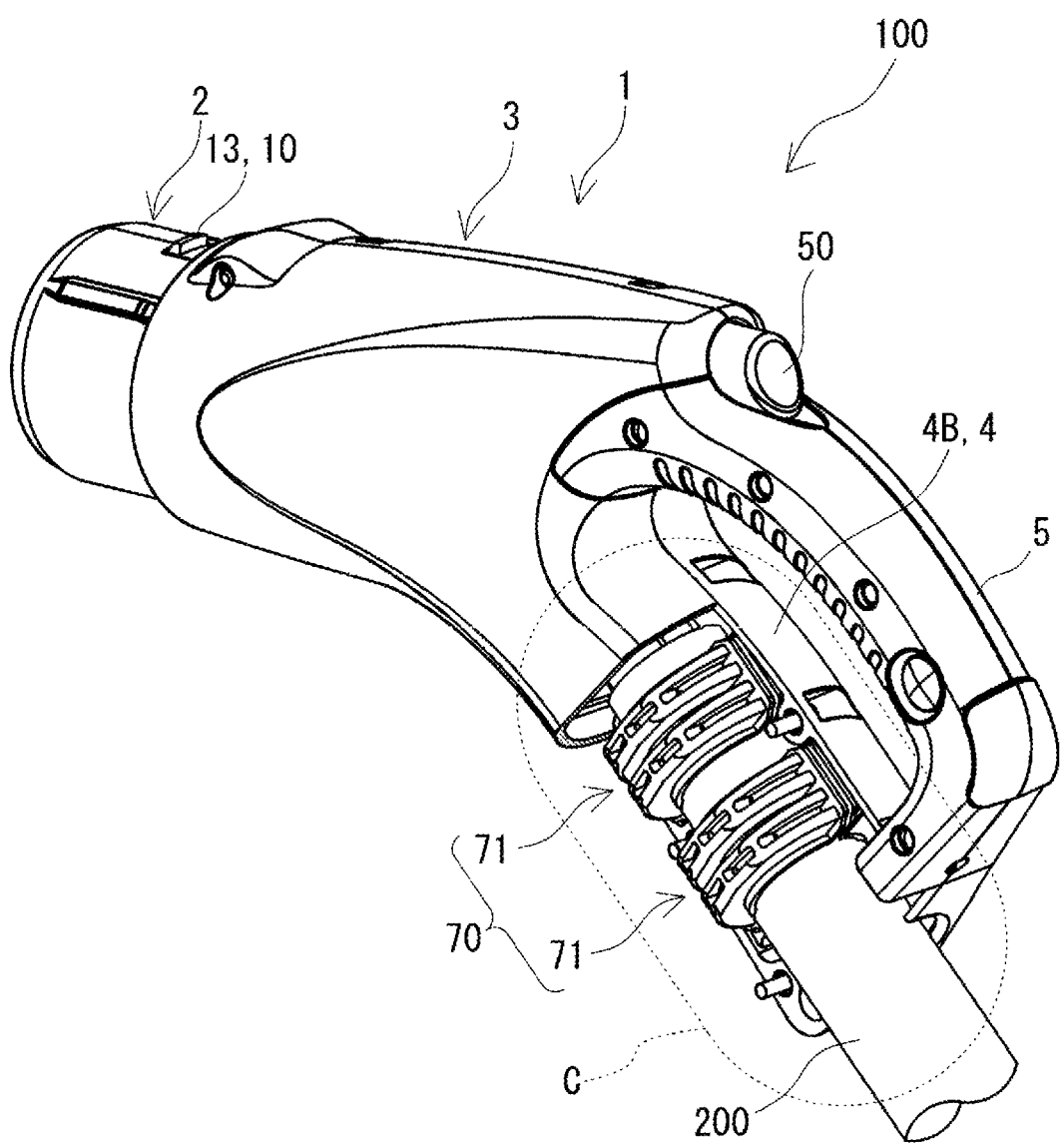
FIG. 40 is a perspective view schematically illustrating the inside of a grip portion provided in a connector according to the sixth embodiment as seen from the left rear side.
Figure 41:
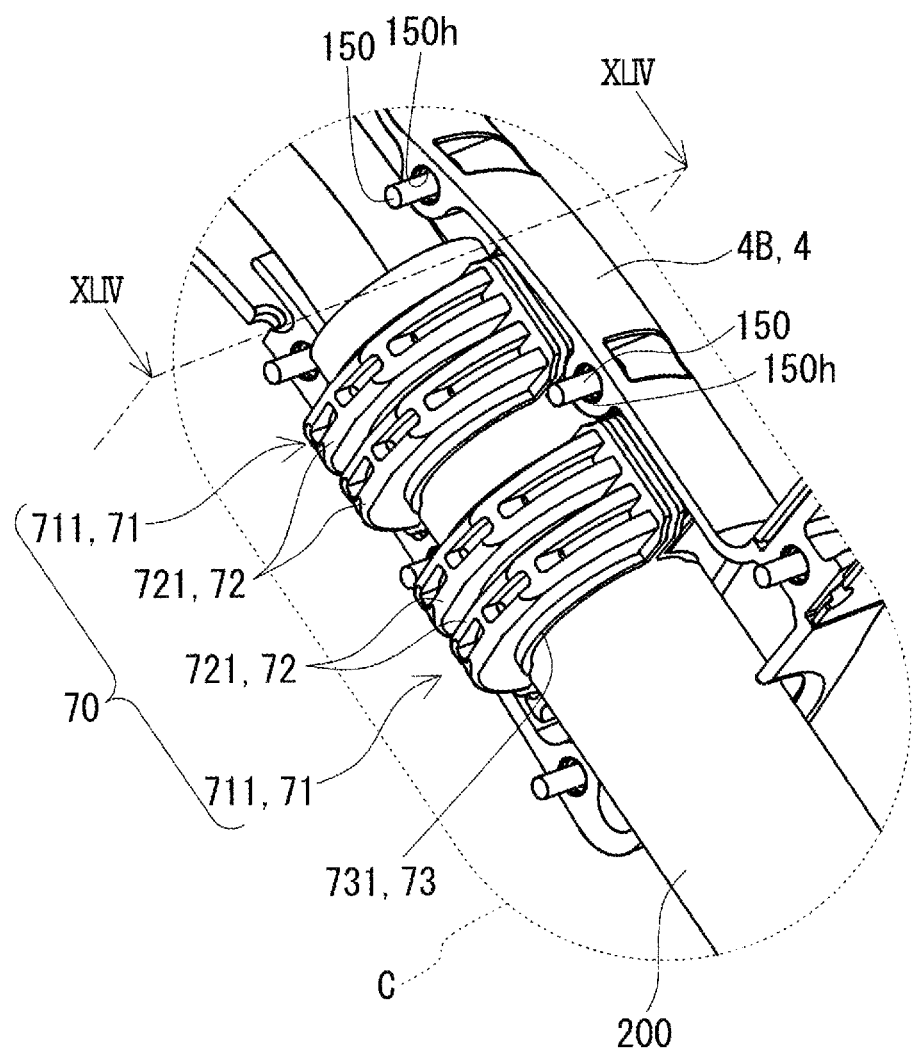
FIG. 41 is an enlarged view of an area C of FIG. 40.

As illustrated in FIGS. 40 and 41, the interposed member 70 is detachably interposed between the cable 200 and the grip portion 4 to fill the diameter difference between the diameter difference cable 200 and the grip portion 4. FIG. 40 is a drawing illustrating the connector 100 with a portion of the left grip piece 4A removed. With the interposed member 70, the cable 200 having an external diameter smaller than the inner diameter of the grip portion 4 can be supported.

Figure 42:
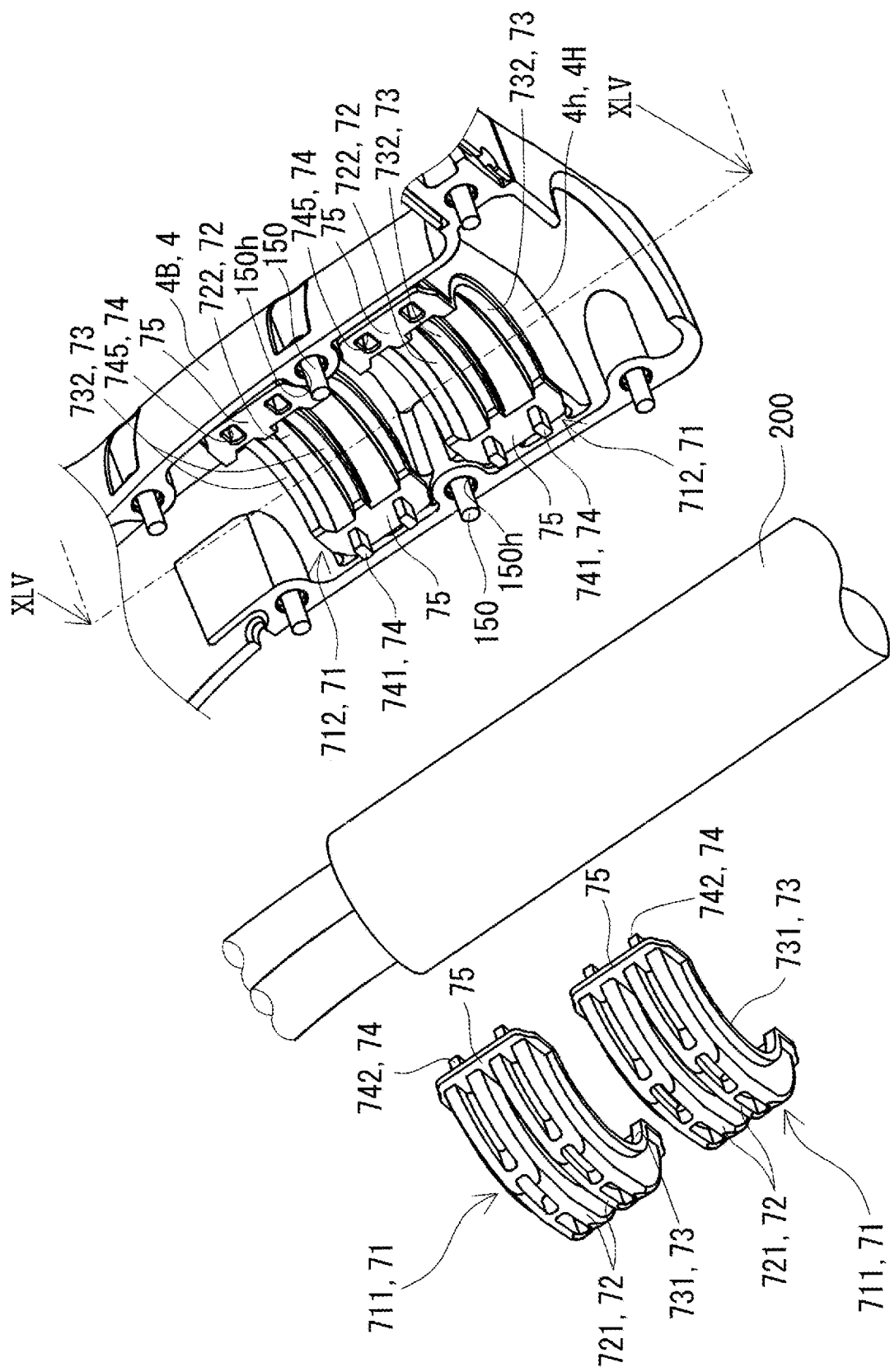
FIG. 42 is a partial exploded perspective view schematically illustrating around the grip portion of the connector illustrated in FIG. 41.

In the present embodiment, the interposed member 70 includes multiple interposed pieces 71 that are separated in the axial direction of the cable 200. Alternatively to the present embodiment, the interposed member 70 may be formed integrally in the axial direction of the cable 200. Depending on the shape and the like, it may be difficult to form the interposed member 70 that is formed integrally in the axial direction of the cable 200, but because the multiple interposed pieces 71 are separated in the axial direction of the cable 200, the interposed pieces 71 can be formed easily. This is because, when the multiple interposed pieces 71 are separated, the length of each of the interposed pieces 71 along the axial direction of the cable 200 can be reduced. The number of interposed pieces 71 can be appropriately selected. In the present embodiment, the number of interposed pieces 71 is two. Alternatively to the present embodiment, the number of interposed pieces 71 may be three or more. The two interposed pieces 71 are separated in the axial direction of the cable 200. As illustrated in FIG. 42, a single groove is interposed between the two interposed pieces 71.

In the present embodiment, as illustrated in FIG. 41, the shape of each of the interposed pieces 71 is a circular tubular shape when a left divided piece 711 and a right divided piece 712, explained later, are combined. Accordingly, the diameter difference over the entire circumference between the cable 200 and the grip portion 4 can be filled. As illustrated in FIGS. 42 and 43, each of the interposed pieces 71 is made by combining the left divided piece 711 and the right divided piece 712 that are left-and-right half-split semicircular tubular shapes. The left divided piece 711 and the right divided piece 712 have the same shape as each other. In the present embodiment, each of the interposed pieces 71 includes the fitting unit 72 and the stopper portion 73.

(Fitting Unit)

As illustrated in FIGS. 42 and 45, the fitting unit 72 is fitted in the groove between the neighboring protrusion portions 4H. Accordingly, the movement of the fitting unit 72 in the axial direction of the cable 200 is regulated, and the position of each of the interposed pieces 71 with respect to the grip portion 4 can be fixed. Therefore, movement of each of the interposed pieces 71 in the axial direction of the cable 200 can be regulated.

The number of fitting units of each of the interposed pieces 71 may be one or more. In the present embodiment, the number of fitting units of each of the interposed pieces 71 is two. The two fitting units of each of the interposed pieces 71 are arranged side by side in the axial direction of the cable 200, and are coupled with each other by the stopper portion 73. The external shape of each of the fitting units 72 is a circular shape when the left divided piece 711 and the right divided piece 712 are combined. Each of the fitting units 72 is made by combining a left fitting piece 721 and a right fitting piece 722 that are left-and-right half-split semicircular pieces.

(Stopper Portion)

Figure 44:
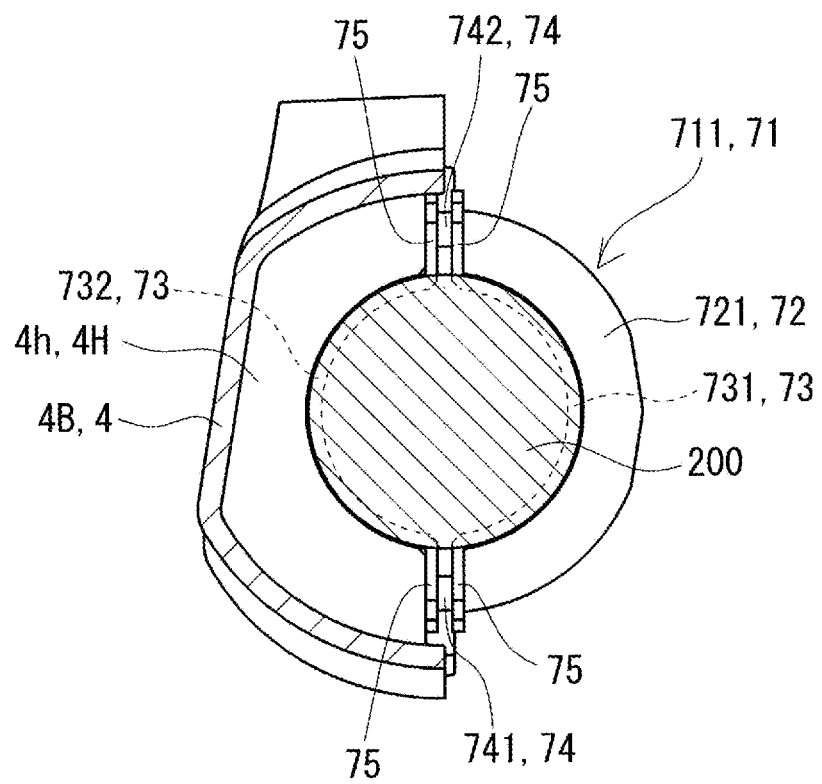
FIG. 44 is a cross sectional view taken along XLIV-XLIV of FIG. 41.

As illustrated in FIG. 44, the stopper portion 73 causes the gripping force of the grip portion 4 to bite into the outer peripheral surface of the cable 200 to regulate the movement of the cable 200 in the axial direction. Accordingly, the cable 200 can be gripped so as to regulate the movement of the cable 200 in the axial direction having an external diameter corresponding to the inner diameter of the stopper portion 73. The stopper portion 73 is integrally formed with the fitting unit 72 to overlap with the protrusion portion 4H, and as illustrated in FIGS. 42 and 45, the stopper portion 73 protrudes from the fitting unit 72 to the inner side.

The number of stopper portions 73 of each of the interposed pieces 71 may be a number obtained by adding one to the number of fitting units 72 of each of the interposed pieces 71. As described above, the number of fitting units 72 of each of the interposed pieces 71 is two. Specifically, in the present embodiment, the number of stopper portions 73 of each of the interposed pieces 71 is three. Specifically, the number of grooves explained above is five. The stopper portions 73 are formed on both ends, in the axial direction of the cable 200, of each of the fitting units 72 of each of the interposed pieces 71, and are arranged side by side so as to divide the axial direction of the cable 200. The stopper portion 73 between neighboring fitting units 72 of each of the interposed pieces 71 is common to both of the neighboring fitting units 72, and connects the neighboring fitting units 72.

The external shape of each of the stopper portions 73 is a circular shape when the left divided piece 711 and the right divided piece 712 are combined. As illustrated in FIG. 44, each of the stopper portions 73 is made by combining a left stopper piece 731 and a right stopper piece 732 that are left-and-right half-split semicircular pieces. Specifically, each of the stopper portions 73 is provided over substantially the entire circumference in the circumferential direction of the cable 200. In the present embodiment, as illustrated in FIG. 45, the cross-sectional shape of the left stopper piece 731 and the right stopper piece 732 are rectangular shapes. The end faces of the left stopper piece 731 and the right stopper piece 732 are flat surfaces. Alternatively to the present embodiment, the cross-sectional shape of the left stopper piece 731 and the right stopper piece 732 may be a triangular shape of which the tip side is thinner. In this case, the left stopper piece 731 and the right stopper piece 732 can easily bite into the outer peripheral surface of the cable 200.

Others

As illustrated in FIGS. 42 to 45, each of the interposed pieces 71 according to this example preferably includes a positioning mechanism 74.

<Positioning Mechanism>

The positioning mechanism 74 fixes the positions of the left divided piece 711 and the right divided piece 712 with respect to each other. In this example, the positioning mechanism 74 includes: protruding portions 742 and 741 integrally formed with the left divided piece 711 and the right divided piece 712, respectively; and notches 745. Specifically, the left divided piece 711 includes the protruding portions 742 and notches, and the right divided piece 712 includes: the notches 745 in which the protruding portions 742 of the left divided piece 711 are fitted; and protruding portions 741 that fit in the notches of the left divided piece 711. In FIGS. 42 and 43, for the sake of explanation, only the notches 745 are illustrated. The notches of the left divided piece 711 have substantially the same configuration as the notches 745, and are therefore not illustrated. The left divided piece 711 and the right divided piece 712 can be combined with each other by fitting the protruding portions 742 into the notches 745 and fitting the protruding portions 741 into the notches of the left divided piece 711.

In the present embodiment, the protruding portions 742 and the notches of the left divided piece 711 are formed on opposite flange portions 75 constituting a pair of flange portions 75 that are formed integrally on both ends of the left divided piece 711 in the circumferential direction. Likewise, the protruding portions 741 and the notches 745 of the right divided piece 712 are formed on opposite flange portions 75 constituting a pair of flange portions 75 that are formed integrally on both ends of the right divided piece 712 in the circumferential direction. Specifically, in the left divided piece 711, the protruding portions 742 are formed on one of the flange portions 75, and the notches, not illustrated, are formed on the other of the flange portions 75. In the right divided piece 712, the protruding portions 741 are formed on one of the flange portions 75, and the notches 745 are formed on the other of the flange portions 75.

The shapes of the protruding portion 741 and the protruding portions 742 are not particularly limited. In the present embodiment, the shapes of the protruding portion 741 and the protruding portion 742 are a rectangular pillar shape. In the present embodiment, the notches of the left divided piece 711 and the notches 745 are constituted by penetrating holes penetrating the flange portions 75 from the front to the back. Alternatively to the present embodiment, the notches of the left divided piece 711 and the notches 745 may be constituted by holes having bottoms, i.e., concave portions. The shapes of the notches of the left divided piece 711 and the notches 745 are not particularly limited. The shapes of the notches of the left divided piece 711 and the notches 745 may be shapes suitable for the shapes of the protruding portions 741 and the protruding portion 742. In the present embodiment, the notches of the left divided piece 711 and the notches 745 are rectangular shapes. The flange portions 75 are formed to extend to the outer side in the diameter direction of the cable 200.

(Material)

For example, the materials of the interposed member 70 may be preferably made of a resin-based material that has heat resistance against the highest temperature of the use of the cable 200 and that has strength to appropriately grip the cable 200. Examples of the material of the interposed member 70 include polycarbonate resin, polybutylene terephthalate resin, and fiber reinforced plastic.

Actions and Effects of Sixth Embodiment

The connector 100 according to the present embodiment can grab multiple types of cables of different external diameters by regulating the movement of the cables in the axial direction. With the fitting units 72 of the interposed pieces 71, the interposed piece 71 can be positioned with reference to the grip portion 4. Therefore, movement of the interposed pieces 71 in the axial direction of the cable 200 can be regulated. The interposed pieces 71 that are positioned with reference to the grip portion 4 include the stopper portions 73, so that the cable 200 having the external diameter corresponding to the inner diameter of the stopper portion 73 can be grabbed so that movement of the cable 200 in the axial direction can be regulated. Because the interposed pieces 71 are detachable, when the interposed pieces 71 are detached, a cable having an external diameter corresponding to the inner diameter of the protrusion portions 4H can be grabbed so that movement of the cable in the axial direction is regulated. In this manner, the connector 100 according to the present embodiment can grab two types of cables different at least in the external diameters by regulating movement of the cables in the axial direction. When multiple types of interposed members 70 having different inner diameters are prepared, three or more types of cables different at least in the external diameters can be grabbed by regulating movement of the cables in the axial direction. Therefore, it is not necessary to prepare different main body portions 1 for cables different in the external diameters, and different types of cables different in the external diameters can be supported by the main body portion 1 of a single type.

Although the embodiments have been hereinabove explained as examples of techniques of the present invention, the techniques according to the present invention are not limited thereto, and can be applied to embodiments to which changes, substitutions, additions, omissions, and the like are applied as necessary. Also, the attached drawings and the detailed description have been provided to explain the embodiments. Therefore, the constituent elements described in the attached drawings and the detailed description include not only constituent elements essential for solving the problems but also constituent elements not essential for solving the problems in order to explain the above techniques. Therefore, the mere fact that those non-essential constituent elements are described in the attached drawings and the detailed description should not be understood as indicating that those non-essential constituent elements are mandatory. In addition, the above-mentioned embodiments are for exemplifying the techniques according to the present disclosure, and therefore, various changes, substitutions, additions, omissions, and the like can be made within the subject matter of the claims or subject matters equivalent thereto.

For example, the left case and the right case may have recessed and protruding portions that mesh with each other on at least a portion of the peripheries that come into contact with each other. The recessed and protruding portions are formed on the inner sides of the above-described peripheries. The recessed and protruding portions are alternately arranged with concave portions and protruding portions along the peripheries. The recessed and protruding portions of the left case and the recessed and protruding portions of the right case are formed so that concave portions and protruding portions mesh with each other when the above-described peripheries are brought into contact with each other.

One of the left case and the right case may have a boss portion, and the other of the left case and the right case may have a boss-receiving portion in which the boss portion is fit. For example, multiple boss portions may be formed on the left case, and multiple boss-receiving portions may be formed on the right case. The boss portion includes a base portion and a protrusion portion protruding from the upper surface of the base portion. The boss-receiving portion includes: a fitting hole in which the base portion is fit; and a penetrating hole in which the protrusion portion is inserted. In the boss portion, the diameter of the base portion is greater than that of the protrusion portion, and the length of the protrusion portion is greater than the length of the penetrating hole. At a portion corresponding to the boss-receiving portion, the right case is formed with a concave hole from the exterior side surface, and the penetrating hole penetrates the bottom surface of the concave hole.

When the boss portion is fit in the boss-receiving portion, the tip of the protrusion portion penetrates the penetrating hole and protrudes from the bottom surface of the concave hole. In this state, from the outer side of the right case, the cases are heated and melted while the tip portion of the protrusion portion protruding from the bottom surface of the concave hole is pressurized in the axial direction, so that the tip portion of the protrusion portion is deformed in a disk shape. As a result of this deformation, the boss portion is stuck in the boss-receiving portion, and the left case and the right case are bonded, so that the left case and the right case cannot be separated in the left-and-right direction.

The left case and the right case have the recessed and protruding portions, and the recessed and protruding portions of them both mesh with each other in the main body case, so that even when an external force is exerted in a direction orthogonal to the left-and-right direction of the main body case 1A, the left case and the right case are less likely to relatively shift in position in the horizontal direction. Therefore, the strength of the seams of the left case and the right case against the external force in the horizontal direction can be increased. Therefore, damage at the seams of left case and right case can be effectively alleviated. Alternatively, a relative shift in position of the left case and the right case in the horizontal direction can be alleviated when one of the left case and the right case includes a boss portion, the other of the left case and the right case includes a boss-receiving portion, and the boss portion fits in the boss-receiving portion in the main body case. Furthermore, when the boss portion includes a base portion having a large diameter, and this base portion fits in the fitting hole of the boss-receiving portion, the strength against external force in the horizontal direction can be increased by the base portion having the large diameter.

What is claimed is:

1. A connector configured to be connected to an inlet of an electric apparatus having a storage battery, the connector comprising:
   a main body portion;
   an insertion portion provided on a front side of the main body portion and configured to be inserted into the inlet;

a first arm including a first intermediate portion swingably supported on the main body portion, a first front portion extending from the first intermediate portion to the insertion portion, a hook provided at the first front portion, and a first rear portion provided on a rear side of the first intermediate portion;

a first preloading member configured to preload the first arm such that the hook protrudes from an outer peripheral surface of the insertion portion;

a release member configured to come into contact with the first rear portion such that the first arm is swung in a direction opposite to a preloading direction of the first preloading member;

a solenoid including a plunger, the solenoid configured to advance or retract the plunger; and a slide member configured to advance or retract in synchronization with an advancing or retracting movement of the plunger, wherein the slide member includes a support piece configured to come into contact with a back surface of the first front portion and a connection piece connecting the plunger and the support piece, the connection piece includes a first connection piece provided on a side of the plunger and a second connection piece provided on a side of the support piece, and the support piece and the first connection piece are provided with a shift in position in a left- and right direction.

2. The connector according to claim 1, wherein the support piece and the first connection piece are provided with a shift in a vertical direction.

3. The connector according to claim 1, further comprising a guide member formed with a groove configured to guide the first connection piece in a horizontal direction, wherein the insertion portion includes a terminal case containing a terminal, and the guide member and the terminal case are integrally molded.

4. The connector according to claim 3, wherein the terminal case includes a groove configured to guide the support piece in an advancing-and-retracting direction of the plunger.

5. The connector according to claim 1, wherein the main body portion includes a left case and a right case that are half-split cases, and the solenoid is provided on a side of the left case and a side of the right case relative to a boundary between the left case and the right case.

6. The connector according to claim 5, further comprising:

a second arm including a second intermediate portion swingably supported on the main body portion, a second front portion extending from the second intermediate portion to a boundary between the main body portion and the insertion portion, and a protrusion portion provided on a tip of the second front portion; and a second preloading member configured to preload the second arm such that the protrusion portion protrudes from the boundary between the main body portion and the insertion portion, wherein the first arm and the second arm are provided side by side, and the solenoid is provided on an opposite side of the first arm from the second arm in the left-and-right direction.

* * * * *